United States Patent
Lavoie et al.

(10) Patent No.: US 9,937,953 B2
(45) Date of Patent: Apr. 10, 2018

(54) TRAILER BACKUP OFFSET DETERMINATION

(71) Applicant: Ford Global Technologies, LLC, Dearborn, MI (US)

(72) Inventors: Erick Michael Lavoie, Dearborn, MI (US); Joseph M. Raad, Farmington, MI (US); Donald Jacob Mattern, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 269 days.

(21) Appl. No.: 14/886,668

(22) Filed: Oct. 19, 2015

(65) Prior Publication Data

US 2016/0039456 A1 Feb. 11, 2016

Related U.S. Application Data

(63) Continuation-in-part of application No. 14/201,130, filed on Mar. 7, 2014, now Pat. No. 9,290,202, which
(Continued)

(51) Int. Cl.
*B62D 13/06* (2006.01)
*B60W 50/00* (2006.01)
(Continued)

(52) U.S. Cl.
CPC ............ *B62D 13/06* (2013.01); *B60D 1/245* (2013.01); *B60D 1/62* (2013.01); *B60Q 9/005* (2013.01);
(Continued)

(58) Field of Classification Search
CPC ...... B62D 13/06; B62D 15/027; B60D 1/245; B60D 1/62; B60Q 9/005; B60W 50/0098
See application file for complete search history.

(56) References Cited

U.S. PATENT DOCUMENTS 3,542,390 A 11/1970 Fikes et al.
3,605,088 A 9/1971 Savelli
(Continued)

FOREIGN PATENT DOCUMENTS

CN 102582686 B 9/2013
DE 3923676 A1 1/1991
(Continued)

OTHER PUBLICATIONS

Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
(Continued)

*Primary Examiner* — Thomas G Black
*Assistant Examiner* — Sze-Hon Kong
(74) *Attorney, Agent, or Firm* — Raymond Coppiellie; Price Heneveld LLP

(57) ABSTRACT

A system for calibrating a backup assist system for a trailer attached to a vehicle is provided which includes a hitch sensor continuously measuring a hitch angle for determining an angle rate, a yaw sensor continuously sensing a yaw rate of the vehicle, and a controller configured to determine an offset of the measured hitch angle when vehicle is driving forward and/or rearward.

11 Claims, 38 Drawing Sheets

Related U.S. Application Data is a continuation-in-part of application No. 14/068,387, filed on Oct. 31, 2013, now Pat. No. 9,102,271, which is a continuation-in-part of application No. 14/059,835, filed on Oct. 22, 2013, now Pat. No. 9,248,858, which is a continuation-in-part of application No. 13/443,743, filed on Apr. 10, 2012, now Pat. No. 8,825,328, which is a continuation-in-part of application No. 13/336,060, filed on Dec. 23, 2011, now Pat. No. 8,909,426.

(60) Provisional application No. 61/477,132, filed on Apr. 19, 2011.

(51) Int. Cl.
*B60D 1/24* (2006.01)
*B62D 15/02* (2006.01)
*B60Q 9/00* (2006.01)
*B60D 1/62* (2006.01)

(52) U.S. Cl.
CPC ....... *B60W 50/0098* (2013.01); *B62D 15/027* (2013.01); *B60W 2050/0088* (2013.01); *B60W 2520/22* (2013.01)

(56) References Cited

U.S. PATENT DOCUMENTS

| | | |
|---|---|---|
| 3,756,624 A | 9/1973 | Taylor |
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,449 A | 7/1989 | Martinet et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,559,696 A | 9/1996 | Borenstein |
| 5,579,228 A | 11/1996 | Kimbrough et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 | 2/2002 | Kubota et al. |
| 6,389,342 B1 | 5/2002 | Kanda |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,712,378 B1 | 3/2004 | Austin |
| 6,801,125 B1 | 10/2004 | McGregor et al. |
| 6,806,809 B2 | 10/2004 | Lee et al. |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,159,890 B2 | 1/2007 | Craig et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,540,523 B2 | 6/2009 | Russell et al. |
| 7,546,191 B2 | 6/2009 | Lin et al. |
| 7,548,155 B2 | 6/2009 | Schutt et al. |
| 7,623,952 B2 | 11/2009 | Unruh et al. |
| 7,648,153 B2 | 1/2010 | Metternich et al. |
| 7,690,737 B2 | 4/2010 | Lu |
| 7,706,944 B2 | 4/2010 | Tanaka et al. |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,969,326 B2 | 6/2011 | Sakakibara |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,139,109 B2 | 3/2012 | Schmiedel et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |

(56) References Cited

U.S. PATENT DOCUMENTS

| | | |
|---|---|---|
| 8,190,364 B2 | 5/2012 | Rekow |
| 8,191,915 B2 | 6/2012 | Freese et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,374,749 B2 | 2/2013 | Tanaka |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,798,860 B2 | 8/2014 | Dechamp |
| 8,807,261 B2 | 8/2014 | Subrt et al. |
| 8,823,796 B2 | 9/2014 | Shen et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,102,271 B2 | 8/2015 | Trombley et al. |
| 9,120,358 B2 | 9/2015 | Motts et al. |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,208,686 B2 | 12/2015 | Takamatsu |
| 9,227,474 B2 | 1/2016 | Liu |
| 9,229,453 B1 | 1/2016 | Lee |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,500,497 B2 | 11/2016 | Lavoie et al. |
| 2001/0024333 A1 | 9/2001 | Rost |
| 2001/0037164 A1 | 11/2001 | Hecker |
| 2001/0052434 A1 | 12/2001 | Ehrlich et al. |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0244579 A1 | 11/2006 | Raab |
| 2007/0027581 A1 | 2/2007 | Bauer et al. |
| 2007/0057816 A1 | 3/2007 | Sakakibara et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0198190 A1 | 8/2007 | Bauer et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0224059 A1 | 9/2012 | Takamatsu |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2012/0316732 A1 | 12/2012 | Auer |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1* | 3/2014 | Lu ............... B60R 1/002 348/148 |
| 2014/0121883 A1 | 5/2014 | Shen et al. |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |

(56) References Cited

U.S. PATENT DOCUMENTS

| | | |
|---|---|---|
| 2014/0267688 A1 | 9/2014 | Aich et al. |
| 2014/0267689 A1 | 9/2014 | Lavoie |
| 2014/0267727 A1 | 9/2014 | Alaniz |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217692 A1 | 8/2015 | Yanagawa |
| 2015/0217693 A1 | 8/2015 | Pliefke et al. |
| 2015/0232092 A1 | 8/2015 | Fairgrieve et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0059888 A1 | 3/2016 | Bradley et al. |
| 2016/0129939 A1 | 5/2016 | Singh et al. |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| EP | 0418653 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |
| WO | 2015187467 A1 | 12/2015 |

OTHER PUBLICATIONS

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

"Ford Super Duty: Truck Technologies", Brochure, Sep. 2011, 2 pages.

Kristopher Bunker, "2012 Guide to Towing", Trailer Life, 2012, 38 pages.

A. Gonzalez-Cantos, "Backing-Up Maneuvers of Autonomous Tractor-Trailer Vehicles using the Qualitative Theory of Nonlinear Dynamical Systems, International Journal of Robotics Research," Jan. 2009, vol. 28, 1 page.

L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the

(56) References Cited

OTHER PUBLICATIONS

2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen far systemteknik Deartment of Electrical Engineering, Jan. 27, 2006, 57 pages.
Guanrong Chen; Delin Zhang, "Backing Up a Truck-Trailer with Suboptimal Distance Trajectories," IEEE, Fuzzy Systems, Proceedings of the Fifth IEEE International Conference, Sep. 1996, ISBN: 0-7803-3645-3, vol. 2, pp. 1439-1445.
Payne, M.I.; Hung, J.Y.; Bevly, D.M.; Selfridge, B.J., "Control of a Robot-Trailer System Using a Single Non-Collacted Sensor," IEEE, 38th Annual Conference on IEEE Industrial Electronics Society, Oct. 2012, ISBN: 978-1-4673-2420-5, pp. 2674-2679.
Divebliss, A.V.; Wen, J.T., "IEEE—Trajectory Tracking Control of a Car-Trailer System," Reveo Corp., Hawthorne, NY, Control Systems Technology, May 1997, vol. 5, No. 3, pp. 269-278, ISSN: 1063-6536.
Kairos Autonomi, "Optionally Unmanned Ground Systems for Any Steering-Wheel Based Vehicle,"www.kairosautonomi.com/pronto4_system.html[Sep. 26, 2014 3:22:48 PM].

(56) References Cited

OTHER PUBLICATIONS

Steele, Micah; Gillespie, R. Brent, "Shared Control Between Human and Machine: Using a Haptic Steering Wheel to Aid in Land Vehicle Guidance," University of Michigan, 5 pages, Ann Arbor, MI.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

Novak, Domen; Dovzan, Dean; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

\* cited by examiner

TRAILER BACKUP OFFSET DETERMINATION

CROSS-REFERENCE TO RELATED APPLICATIONS

This patent application is a continuation-in-part of U.S. patent application Ser. No. 14/201,130, which was filed on Mar. 7, 2014, entitled "SYSTEM AND METHOD OF CALIBRATING A TRAILER BACKUP ASSIST SYSTEM," and issued as U.S. Pat. No. 9,290,202 on Mar. 22, 2016, which is a continuation-in-part of U.S. patent application Ser. No. 14/068,387, which was filed on Oct. 31, 2013, entitled "TRAILER MONITORING SYSTEM AND METHOD," and issued as U.S. Pat. No. 9,102,271 on Aug. 11, 2015, which is a continuation-in-part of U.S. patent application Ser. No. 14/059,835, which was filed on Oct. 22, 2013, entitled "TRAILER BACKUP ASSIST SYSTEM," and issued as U.S. Pat. No. 9,248,858 on Feb. 2, 2016, which is a continuation-in-part of U.S. patent application Ser. No. 13/443,743 which was filed on Apr. 10, 2012, entitled "DETECTION OF AND COUNTERMEASURES FOR JACKKNIFE ENABLING CONDITIONS DURING TRAILER BACKUP ASSIST," and issued as U.S. Pat. No. 8,825,328 on Sep. 2, 2014, which is a continuation-in-part of U.S. patent application Ser. No. 13/336,060, which was filed on Dec. 23, 2011, entitled "TRAILER PATH CURVATURE CONTROL FOR TRAILER BACKUP ASSIST," and issued as U.S. Pat. No. 8,909,426 on Dec. 9, 2014, which claims benefit from U.S. Provisional Patent Application No. 61/477,132, which was filed on Apr. 19, 2011, entitled "TRAILER BACKUP ASSIST CURVATURE CONTROL," which have a common Applicant herewith and are being incorporated herein in their entirety by reference.

FIELD OF THE INVENTION

The disclosure made herein relates generally to driver assist and active safety technologies in vehicles, and more particularly to a trailer backup assist system.

BACKGROUND OF THE INVENTION

Reversing a vehicle while towing a trailer is very challenging for many drivers. This is particularly true for drivers that are unskilled at backing vehicles with attached trailers, which may include those that drive with a trailer on an infrequent basis (e.g., have rented a trailer, use a personal trailer on an infrequent basis, etc.). One reason for such difficulty is that backing a vehicle with an attached trailer requires steering inputs that are opposite to normal steering when backing the vehicle without a trailer attached and/or requires braking to stabilize the vehicle-trailer combination before a jackknife condition occurs. Another reason for such difficulty is that small errors in steering while backing a vehicle with an attached trailer are amplified thereby causing the trailer to depart from a desired path.

To assist the driver in steering a vehicle with a trailer attached, a trailer backup assist system needs to know the driver's intention. One common assumption with known trailer backup assist systems is that a driver of a vehicle with an attached trailer wants to backup straight and the system either implicitly or explicitly assumes a zero curvature path for the vehicle-trailer combination. Unfortunately most of the real-world use cases of backing a trailer involve a curved path and, thus, assuming a path of zero curvature would significantly limit usefulness of the system. Some known systems assume that a path is known from a map or path planner. To this end, some known trailer backup assist systems operate under a requirement that a trailer backup path is known before backing of the trailer commences such as, for example, from a map or a path-planning algorithm. Undesirably, such implementations of the trailer backup assist systems are known to have a relatively complex human machine interface (HMI) device to specify the path, obstacles and/or goal of the backup maneuver. Furthermore, such systems also require some way to determine how well the desired path is being followed and to know when the desired goal, or stopping point and orientation, has been met, using approaches such as cameras, inertial navigation, or high precision global positioning system (GPS). These requirements lead to a relatively complex and costly system.

Another reason backing a trailer can prove to be difficult is the need to control the vehicle in a manner that limits the potential for a jackknife condition to occur. A trailer has attained a jackknife condition when a hitch angle cannot be reduced (i.e., made less acute) while continuously backing up a trailer by application of a maximum steering input for the vehicle such as, for example, by moving steered front wheels of the vehicle to a maximum steered angle at a maximum rate of steering angle change. In the case of the jackknife angle being achieved, the vehicle must be pulled forward to relieve the hitch angle in order to eliminate the jackknife condition and, thus, allow the hitch angle to be controlled via manipulation of the steered wheels of the vehicle. However, in addition to the jackknife condition creating the inconvenient situation where the vehicle must be pulled forward, it can also lead to damage to the vehicle and/or trailer if certain operating conditions of the vehicle relating to its speed, engine torque, acceleration, and the like are not detected and counteracted. For example, if the vehicle is travelling at a suitably high speed in reverse and/or subjected to a suitably high longitudinal acceleration when the jackknife condition is achieved, the relative movement of the vehicle with respect to the trailer can lead to contact between the vehicle and trailer thereby damaging the trailer and/or the vehicle.

SUMMARY OF THE INVENTION

According to one aspect of the present invention, a system for calibrating a backup assist system for a trailer attached to a vehicle is provided which includes a hitch sensor continuously measuring a hitch angle for determining an angle rate, a yaw sensor continuously sensing a yaw rate of the vehicle, and a controller configured to determine an offset of the measured hitch angle when vehicle is driving forward and rearward above a threshold speed and the yaw and angle rates are substantially zero.

According to another aspect of the present invention, a method of calibrating a backup assist system for a trailer and a vehicle is provided which includes the steps of driving the vehicle forward to determine a forward offset between measured and actual hitch angles, storing the forward offset, driving the vehicle in reverse to determine a reverse offset between the measured hitch angle and the actual hitch angle, replacing the forward offset with the reverse offset, and calibrating the system using the reverse offset.

According to a further aspect of the present invention, a system for calibrating a backup assist system for a trailer attached to a vehicle is provided which includes a hitch sensor continuously measuring a hitch angle between the vehicle and the trailer and a controller configured to determine an offset of the measured hitch angle. The controller is configured to calculate and store in memory a forward offset if no reverse offset is stored.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
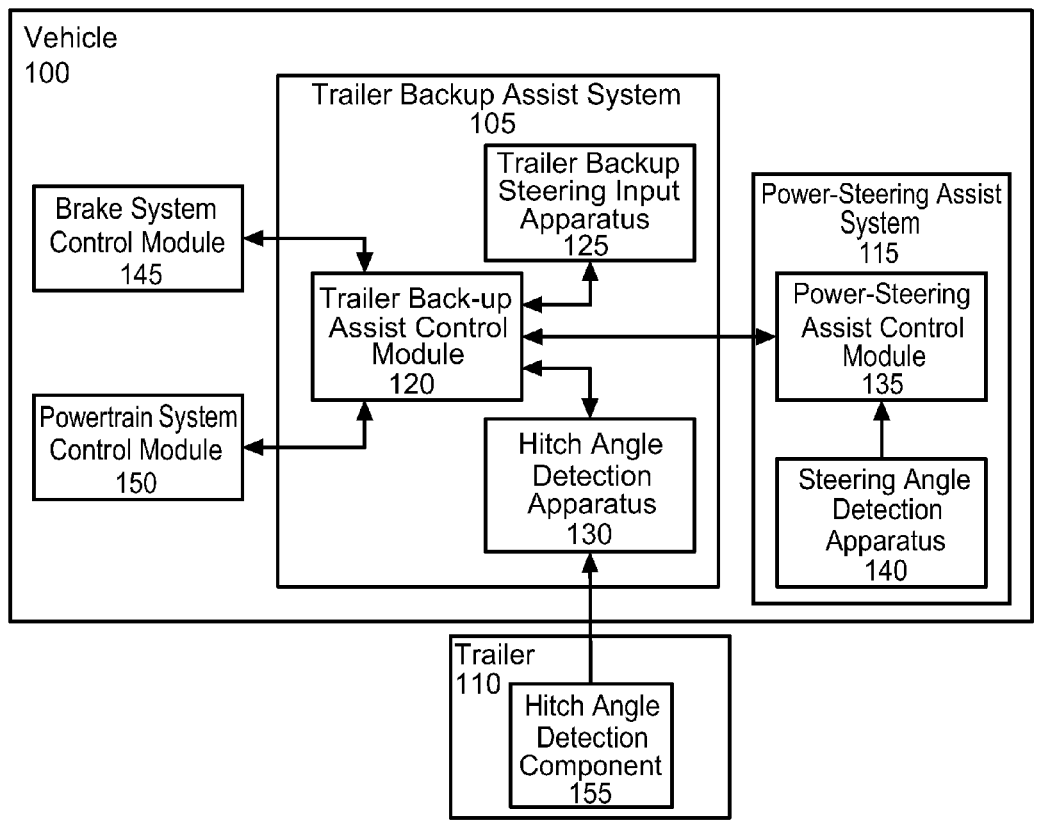
FIG. 1 shows a vehicle-trailer combination, the vehicle being configured for performing trailer backup assist functionality in accordance with an embodiment.

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

The disclosed subject matter is directed to providing trailer backup assist functionality in a manner that is relatively low cost and that offers an intuitive user interface. In particular, such trailer backup assist functionality provides for controlling curvature of a path of travel of a trailer attached to a vehicle (i.e., trailer path curvature control) by allowing a driver of the vehicle to specify a desired path of the trailer by inputting a desired trailer path curvature as the backup maneuver of the vehicle and trailer progresses. Although a control knob, a set of virtual buttons, or a touch screen can each be implemented for enabling trailer path curvature control, the disclosed subject matter is not unnecessarily limited to any particular configuration of interface through which a desired trailer path curvature is inputted. Furthermore, in the case where a steering wheel can be mechanically decoupled from steered wheels of the vehicle, the steering wheel can also be used as an interface through which a desired trailer path curvature is inputted. As will be discussed herein in greater detail, kinematical information of a system defined by the vehicle and the trailer are used to calculate a relationship (i.e., kinematics) between the trailer's curvature and the steering angle of the vehicle for determining steering angle changes of the vehicle for achieving the specified trailer path. Steering commands corresponding to the steering angle changes are used for controlling a steering system of the tow vehicle (e.g., electric power assisted steering (EPAS) system) for implementing steering angle changes of steered wheels of the vehicle to achieve (e.g., to approximate) the specified path of travel of the trailer. The trailer backup assist system automatically steers the vehicle-trailer combination as a driver uses the vehicle transmission, accelerator and brake to reverse the vehicle-trailer combination. The driver inputs a desired trailer curvature command by using an input device such as a trailer steering knob.

Trailer backup assist functionality may be directed to implementing one or more countermeasures for limiting the potential of a jackknife condition being attained between a vehicle and a trailer being towed by the vehicle while backing up. In certain embodiments, curvature of a path of travel of the trailer (i.e., trailer path curvature control) can be controlled by allowing a driver of the vehicle to specify a desired path of the trailer by inputting a desired trailer path curvature as the backup maneuver of the vehicle and trailer progresses. Although a control knob, a set of virtual buttons, or a touch screen can each be implemented for enabling trailer path curvature control, the disclosed subject matter is not unnecessarily limited to any particular configuration of interface through which a desired trailer path curvature is inputted. Furthermore, in the case where a steering wheel can be mechanically decoupled from steered wheels of the vehicle, the steering wheel can also be used as an interface through which a desired trailer path curvature is inputted. As will be discussed herein in greater detail, kinematic information of a system defined by the vehicle and the trailer are used to calculate a relationship (i.e., kinematics) between the trailer's curvature and the steering angle of the vehicle for determining steering angle changes of the vehicle for achieving the specified trailer path. Steering commands corresponding to the steering angle changes are used for controlling a steering system of the tow vehicle (e.g., electric power assisted steering (EPAS) system) for implementing steering angle changes of steered wheels of the vehicle to achieve (e.g., to approximate) the specified path of travel of the trailer.

Embodiments of the disclosed subject matter are directed to trailer backup assist functionality that provides for a user interface for a system that controls curvature of a path of a trailer being backed by a vehicle. More specifically, trailer backup assist functionality configured in accordance with embodiments of the disclosed subject matter provide for such trailer path curvature control by allowing a driver of the vehicle to specify a desired path of the trailer by inputting a desired trailer path curvature as the backup maneuver of the vehicle and trailer progresses. In response to such path of the trailer being specified by the driver, embodiments of the disclosed subject matter control a power assisted steering system (e.g., electric power assisted steering (EPAS) system) of the vehicle for implementing steering angle changes of steered wheels of the vehicle to achieve the specified trailer path. Kinematics of the vehicle and the trailer are used to determine the steering angle changes that are required for achieving the specified trailer path. Accordingly, embodiments of the disclosed subject matter provide for implementation of trailer backup assist functionality in a manner that is relatively simple and that enables use of an intuitive vehicle operator interface for specifying trailer path curvature control.

The disclosed subject matter, furthermore, includes embodiments directed to determining a hitch angle of trailer attached to the vehicle. In one such embodiment, the vehicle trailer backup assist system may utilize a target placed on the trailer, allowing the trailer backup assist system to employ information acquired via image acquisition and processing of the target. According to other embodiments, the target may be used to identify if a connected trailer has changed, trailer connection or disconnection, and other trailer related information. The target is an identifiable visual target that can be captured in an image by the video imaging camera and detected and processed via image processing. According to one embodiment, the target may attached to the trailer, preferably within a target placement zone, such that the camera and image processing may detect the target and its location on the trailer to determine trailer related information, such as the hitch angle between the trailer and the towing vehicle. The trailer backup assist system may provide to the user one or more image(s) of the trailer target zone for proper placement of the target to assist with placement of the target on the trailer. Additionally, the vehicle trailer backup assist system may monitor the target to determine if the target has been correctly placed within a desired target placement zone and provide feedback alert(s) to the user. Further, the trailer backup assist system may monitor the trailer connection by monitoring the target to determine if the target has moved to determine whether the same trailer remains connected to the tow vehicle, and may initiate action in response thereto. Further, the trailer backup assist system may monitor the hitch angle or the target to determine if the trailer may have been changed out (i.e., disconnected and replaced with another trailer), and may initiate action in response thereto.

The disclosed subject matter also provides a supplemental vehicle lighting system that is responsive to a trailer backup assist system. The system includes a rear vehicle fixture defining a keylock hole customarily used in conjunction with a corresponding keylock cylinder. A light assembly is provided in the place of a keylock cylinder and operably coupled to the keylock hole. The light assembly includes a housing having a barrel that is concentrically aligned with the keylock hole and includes a distal end and a proximal end. A lighting device is disposed inside the housing and operable to emit light through the barrel beginning from the proximal end. A lens is coupled to the distal end of the barrel and is disposed to at least partially coincide with the keylock hole, wherein the lens is configured to disperse light emitted from the lighting device to illuminate a rear vehicle area.

In some embodiments of the disclosed trailer backup assist system, it can be advantageous to use information that is representative of a hitch angle between the vehicle and a trailer attached to the vehicle. The disclosed subject matter provides embodiments directed to estimating an actual hitch angle of a trailer attached to a vehicle, as in some situations sensor information may become unavailable or may otherwise not provide an accurate measurement of the hitch angle. A hitch angle that is not accurate may introduce a potential for inadequate or improper vehicle system control, especially when the hitch angle information is important to controlling the vehicle system, such as a trailer backup assist system or a trailer brake controller. According to one embodiment, a sensor system for estimating an actual hitch angle of a trailer attached to a vehicle includes a primary sensor having a camera monitoring a target on the trailer to determine a measured hitch angle and a secondary sensor that monitors the trailer to determine an indicator of the actual hitch angle. The trailer backup assist system may then operate the vehicle when the measured hitch angle correlates with the indicator of the actual hitch angle, confirming that the measured hitch angle is a generally accurate estimate of the actual hitch angle.

According to an additional embodiment of the disclosed subject matter, a system for estimating a hitch angle between a vehicle and a trailer coupled thereto has a wireless receiver on the vehicle located a predetermined distance from a trailer mount and a wireless transmitter located at an end of the trailer opposite the trailer mount. According to one embodiment, a controller monitors power returns of a signal transmitted from the transmitter to the receiver and thereby estimates a distance between the transmitter and the receiver as a function of a path loss propagation of the transmitted signal. The hitch angle is then estimated using the estimated distance, the predetermined distance, and a trailer length.

To further ensure the accuracy of the measured hitch angle, in additional embodiments the trailer back assist system may include a hitch angle calibration routine for determining any offset between the measured hitch angle and the actual hitch angle, based on certain vehicle and/or trailer characteristics. In one of these embodiments, a method provides for sensing a measured hitch angle with at least one hitch angle sensor on the vehicle and sensing a steering angle of the steered wheels of the vehicle. The method further provides for reversing the vehicle, and thereby determining an offset between the measured hitch angle and the actual hitch angle when the measured hitch angle and the steering angle are substantially consistent while the vehicle is reversing. Another one of these embodiments provides driving the vehicle forward substantially straight above a threshold speed while sensing a yaw rate of the vehicle and sensing a measured hitch angle of the trailer. Further, the method provides for determining an angle rate based on the measured hitch angle, and then determining an offset between the measured hitch angle and the actual hitch angle when the yaw rate and the angle rate are substantially zero. The offset may then be used to more accurately manipulate the actual hitch angle with the trailer backup assist system.

Trailer Backup Assist System

Referring to FIG. 1, an embodiment of a vehicle 100 configured for performing trailer backup assist functionality is shown. A trailer backup assist system 105 of the vehicle 100 controls the curvature of path of travel of a trailer 110 that is attached to the vehicle 100. Such control is accomplished through interaction of a power assisted steering system 115 of the vehicle 100 and the trailer backup assist system 105. During operation of the trailer backup assist system 105 while the vehicle 100 is being reversed, a driver of the vehicle 100 is sometimes limited in the manner in which he/she can make steering inputs via a steering wheel of the vehicle 100. This is because in certain vehicles the trailer backup assist system 105 is in control of the power assisted steering system 115 and the power assisted steering system 115 is directly coupled to the steering wheel (i.e., the steering wheel of the vehicle 100 moves in concert with steered wheels of the vehicle 100). As is discussed below in greater detail, a human machine interface (HMI) device of the backup assist system 105 is used for commanding changes in curvature of a path of the trailer 110 such as a knob, thereby decoupling such commands from being made at the steering wheel of the vehicle 100. However, some vehicles configured to provide trailer backup assist functionality in accordance with the disclosed subject matter will have the capability to selectively decouple steering movement from movement of steerable wheels of the vehicle, thereby allowing the steering wheel to be used for commanding changes in curvature of a path of a trailer during such trailer backup assist.

The trailer backup assist system 105 includes a trailer backup assist control module 120, a trailer backup steering input apparatus 125, and a hitch angle detection apparatus 130. The trailer backup assist control module 120 is connected to the trailer backup steering input apparatus 125 and the hitch angle detection apparatus 130 for allowing communication of information therebetween. It is disclosed herein that the trailer backup steering input apparatus can be coupled to the trailer backup assist control module 120 in a wired or wireless manner. The trailer backup assist system control module 120 is attached to a power steering assist control module 135 of the power steering assist system 115 for allowing information to be communicated therebetween. A steering angle detection apparatus 140 of the power steering assist system 115 is connected to the power steering assist control module 135 for providing information thereto. The trailer backup assist system is also attached to a brake system control module 145 and a powertrain control module 150 for allowing communication of information therebetween. Jointly, the trailer backup assist system 105, the power steering assist system 115, the brake system control module 145, the powertrain control module 150, and the gear selection device (PRNDL), define a trailer backup assist architecture configured in accordance with an embodiment.

The trailer backup assist control module 120 is configured for implementing logic (i.e., instructions) for receiving information from the trailer backup steering input apparatus 125, the hitch angle detection apparatus 130, the power steering assist control module 135, the brake system control module 145, and the powertrain control module 150. The trailer backup assist control module 120 (e.g., a trailer curvature algorithm thereof) generates vehicle steering information as a function of all or a portion of the information received from the trailer backup steering input apparatus 125, the hitch angle detection apparatus 130, the power steering assist control module 135, the brake system control module 145, and the powertrain control module 150. Thereafter, the vehicle steering information is provided to the power steering assist control module 135 for affecting steering of the vehicle 100 by the power steering assist system 115 to achieve a commanded path of travel for the trailer 110.

The trailer backup steering input apparatus 125 provides the trailer backup assist control module 120 with information defining the commanded path of travel of the trailer 110 to the trailer backup assist control module 120 (i.e., trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e., along a substantially straight path of travel). As will be discussed below in detail, the trailer backup steering input apparatus 125 preferably includes a rotational control input device for allowing a driver of the vehicle 100 to interface with the trailer backup steering input apparatus 125 to command desired trailer steering actions (e.g., commanding a desired change in radius of the path of travel of the trailer and/or commanding that the trailer travel along a substantially straight path of travel as defined by a longitudinal centerline axis of the trailer). In a preferred embodiment, the rotational control input device is a knob rotatable about a rotational axis extending through a top surface/face of the knob. In other embodiments, the rotational control input device is a knob rotatable about a rotational axis extending substantially parallel to a top surface/face of the knob.

Some vehicles (e.g., those with active front steer) have a power steering assist system configuration that allows a steering wheel to be partially decoupled from movement of the steered wheels of such a vehicle. Accordingly, the steering wheel can be rotated independent of the manner in which the power steering assist system of the vehicle controls the steered wheels (e.g., as commanded by vehicle steering information provided by a power steering assist system control module from a trailer backup assist system control module configured in accordance with one embodiment). As such, in these types of vehicles where the steering wheel can be selectively decoupled from the steered wheels to allow independent operation thereof, trailer steering information of a trailer backup assist system configured in accordance with the disclosed subject matter can be provided through rotation of the steering wheel. Accordingly, it is disclosed herein that in certain embodiments, the steering wheel is an embodiment of a rotational control input device in the context of the disclosed subject matter. In such embodiments, the steering wheel would be biased (e.g., by an apparatus that is selectively engageable/activatable) to an at-rest position between opposing rotational ranges of motion.

The hitch angle detection apparatus 130, which operates in conjunction with a hitch angle detection component 155 of the trailer 110, provides the trailer backup assist control module 120 with information relating to an angle between the vehicle 100 and the trailer 110 (i.e., hitch angle information). In a preferred embodiment, the hitch angle detection apparatus 130 is a camera-based apparatus such as, for example, an existing rear view camera of the vehicle 100 that images (i.e., visually monitors) a target (i.e., the hitch angle detection component 155) attached the trailer 110 as the trailer 110 is being backed by the vehicle 100. Preferably, but not necessarily, the hitch angle detection component 155 is a dedicated component (e.g., an item attached to/integral with a surface of the trailer 110 for the express purpose of being recognized by the hitch angle detection apparatus 130). Alternatively, the hitch angle detection apparatus 130 can be a device that is physically mounted on a hitch component of the vehicle 100 and/or a mating hitch component of the trailer 110 for determining an angle between centerline longitudinal axes of the vehicle 100 and the trailer 110. The hitch angle detection apparatus 130 can be configured for detecting a jackknife enabling condition and/or related information (e.g., when a hitch angle threshold has been met).

The power steering assist control module 135 provides the trailer backup assist control module 120 with information relating to a rotational position (e.g., angle) of the steering wheel angle and/or a rotational position (e.g., turning angle(s)) of steered wheels of the vehicle 100. In certain embodiments, the trailer backup assist control module 120 can be an integrated component of the power steering assist system 115. For example, the power steering assist control module 135 can include a trailer backup assist algorithm for generating vehicle steering information as a function of all or a portion of information received from the trailer backup steering input apparatus 125, the hitch angle detection apparatus 130, the power steering assist control module 135, the brake system control module 145, and the powertrain control module 150.

The brake system control module 145 provides the trailer backup assist control module 120 with information relating to vehicle speed. Such vehicle speed information can be determined from individual wheel speeds as monitored by the brake system control module 145 or may be provided by an engine control module with signal plausibility. Vehicle speed may also be determined from an engine control module. In some instances, individual wheel speeds can also be used to determine a vehicle yaw rate and such yaw rate can be provided to the trailer backup assist control module 120 for use in determining the vehicle steering information. In certain embodiments, the trailer backup assist control module 120 can provide vehicle braking information to the brake system control module 145 for allowing the trailer backup assist control module 120 to control braking of the vehicle 100 during backing of the trailer 110. For example, using the trailer backup assist control module 120 to regulate speed of the vehicle 100 during backing of the trailer 110 can reduce the potential for unacceptable trailer backup conditions. Examples of unacceptable trailer backup conditions include, but are not limited to, a vehicle over speed condition, a high hitch angle rate, trailer angle dynamic instability, a calculated theoretical trailer jackknife condition (defined by a maximum vehicle steering angle, drawbar length, tow vehicle wheelbase and an effective trailer length), or physical contact jackknife limitation (defined by an angular displacement limit relative to the vehicle 100 and the trailer 110), and the like. It is disclosed herein that the backup assist control module 120 can issue a signal corresponding to a notification (e.g., a warning) of an actual, impending, and/or anticipated unacceptable trailer backup condition.

The powertrain control module 150 interacts with the trailer backup assist control module 120 for regulating speed and acceleration of the vehicle 100 during backing of the trailer 110. As mentioned above, regulation of the speed of the vehicle 100 is necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

Steering Input Apparatus

Figure 2:
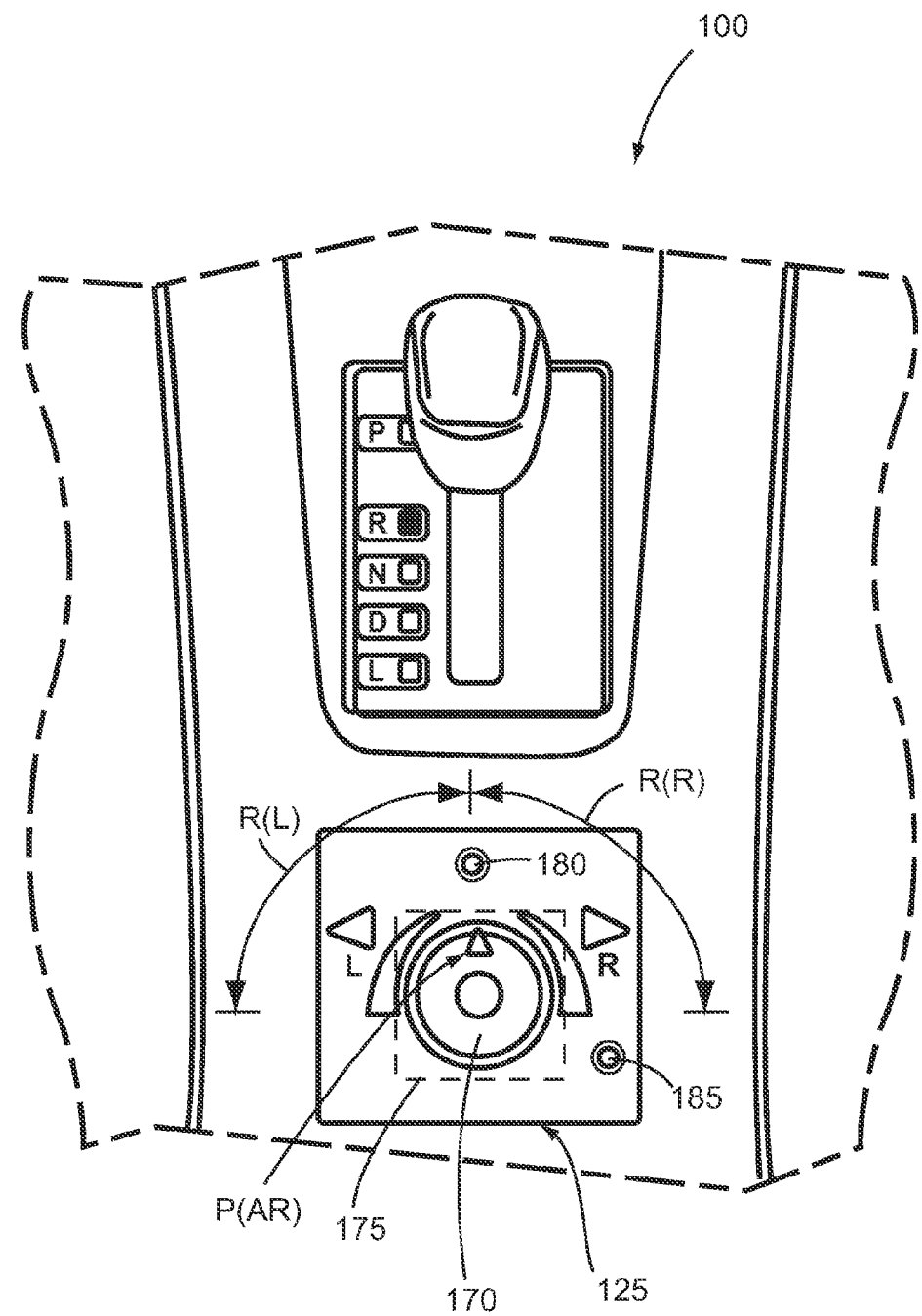
FIG. 2 shows one embodiment of the trailer backup steering input apparatus discussed in reference to FIG. 1.

Referring now to FIG. 2, an embodiment of the trailer backup steering input apparatus 125 discussed in reference to FIG. 1 is shown. A rotatable control element in the form of a knob 170 is coupled to a movement sensing device 175. The knob 170 is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the knob 170, a force that biases the knob 170 toward the at-rest position P(AR) can increase (e.g., non-linearly) as a function of the amount of rotation of the knob 170 with respect to the at-rest position P(AR). Additionally, the knob 170 can be configured with position indicating detents such that the driver can positively feel the at-rest position P(AR) and feel the ends of the opposing rotational ranges of motion R(L), R(R) approaching (e.g., soft end stops).

The movement sensing device 175 is configured for sensing movement of the knob 170 and outputting a corresponding signal (i.e., movement sensing device signal) to the trailer assist backup input apparatus 125 shown in FIG. 1. The movement sensing device signal is generated as a function of an amount of rotation of the knob 170 with respect to the at-rest position P(AR), a rate movement of the knob 170, and/or a direction of movement of the knob 170 with respect to the at-rest position P(AR). As will be discussed below in greater detail, the at-rest position P(AR) of the knob 170 corresponds to a movement sensing device signal indicating that the vehicle 100 should be steered such that the trailer 110 is backed along a substantially straight path (zero trailer curvature request from the driver) as defined by a centerline longitudinal axis of the trailer 110 when the knob 170 was returned to the at-rest position P(AR) and a maximum clockwise and anti-clockwise position of the knob 170 (i.e., limits of the opposing rotational ranges of motion R(R), R(L)) each correspond to a respective movement sensing device signal indicating a tightest radius of curvature (i.e., most acute trajectory) of a path of travel of the trailer 110 that is possible without the corresponding vehicle steering information causing a jackknife condition. In this regard, the at-rest position P(AR) is a zero curvature commanding position with respect to the opposing rotational ranges of motion R(R), R(L). It is disclosed herein that a ratio of a commanded curvature of a path of a trailer (e.g., radius of a trailer trajectory) and a corresponding amount of rotation of the knob can vary (e.g., non-linearly) over each one of the opposing rotational ranges of motion P(L), P(R) of the knob 170. It is also disclosed therein that the ratio can be a function of vehicle speed, trailer geometry, vehicle geometry, hitch geometry and/or trailer load.

Use of the knob 170 decouples trailer steering inputs from being made at a steering wheel of the vehicle 100. In use, as a driver of the vehicle 100 backs the trailer 110, the driver can turn the knob 170 to indicate a desired curvature of a path of the trailer 110 to follow and returns the knob 170 to the at-rest position P(AR) for causing the trailer 110 to be backed along a straight line. Accordingly, in embodiments of trailer backup assist systems where the steering wheel remains physically coupled to the steerable wheels of a vehicle during backup of an attached trailer, a rotatable control element configured in accordance with the disclosed subject matter (e.g., the knob 170) provides a simple and user-friendly means of allowing a driver of a vehicle to input trailer steering commands.

It is disclosed herein that a rotational control input device configured in accordance with embodiments of the disclosed subject matter (e.g., the knob 170 and associated movement sensing device) can omit a means for being biased to an at-rest position between opposing rotational ranges of motion. Lack of such biasing allows a current rotational position of the rotational control input device to be maintained until the rotational control input device is manually moved to a different position. Preferably, but not necessarily, when such biasing is omitted, a means is provided for indicating that the rotational control input device is positioned in a zero curvature commanding position (e.g., at the same position as the at-rest position in embodiments where the rotational control input device is biased). Examples of means for indicating that the rotational control input device is positioned in the zero curvature commanding position include, but are not limited to, a detent that the rotational control input device engages when in the zero curvature commanding position, a visual marking indicating that the rotational control input device is in the zero curvature commanding position, an active vibratory signal indicating that the rotational control input device is in or approaching the zero curvature commanding position, an audible message indicating that the rotational control input device is in of approaching the zero curvature commanding position, and the like.

It is also disclosed herein that embodiments of the disclosed subject matter can be configured with a control input device that is not rotational (i.e., a non-rotational control input device). Similar to a rotational control input device configured in accordance with embodiments of the disclosed subject matter (e.g., the knob 170 and associated movement sensing device), such a non-rotational control input device is configured to selectively provide a signal causing a trailer to follow a path of travel segment that is substantially straight and to selectively provide a signal causing the trailer to follow a path of travel segment that is substantially curved. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input path of travel commands, or joystick type input and the like.

The trailer backup steering input apparatus 125 can be configured to provide various feedback information to a driver of the vehicle 100. Examples of situation that such feedback information can include, but are not limited to, a status of the trailer backup assist system 105 (e.g., active, in standby (e.g., when driving forward to reduce the hitch angle and zero hitch angle to remove bias), faulted, inactive, etc.), that a curvature limit has been reached (i.e., maximum commanded curvature of a path of travel of the trailer 110), and/or a graphical representation of the vehicle and trailer orientation state. To this end, the trailer backup steering input apparatus 125 can be configured to provide a tactile feedback signal (e.g., a vibration through the knob 170) as a warning if any one of a variety of conditions occur. Examples of such conditions include, but are not limited to, the trailer 110 approaching jackknife, the trailer backup assist system 105 has had a failure, the trailer backup assist system 105 has detected a fault, the trailer backup assist system 105 or other system of the vehicle 100 has predicted a collision on the present path of travel of the trailer 110, the trailer backup system 105 has restricted a commanded curvature of a trailer's path of travel (e.g., due to excessive speed or acceleration of the vehicle 100), and the like. Still further, it is disclosed that the trailer backup steering input apparatus 125 can use illumination (e.g., an LED 180) and/or an audible signal output (e.g., an audible output device 185 or through attached vehicle audio speakers) to provide certain feedback information (e.g., notification/warning of an unacceptable trailer backup condition).

Figure 3:
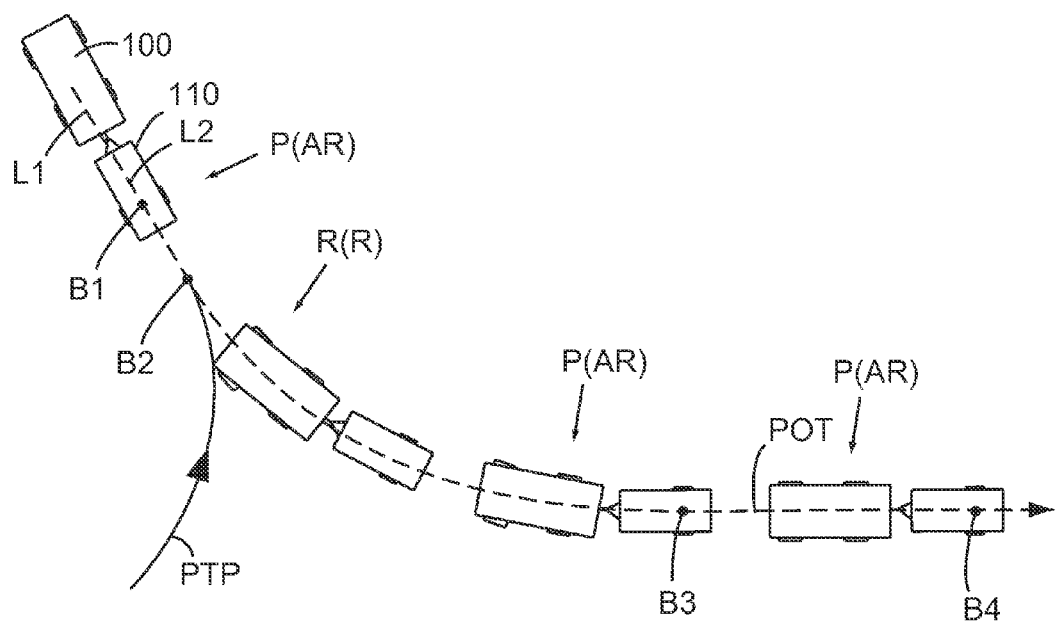
FIG. 3 shows an example of a trailer backup sequence implemented using the trailer backup steering input apparatus discussed in reference to FIG. 2.

Referring now to FIGS. 2 and 3, an example of using the trailer backup steering input apparatus 125 for dictating a curvature of a path of travel (POT) of a trailer (i.e., the trailer 110 shown in FIG. 1) while backing up the trailer with a vehicle (i.e., the vehicle 100 in FIGS. 1 and 2) is shown. In preparation of backing the trailer 110, the driver of the vehicle 100 drives the vehicle 100 forward along a pull-thru path (PTP) to position the vehicle 100 and trailer 110 at a first backup position B1. In the first backup position B1, the vehicle 100 and trailer 110 are longitudinally aligned with each other such that a longitudinal centerline axis L1 of the vehicle 100 is aligned with (e.g., parallel with or coincidental with) a longitudinal centerline axis L2 of the trailer 110. It is disclosed herein that such alignment of the longitudinal axes L1, L2 at the onset of an instance of trailer backup functionality is not a requirement for operability of a trailer backup assist system configured in accordance with the disclosed subject matter.

After activating the trailer backup assist system 105 (e.g., before, after, or during the pull-thru sequence), the driver begins to back the trailer 110 by reversing the vehicle 100 from the first backup position B1. So long as the knob 170 of the trailer backup steering input apparatus 125 remains in the at-rest position P(AR), the trailer backup assist system 105 will steer the vehicle 100 as necessary for causing the trailer 110 to be backed along a substantially straight path of travel as defined by the longitudinal centerline axis L2 of the trailer 110 at the time when backing of the trailer 110 began. When the trailer reaches the second backup position B2, the driver rotates the knob 170 to command the trailer 110 to be steered to the right (i.e., a knob position R(R) clockwise rotation). Accordingly, the trailer backup assist system 105 will steer the vehicle 100 for causing the trailer 110 to be steered to the right as a function of an amount of rotation of the knob 170 with respect to the at-rest position P(AR), a rate movement of the knob 170, and/or a direction of movement of the knob 170 with respect to the at-rest position P(AR). Similarly, the trailer 110 can be commanded to steer to the left by rotating the knob 170 to the left. When the trailer reaches backup position B3, the driver allows the knob 170 to return to the at-rest position P(AR) thereby causing the trailer backup assist system 105 to steer the vehicle 100 as necessary for causing the trailer 110 to be backed along a substantially straight path of travel as defined by the longitudinal centerline axis L2 of the trailer 110 at the time when the knob 170 was returned to the at-rest position P(AR). Thereafter, the trailer backup assist system 105 steers the vehicle 100 as necessary for causing the trailer 110 to be backed along this substantially straight path to the fourth backup position B4. In this regard, arcuate portions of a path of travel POT of the trailer 110 are dictated by rotation of the knob 170 and straight portions of the path of travel POT are dictated by an orientation of the centerline longitudinal axis L2 of the trailer when the knob 170 is in/returned to the at-rest position P(AR).

In order to activate the trailer backup assist system described above in FIGS. 1-3, the driver interacts with the trailer backup assist system and the trailer backup assist system interacts with the vehicle environment. The trailer backup assist system automatically steers as the driver reverses the vehicle. As discussed above, the driver controls the trailer trajectory by using a steering knob to input desired trailer curvature. The trailer backup assist algorithm determines the vehicle steering angle to achieve the desired trailer curvature, and the driver controls the throttle and brake while the trailer backup assist system controls the steering.

Figure 4:
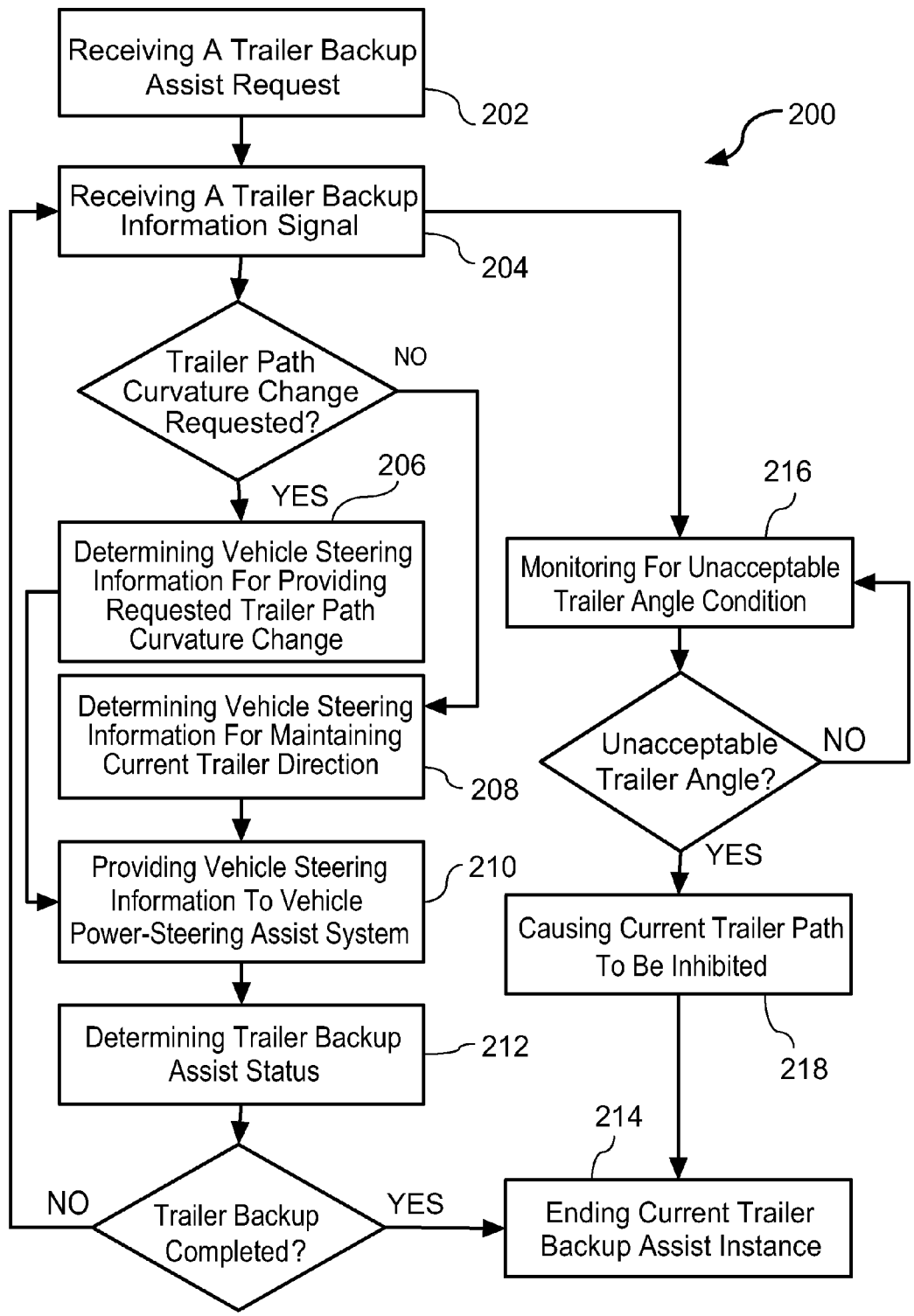
FIG. 4 shows a method for implementing trailer backup assist functionality in accordance with an embodiment.

FIG. 4 shows a method 200 for implementing trailer backup assist functionality in accordance with one embodiment. In a preferred embodiment, the method 200 for implementing trailer backup assist functionality can be carried out using the trailer backup assist architecture discussed above in reference to the vehicle 100 and trailer 110 of FIG. 1. Accordingly, trailer steering information is provided through use of a rotational control input device (e.g., the knob 170 discussed in reference to FIG. 2).

An operation 202 is performed for receiving a trailer backup assist request. Examples of receiving the trailer backup assist request include activating the trailer backup assist system and providing confirmation that the vehicle and trailer are ready to be backed. After receiving a trailer backup assist request (i.e., while the vehicle is being reversed), an operation 204 is performed for receiving a trailer backup information signal. Examples of information carried by the trailer backup information signal include, but are not limited to, information from the trailer backup steering input apparatus 125, information from the hitch angle detection apparatus 130, information from the power steering assist control module 135, information from the brake system control module 145, and information from the powertrain control module 150. It is disclosed herein that information from the trailer backup steering input apparatus 125 preferably includes trailer path curvature information characterizing a desired curvature for the path of travel of the trailer, such as provided by the trailer backup steering input apparatus 125 discussed above in reference to FIGS. 1 and 2. In this manner, the operation 204 for receiving the trailer backup information signal can include receiving trailer path curvature information characterizing the desired curvature for the path of travel of the trailer.

If the trailer backup information signal indicates that a change in curvature of the trailer's path of travel is requested (i.e., commanded via the knob 170), an operation 206 is performed for determining vehicle steering information for providing the requested change in curvature of the trailer's path of travel. Otherwise, an operation 208 is performed for determining vehicle steering information for maintaining a current straight-line heading of the trailer (i.e., as defined by the longitudinal centerline axis of the trailer). Thereafter, an operation 210 is performed for providing the vehicle steering information to a power steering assist system of the vehicle, followed by an operation 212 being performed for determining the trailer backup assist status. If it is determined that trailer backup is complete, an operation 214 is performed for ending the current trailer backup assist instance. Otherwise the method 200 returns to the operation 204 for receiving trailer backup information. Preferably, the operation for receiving the trailer backup information signal, determining the vehicle steering information, providing the vehicle steering information, and determining the trailer backup assist status are performed in a monitoring fashion (e.g., at a high rate of speed of a digital data processing device). Accordingly, unless it is determined that reversing of the vehicle for backing the trailer is completed (e.g., due to the vehicle having been successfully backed to a desired location during a trailer backup assist instance, the vehicle having to be pulled forward to begin another trailer backup assist instance, etc.), the method 200 will continually be performing the operations for receiving the trailer backup information signal, determining the vehicle steering information, providing the vehicle steering information, and determining the trailer backup assist status.

It is disclosed herein that the operation 206 for determining vehicle steering information for providing the requested change in curvature of the trailer's path of travel preferably includes determining vehicle steering information as a function of trailer path curvature information contained within the trailer backup information signal. As will be discussed below in greater detail, determining vehicle steering information can be accomplished through a low order kinematic model defined by the vehicle and the trailer. Through such a model, a relationship between the trailer path curvature and commanded steering angles of steered wheels of the vehicle can be generated for determining steering angle changes of the steered wheels for achieving a specified trailer path curvature. In this manner, the operation 206 for determining vehicle steering information can be configured for generating information necessary for providing trailer path curvature control in accordance with the disclosed subject matter.

In some embodiments of the disclosed subject matter, the operation 210 for providing the vehicle steering information to the power steering assist system of the vehicle causes the steering system to generate a corresponding steering command as a function of the vehicle steering information. The steering command is interpretable by the steering system and is configured for causing the steering system to move steered wheels of the steering system for achieving a steered angle as specified by the vehicle steering information. Alternatively, the steering command can be generated by a controller, module or computer external to the steering system (e.g., a trailer backup assist control module) and be provided to the steering system.

In parallel with performing the operations for receiving the trailer backup information signal, determining the vehicle steering information, providing the vehicle steering information, and determining the trailer backup assist status, the method 200 performs an operation 216 for monitoring the trailer backup information for determining if an unacceptable trailer backup condition exists. Examples of such monitoring include, but are not limited to assessing a hitch angle to determine if a hitch angle threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from wheel speed information obtained from one or more wheel speed sensors of the vehicle. If it is determined that an unacceptable trailer backup condition exists, an operation 218 is performed for causing the current path of travel of the trailer to be inhibited (e.g., stopping motion of the vehicle), followed by the operation 214 being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations 204-212. Otherwise, the method can proceed to operation 214 for ending the current trailer backup assist instance. In conjunction with performing the operation 214 for ending the current trailer backup assist instance, an operation can be performed for controlling movement of the vehicle to correct or limit a jackknife condition (e.g., steering the vehicle, decelerating the vehicle, limiting magnitude and/or rate of driver requested trailer curvature input, limiting magnitude and/or rate of the steering command, and/or the like to preclude the hitch angle from being exceeded).

Curvature Control Algorithm

Turning now to a discussion of a kinematic model used to calculate a relationship between a curvature of a path of travel of a trailer and the steering angle of a vehicle towing the trailer, a low order kinematic model can be desirable for a trailer backup assist system configured in accordance with some embodiments. To achieve such a low order kinematic model, certain assumptions are made with regard to parameters associated with the vehicle/trailer system. Examples of such assumptions include, but are not limited to, the trailer being backed by the vehicle at a relatively low speed, wheels of the vehicle and the trailer having negligible (e.g., no) slip, tires of the vehicle having negligible (e.g., no) lateral compliance, tires of the vehicle and the trailer having negligible (e.g., no) deformation, actuator dynamics of the vehicle being negligible, the vehicle and the trailer exhibiting negligible (e.g., no) roll or pitch motions.

Figure 5:
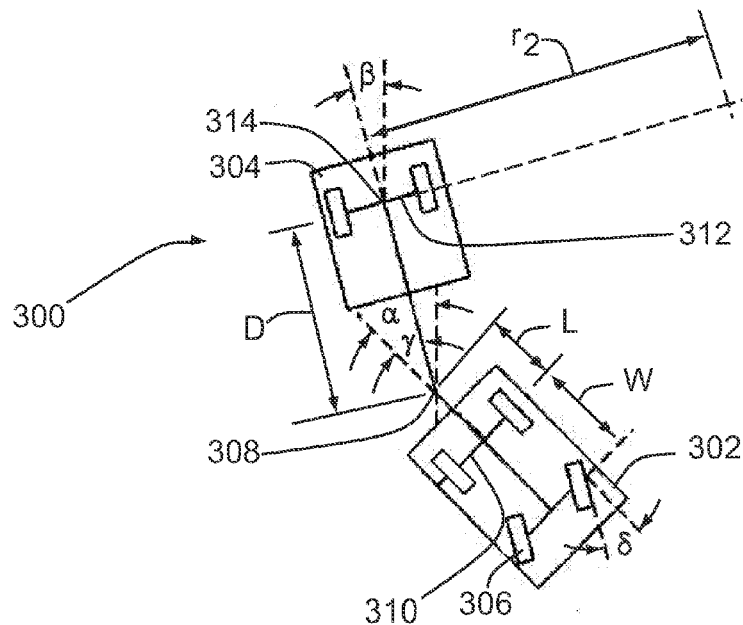
FIG. 5 is a diagrammatic view showing a kinematic model configured for providing information utilized in providing trailer backup assist functionality in accordance with one embodiment.

As shown in FIG. 5, for a system defined by a vehicle 302 and a trailer 304, the kinematic model 300 is based on various parameters associated with the vehicle 302 and the trailer 304. These kinematic model parameters include:

$\delta$: steering angle at steered front wheels 306 of the vehicle 302;

$\alpha$: yaw angle of the vehicle 302;

$\beta$: yaw angle of the trailer 304;

$\gamma$: hitch angle ($\gamma=\beta-\alpha$);

W: wheel base of the vehicle 302;

L: length between hitch point 308 and rear axle 310 of the vehicle 302;

D: length between hitch point 308 and axle length 312 of the trailer 304 (axle length 312 may be an effective, or equivalent, axle length for a trailer having a multiple axle configuration; and $r_2$: curvature radius for the trailer 304.

The kinematic model 300 of FIG. 5 reveals a relationship between trailer path radius of curvature $r_2$ at the midpoint 314 of an axle 312 of the trailer 304, steering angle $\delta$ of the steered wheels 306 of the vehicle 302, and the hitch angle $\gamma$. As shown in the equation below, this relationship can be expressed to provide the trailer path curvature $\kappa_2$ such that, if $\gamma$ is given, the trailer path curvature $\kappa_2$ can be controlled based on regulating the steering angle δ (where $\dot{β}$ is trailer yaw rate and $\dot{η}$ is trailer velocity).

$$κ_2 = \frac{1}{r_2} = \frac{\dot{β}}{\dot{η}} = \frac{\left(W + \frac{KV^2}{g}\right)\sinγ + L\cosγ\tanδ}{D\left(\left(W + \frac{KV^2}{g}\right)\cosγ - L\sinγ\tanδ\right)}$$

Or, this relationship can be expressed to provide the steering angle δ as a function of trailer path curvature $κ_2$ and hitch angle γ.

$$δ = \tan^{-1}\left(\frac{\left(W + \frac{KV^2}{g}\right)[κ_2 D\cosγ - \sinγ]}{DLκ_2\sinγ + L\cosγ}\right) = F(γ, κ_2, K)$$

Accordingly, for a particular vehicle and trailer combination, certain kinematic model parameters (e.g., D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle and trailer-specific kinematic model parameters can be inputted by a driver of the vehicle. Trailer path curvature $κ_2$ is determined from the driver input via a trailer backup steering input apparatus. Through the use of the equation for providing steering angle, a corresponding steering command can be generated for controlling a steering system (e.g., an actuator thereof) of the vehicle.

Figure 6:
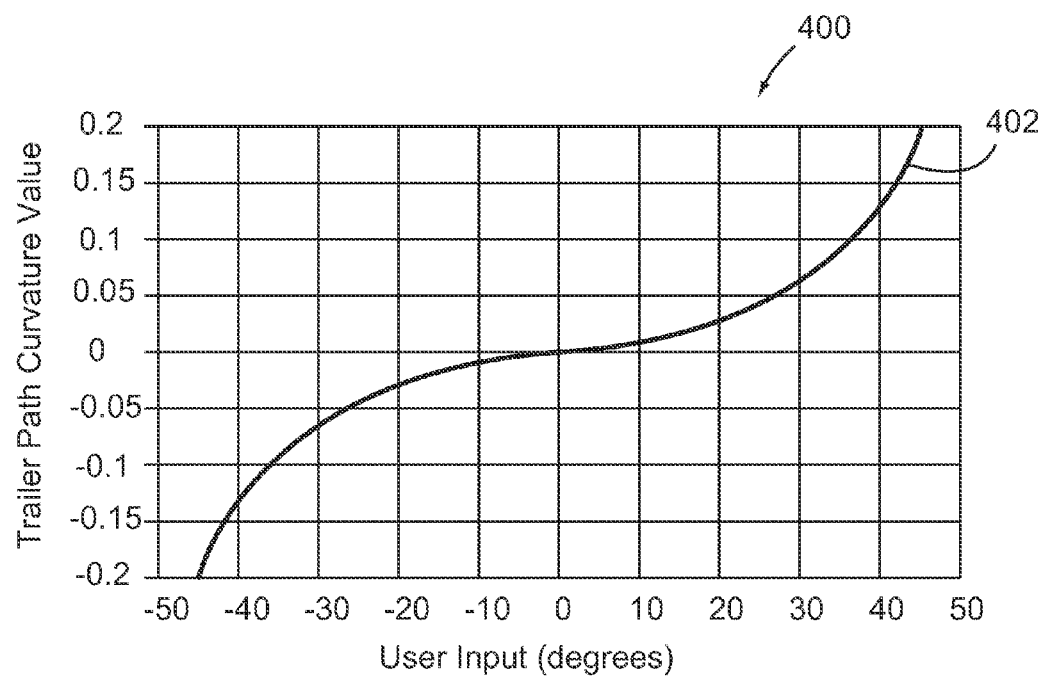
FIG. 6 is a graph showing an example of a trailer path curvature function plot for a rotary-type trailer backup steering input apparatus configured in accordance with the disclosed subject matter.

FIG. 6 shown an example of a trailer path curvature function plot 400 for a rotary-type trailer backup steering input apparatus (e.g., the trailer backup steering input apparatus 125 discussed above in reference to FIGS. 1 and 2). A value representing trailer path curvature (e.g., trailer path curvature κ2) is provided as an output signal from the rotary-type trailer backup steering input apparatus as a function of user input movement. In this example, a curve 402 specifying trailer path curvature relative to user input (e.g., amount of rotation) at a rotary input device (e.g., a knob) is defined by a cubic function. However, a skilled person will appreciate that embodiments of the disclosed subject matter are not limited to any particular function between a magnitude and/or rate of input at a trailer backup steering input apparatus (e.g., knob rotation) and a resulting trailer path curvature value.

Jackknife Detection

Referring to FIG. 5, in preferred embodiments of the disclosed subject matter, it is desirable to limit the potential for the vehicle 302 and the trailer 304 to attain a jackknife angle (i.e., the vehicle/trailer system achieving a jackknife condition). A jackknife angle γ(j) refers to a hitch angle γ that while backing cannot be overcome by the maximum steering input for a vehicle such as, for example, the steered front wheels 306 of the vehicle 302 being moved to a maximum steered angle δ at a maximum rate of steering angle change. The jackknife angle γ(j) is a function of a maximum wheel angle for the steered wheel 306 of the vehicle 302, the wheel base W of the vehicle 302, the distance L between hitch point 308 and the rear axle 310 of the vehicle 302, and the length D between the hitch point 308 and the effective axle 312 of the trailer 304 when the trailer has multiple axles. The effective axle 312 may be the actual axle for a single axle trailer or an effective axle location for a trailer with multiple axles. When the hitch angle γ for the vehicle 302 and the trailer 304 achieves or exceeds the jackknife angle γ(j), the vehicle 302 must be pulled forward to reduce the hitch angle γ. Thus, for limiting the potential for a vehicle/trailer system attaining a jackknife angle, it is preferable to control the yaw angle of the trailer while keeping the hitch angle of the vehicle/trailer system relatively small.

Figure 7:
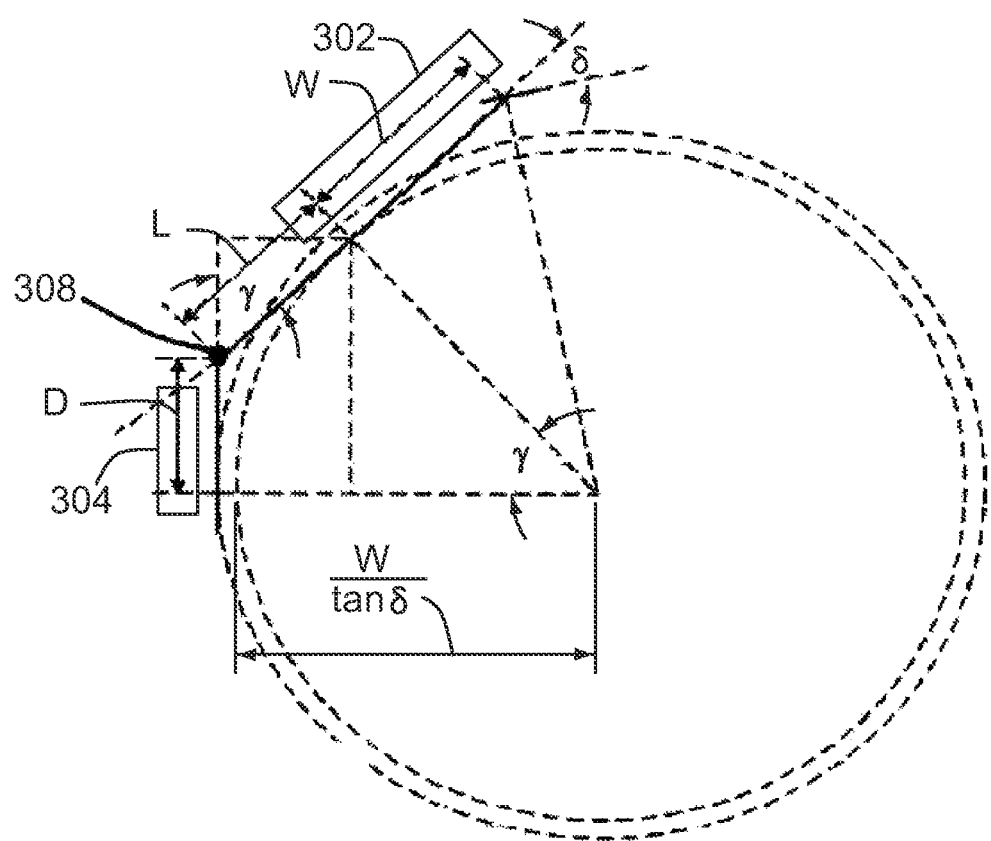
FIG. 7 is a diagrammatic view showing a relationship between hitch angle and steered angle as it relates to determining a jackknife angle for a vehicle/trailer system in reverse or backing up.

Referring to FIGS. 5 and 7, a steering angle limit for the steered front wheels 306 requires that the hitch angle γ cannot exceed the jackknife angle γ(j), which is also referred to as a critical hitch angle. Thus, under the limitation that the hitch angle γ cannot exceed the jackknife angle γ(j), the jackknife angle γ(j) is the hitch angle γ that maintains a circular motion for the vehicle/trailer system when the steered wheels 306 are at a maximum steering angle δ(max). The steering angle for circular motion with hitch angle is defined by the following equation.

$$\tanδ_{max} = \frac{w\sinγ_{max}}{D + L\cosγ_{max}}$$

Solving the above equation for hitch angle allows jackknife angle γ(j) to be determined. This solution, which is shown in the following equation, can be used in implementing trailer backup assist functionality in accordance with the disclosed subject matter for monitoring hitch angle in relation to jackknife angle.

$$\cos\bar{γ} = \frac{-b ± \sqrt{b^2 - 4ac}}{2a}$$

where, a=$L^2$ $\tan^2$ δ(max)+$W^2$;

b=2 LD $\tan^2$ δ(max); and c=$D^2$ $\tan^2$ δ(max)−$W^2$.

In certain instances of backing a trailer, a jackknife enabling condition can arise based on current operating parameters of a vehicle in combination with a corresponding hitch angle. This condition can be indicated when one or more specified vehicle operating thresholds are met while a particular hitch angle is present. For example, although the particular hitch angle is not currently at the jackknife angle for the vehicle and attached trailer, certain vehicle operating parameters can lead to a rapid (e.g., uncontrolled) transition of the hitch angle to the jackknife angle for a current commanded trailer path curvature and/or can reduce an ability to steer the trailer away from the jackknife angle. One reason for a jackknife enabling condition is that trailer curvature control mechanisms (e.g., those in accordance with the disclosed subject matter) generally calculate steering commands at an instantaneous point in time during backing of a trailer. However, these calculations will typically not account for lag in the steering control system of the vehicle (e.g., lag in a steering EPAS controller). Another reason for the jackknife enabling condition is that trailer curvature control mechanisms generally exhibit reduced steering sensitivity and/or effectiveness when the vehicle is at relatively high speeds and/or when undergoing relatively high acceleration.

Jackknife Countermeasures

Figure 8:
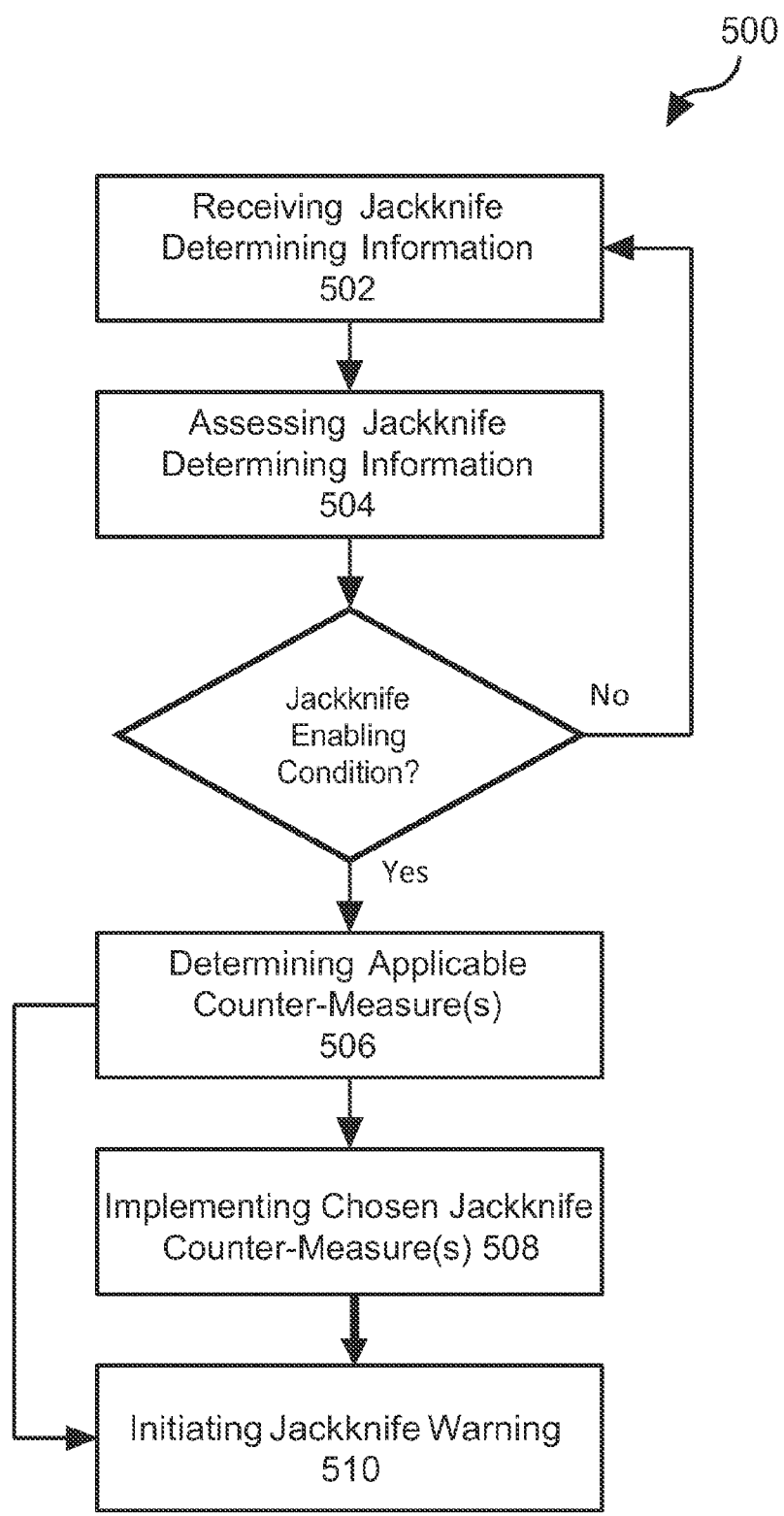
FIG. 8 shows a method for implementing jackknife countermeasures functionality in accordance with an embodiment.

FIG. 8 shows a method 500 for implementing jackknife countermeasures functionality in accordance with an embodiment of the disclosed subject matter for a vehicle and attached trailer. Trailer backup assist functionality in accordance with the disclosed subject matter can include jackknife countermeasures functionality. Alternatively, jackknife countermeasures functionality in accordance with one embodiment can be implemented separately from other aspects of trailer backup assist functionality.

The method 500 begins when operation 502 is performed for receiving jackknife determining information characterizing a jackknife enabling condition of the vehicle-trailer combination at a particular point in time (e.g., at the point in time when the jackknife determining information was sampled). Examples of the jackknife determining information includes, but are not limited to, information characterizing a hitch angle, information characterizing a vehicle accelerator pedal transient state, information characterizing a speed of the vehicle, information characterizing longitudinal acceleration of the vehicle, information characterizing a brake torque being applied by a brake system of the vehicle, information characterizing a powertrain torque being applied to driven wheels of the vehicle, and information characterizing the magnitude and rate of driver requested trailer curvature. The operation 502 for receiving jackknife determining information can be the first operation in a sampling process where jackknife determining information is sampled upon initiation of an instance of implementing jackknife countermeasures functionality. In this regard, jackknife determining information would be continually monitored such as, for example, by an electronic control unit (ECU) that carries out trailer backup assist (TBA) functionality. As discussed above in reference to FIG. 5, a kinematic model representation of the vehicle and the trailer can be used to determine a jackknife angle for the vehicle-trailer combination. However, the disclosed subject matter is not unnecessarily limited to any specific approach for determining the jackknife angle.

After receiving the jackknife determining information, an operation 504 is performed for assessing the jackknife determining information for determining if the vehicle-trailer combination attained the jackknife enabling condition at the particular point in time. The objective of the operation 504 for assessing the jackknife determining information is determining if a jackknife enabling condition has been attained at the point in time defined by the jackknife determining information. If it is determined that a jackknife enabling condition is not present at the particular point in time, the method 500 returns to the operation 502 for receiving another instance of the jackknife determining information. If it is determined that a jackknife enabling condition is present at the particular point in time, an operation 506 is performed for determining an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still other embodiment, a predefined countermeasure or predefined set of countermeasures may be the applicable countermeasure(s).

The objective of a countermeasure in the context of the disclosed subject matter (i.e., a jackknife reduction countermeasure) is to alleviate a jackknife enabling condition. To this end, such a countermeasure can be configured to alleviate the jackknife enabling condition using a variety of different strategies. In a vehicle speed sensitive countermeasure strategy, actions taken for alleviating the jackknife enabling condition can include overriding and/or limiting driver requested trailer radius of curvature (e.g., being requested via a trailer backup steering input apparatus configured in accordance with the disclosed subject matter) as a function of vehicle speed (e.g., via a lookup table correlating radius of curvature limits to vehicle speed as shown in FIG. 6). In a countermeasure strategy where trailer curvature requests are limited as a function of speed and driver curvature command transient rates, actions taken for alleviating the jackknife enabling condition can include rate limiting trailer curvature command transients as requested by a driver above a predefined vehicle speed whereas, under the predefined vehicle speed, the as-requested trailer curvature are not rate limited. In a torque limiting countermeasure strategy, actions taken for alleviating the jackknife enabling condition can include application of full available powertrain torque being inhibited when the jackknife enabling condition is present while the vehicle is above a predefined speed and application of full available powertrain torque being allowed when the vehicle speed is reduced below the predefined speed while in the torque inhibiting mode. As opposed to a fixed predefined speed, the torque limiting countermeasure strategy can utilize a speed threshold that is a function of hitch angle (i.e., speed threshold inversely proportional to hitch angle acuteness). In a driver accelerator pedal transient detection countermeasure strategy, actions taken for alleviating the jackknife enabling condition can include overriding and/or limiting driver requested trailer radius of curvature as a function of transient accelerator pedal requests (e.g., requested trailer radius of curvature limited when a large accelerator pedal transient is detected). In a hitch angle rate sensitive countermeasure strategy, actions taken for alleviating the jackknife enabling condition can include using hitch angle rate in a predefined or calculated mapping with current hitch angle position to limit driver requested trailer radius of curvature. Accordingly, in view of the disclosures made herein, a skilled person will appreciate that embodiments of the disclosed subject matter are not unnecessarily limited to a countermeasure strategy of any particular configuration.

As disclosed above, implementation of trailer backup assist functionality in accordance with the disclosed subject matter can utilize a kinematic model for determining steering control information, jackknife enabling conditions, and jackknife angle. Such a kinematic model has many parameters than can influence trailer curvature control effectiveness. Examples of these parameters include, but are not limited to, the vehicle wheelbase, understeer gradient gain, vehicle track width, maximum steer angle at the vehicle front wheels, minimum turning radius of vehicle, maximum steering rate able to be commanded by the steering system, hitch ball to trailer axle length, and vehicle rear axle to hitch ball length. Sensitivity analysis for a given kinematic model can be used to provide an understanding (e.g., sensitivity) of the relationships between such parameters, thereby providing information necessary for improving curvature control performance and for reducing the potential for jackknife enabling conditions. For example, through an understanding of the sensitivity of the parameters of a kinematic model, scaling factors can be used with speed dependent jackknife countermeasures to reduce jackknife potential (e.g., for special applications such as short wheelbase conditions).

Still referring to FIG. 8, after determining the applicable countermeasure(s), an operation 508 is performed for implementing the chosen jackknife countermeasure(s) and an operation 510 is performed for initiating a jackknife warning. As discussed above in regard to countermeasure strategies, implementing the jackknife countermeasure(s) can include commanding a speed controlling system of the vehicle to transition to an altered state of operation in which a speed of the vehicle is reduced, commanding the steering control system of the vehicle to transition to an altered state of operation in which a radius of curvature of a path of the trailer is increased, command the steering control system of the vehicle to transition to an altered state of operation in which a decrease in the radius of the curvature of the path of the trailer is inhibited, commanding a brake control system of the vehicle to apply brake torque to reduce vehicle speed/inhibit vehicle acceleration, and/or commanding a powertrain control system of the vehicle to inhibit full available powertrain torque from being delivered to driven wheels of the vehicle until another jackknife enabling parameter (e.g., vehicle speed) is below a defined threshold. In certain embodiments of the disclosed subject matter, the jackknife warning is provided to the driver using at least one vehicle control system through which the jackknife countermeasure is implemented. Speed reduction, in addition to applying the brakes, can be accomplished by any number of means such as, for example, limiting throttle inputs (e.g., via a terrain management feature) and/or transitioning a transmission to a reverse low gear if the vehicle is equipped with a multi-range reverse gear transmission. Examples of such system-specific warning approach include, but are not limited to, providing a warning through an accelerator pedal of the vehicle (e.g., via haptic feedback) if the countermeasure includes limiting speed of the vehicle and/or providing a warning through an input element (e.g., knob) of a trailer backup steering input apparatus of the vehicle (e.g., via haptic feedback if the countermeasure includes limiting driver requested trailer radius of curvature), through haptic seat vibration warning, through a visual warning (e.g., through a visual display apparatus of the towing vehicle) and/or through audible warnings (e.g., through an audio output apparatus of the towing vehicle), or the like. One embodiment of utilizing warnings relating to vehicle speed as it relates to onset or presence of a jackknife enabling condition includes implementation of a dual stage warning. For example, when a backing speed of the vehicle increases sufficiently for causing a speed of the vehicle to reach a lower (i.e., first) speed threshold during backing of the trailer, a driver of the vehicle would be provided with a first warning indication (e.g., via haptic, audible, and/or visual means as implemented by the trailer backup assist system) for informing the driver that there is the need to reduce the speed of the vehicle to alleviate or preclude the jackknife enabling condition. If the driver does not correspondingly respond by causing a speed of the vehicle to be reduced (or not to further increase) and the vehicle continues to gain speed such that it passes a higher (i.e., a second) speed threshold, the driver of the vehicle would be provided with a second warning indication (e.g., a more severe haptic, audible, and/or visual means as implemented by the trailer backup assist system) for informing the driver that there is an immediate need to reduce the speed of the vehicle to alleviate or preclude the jackknife enabling condition. The first and/or the second speed indication warnings can be implemented in conjunction with a respective speed limiting countermeasure measures (e.g., the trailer backup assist system causing activation of a brake system of the vehicle and/or reducing a throttle position of the vehicle).

Human Machine Interface

In order to implement the control features discussed above with respect to methods described in FIG. 5 and FIG. 8, a driver must interact with the trailer backup assist system 105 to configure the system 105. The vehicle 100 is also equipped, as shown in FIG. 9, with a human machine interface (HMI) device 102 to implement trailer backup assist functionality through driver interaction with the HMI device 102.

Figure 9:
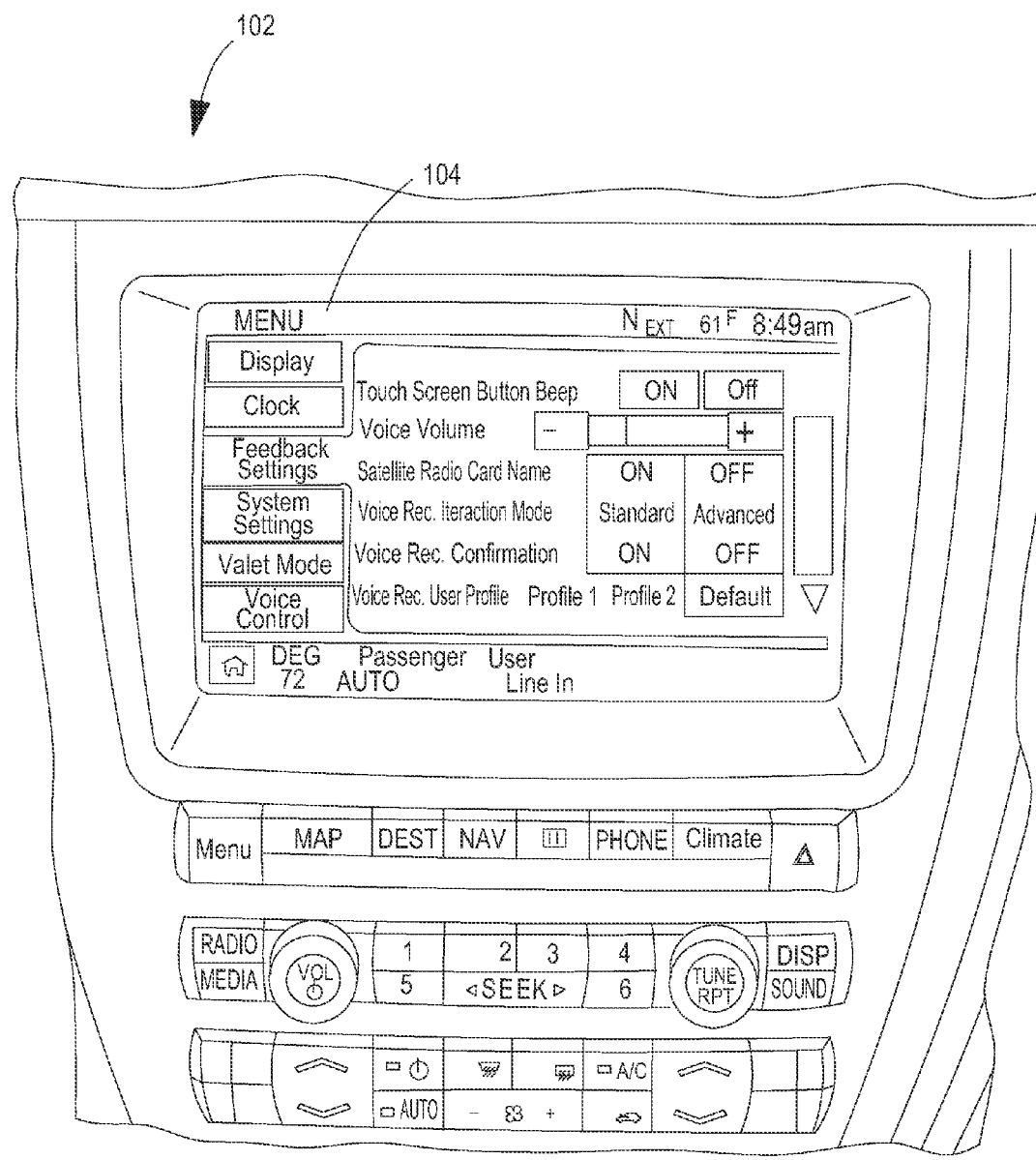
FIG. 9 shows a human machine interface (HMI) device associated with the trailer backup assist.

FIG. 9 shows an example of an HMI device 102 in the vehicle that a driver uses to interact with the trailer backup assist system 105. The driver is presented with multiple menus 104 (only one example menu is shown in FIG. 9) displayed by way of the HMI 102. The HMI menus 104 assist the driver through modules (shown in FIGS. 10 and 11) that setup 600, calibrate 700, and activate 800 the trailer backup assist system 105 so that control methods 200, 500 may be implemented to assist the driver with the backup of the trailer shown generally as a flow diagram in FIGS. 10 and 11, and to be discussed in greater detail later herein. Each module is directed to particular elements, or features, which are used to configure the trailer backup assist system to accurately implement control methods 200, 500. While each module is described with reference to particular features of the disclosed subject matter, it should be noted that each module is not necessarily limited to the particular features described in the examples herein. It is possible to rearrange the modules or to replace elements or features of a module without departing from the scope of the disclosed subject matter.

Figure 10:
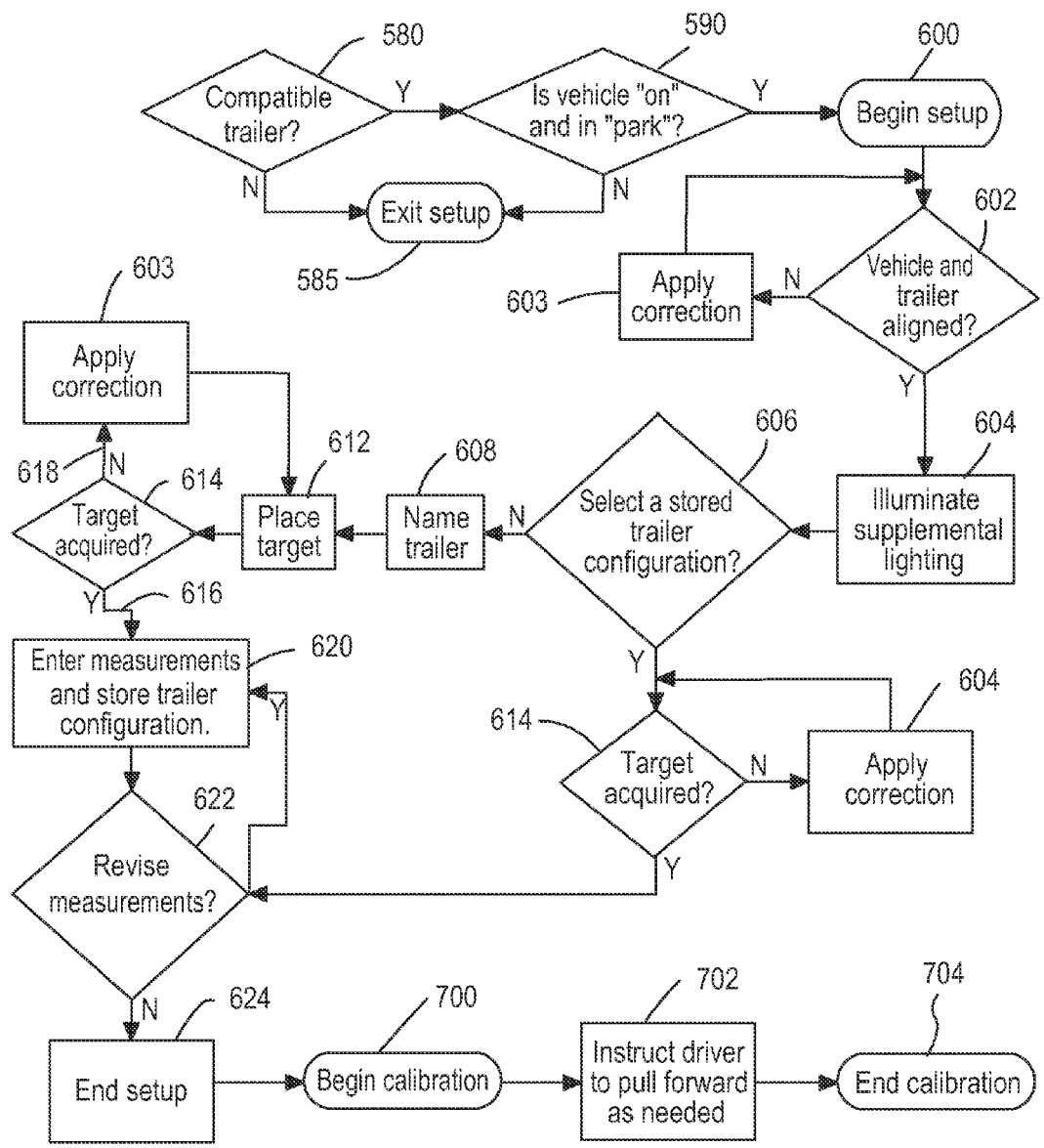
FIG. 10 shows a flow diagram associated with the trailer backup assist.
Figure 11:
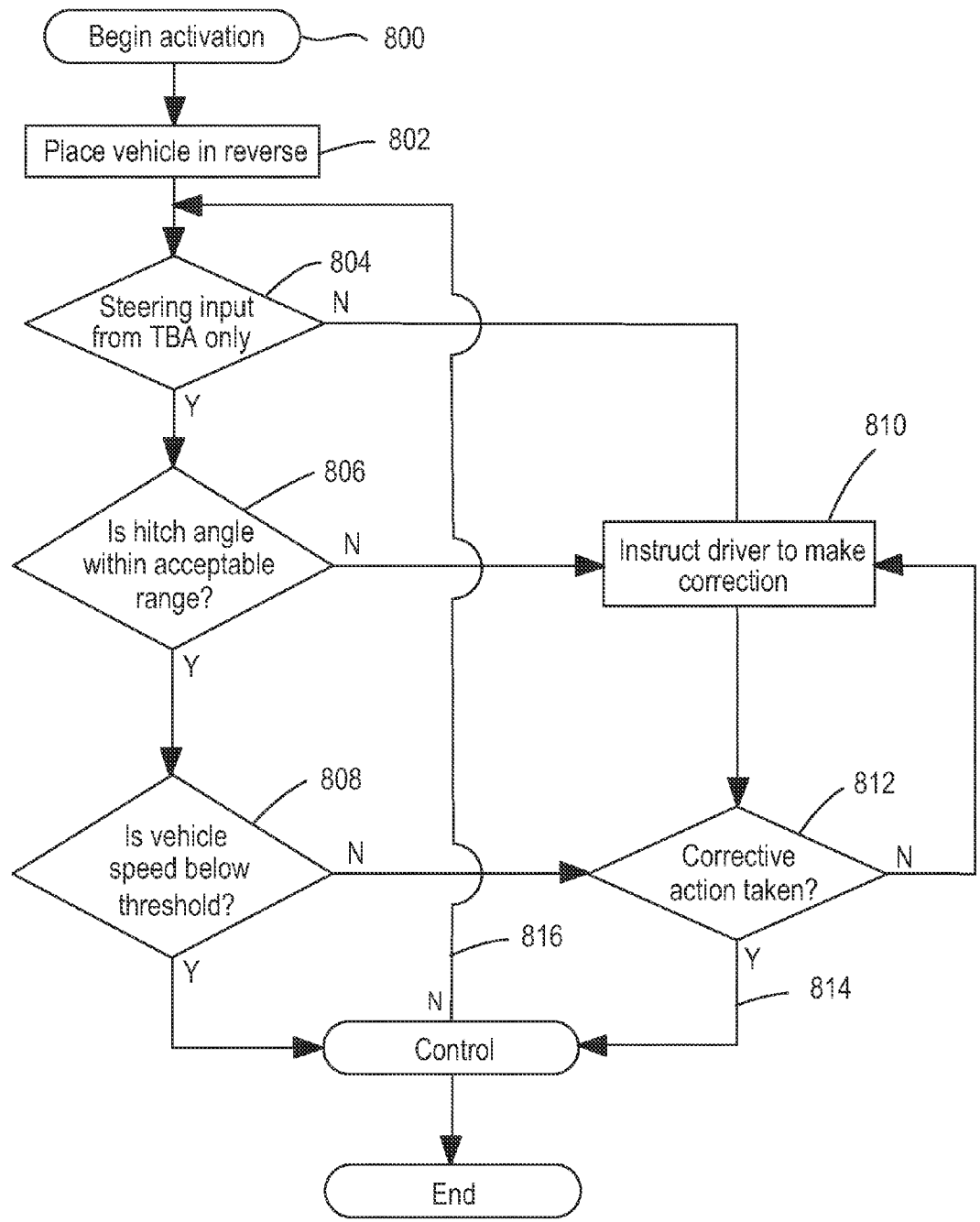
FIG. 11 shows a flow diagram of the setup module according to one embodiment.

The trailer backup assist system 105 will guide a driver through the steps necessary to connect a trailer and attach a target. The driver may activate the setup by way of the backup steering input apparatus 125, for example by turning or pushing the rotary knob, or my merely making a selection for the trailer backup assist system from a menu on the HMI device 102. Referring to FIG. 10, a driver initiates the trailer backup assist system through the trailer backup assist steering input apparatus. In the case of a rotary knob, the driver presses or rotates the knob to initiate the trailer backup assist system. The system will guide the driver through the steps of connecting 580 a compatible trailer 110. A compatible trailer is one that pivots at a single point relative to the vehicle and behind the rear axle of the vehicle.

Once the system is selected by either the trailer backup steering input apparatus 125 or the HMI device 102, the system will guide the driver to prepare the vehicle and vehicle trailer combination as necessary. The vehicle 100 should be turned "on" and the vehicle 100 should be in "park" 590. In the event the vehicle 100 is on but is traveling at a speed that is greater than a predetermined limit, for example five miles per hour, the trailer backup assist system 105 will become inactive and inaccessible to the driver. The trailer backup assist system 105 setup module 600 will not begin or will be exited 585. If the type of trailer 110 selected by the driver is a trailer 110 that is not compatible with the trailer backup assist system 105, the setup module 600 will be exited 585 or will not begin. In the event, the trailer 110 is compatible with the trailer backup assist system 105, the setup module 600 verifies that the vehicle 100 gear shift mechanism is in "park." Again, in the event the vehicle is not "on" and the gear shift mechanism is not on "park," the setup module will not begin 585.

Upon connection 580 of a compatible trailer 110, the vehicle 100 being "on" 590 and the vehicle 100 being in "park" 590, the HMI 102 will present a menu 104 that has a "Towing" mode option to be selected by the driver. The driver selects "Towing" mode and a menu 104 is presented that provides a "Trailer Options" selection. The driver then selects a "Trailer Options" mode from the "Towing" menu. The driver is prompted to either "add a trailer" or "select a trailer" from a menu 104 presented on the HMI device and the "Setup" module 600 has begun. For certain camera-based hitch angle detection systems, an operation 602 is performed wherein a warning menu may be presented to the driver, by way of the HMI, informing the driver that the trailer must be in a straight line, meaning there is no angle at the hitch between the vehicle and the trailer. The warning indicates that the driver may need to take corrective action, for example, pull the vehicle forward in order to align the trailer and the vehicle as required for the setup 600. A generic or static graphic may be presented by way of the HMI 102 to assist the driver in visually recognizing the alignment between the trailer 110 and the vehicle 100 that is necessary in order to properly setup and calibrate the trailer backup assist system 105. The driver applies any corrections 603 in that the driver makes any necessary adjustment he has been alerted to and indicates, by acknowledging that corrective actions have been applied 603 and that the trailer is in line with the vehicle. Other hitch angle detection systems may not need the driver to straighten the trailer during setup mode.

To aid the driver in the setup process, the reverse back lights, or any other supplemental lighting that may be available on the vehicle, are illuminated 604. In the event the trailer is a new trailer, one that has not been attached to the vehicle before or has not been previously stored in the trailer backup assist system, the driver is presented 606 with an option to either name the trailer or select a previously stored trailer configuration. Naming the trailer 608 allows the trailer to be easily identified the next time it is attached to the vehicle so that the driver does not have to repeat the setup process. The driver either enters a unique name to identify the trailer that is to be stored in the trailer backup assist system or selects a previously stored trailer configuration associated with the attached trailer. The trailer backup assist system will not allow more than one trailer to have the same name. Therefore, if a driver attempts to name a trailer using a name that has already been applied to a previously stored trailer configuration, the HMI will display a message to the driver indicating so and requesting the driver enter a different name for the trailer configuration. In the case where a previously stored trailer configuration is available and selected 610 by the driver, certain steps in the setup process may be skipped.

The following discussion is directed to a first time trailer configuration for a camera-based hitch angle detection system. The driver is instructed 612 to place a hitch angle target on the trailer that is used for calibration purposes. A generic static image may be displayed on the HMI that provides direction to the driver as to placement of a target on the trailer that is used for hitch angle detection. The target placement is dependent upon the type of trailer being towed and therefore, options may be presented to the driver to aid the driver in selecting an appropriate trailer type. The static image may indicate areas that are acceptable for target placement as well as areas that are unacceptable for target placement. The static image indicating the appropriate areas for attaching the target may be an overlay of the rear view of the trailer hitch. Once the driver attaches the target to the trailer and indicates by way of the HMI that the target has been attached to the trailer the setup mode provides 614 visual feedback to the driver identifying that the target has been located, or acquired. The driver acknowledges 616, by way of the HMI, that the target has been properly identified by the trailer backup assist system. Similarly, for a previously stored trailer configuration, the trailer will already have a target placed thereon. The trailer backup assist system will acquire the target and provide 614 visual feedback to the driver confirming acquisition of the target.

In the event the target is not acquired 614 after a predetermined amount of time lapses, the driver is notified 618 of the need to reposition the target and presented with possible corrective measures that may be taken. Possible corrective measures may be presented to the driver such as cleaning the camera lens, cleaning the target, replacing the target if it has been damaged or faded, pulling the vehicle-trailer combination forward to improve lighting conditions around the camera and/or target, and moving the target to an acceptable location. The driver applies the necessary corrections 603. As mentioned above, some hitch angle detection systems may not require the driver to attach a target to the trailer during set up mode. The target and acquisition of the target are directed to camera-based hitch angle detection systems.

Figure 12:
FIG. 12 shows an example of an image displayed at the HMI device in accordance with one embodiment.

When the target is acquired 614 by the trailer backup assist system and the driver has acknowledged 616 the acquisition, the driver is then prompted through a series of menus to input 620 trailer measurement information that may be stored in the trailer backup assist system for a trailer configuration that is to be associated with the named trailer. The next time the same trailer is attached to the vehicle, its unique trailer configuration will already be stored and progress through the setup module will be faster or, in some cases, may be skipped entirely. Generic static images may be displayed at the HMI screen in order to assist the driver with the measurement information. Visual examples, see FIG. 12, may be provided to aid the driver in identifying the location on the vehicle, the trailer or between the vehicle and trailer that the driver is being prompted to enter. In addition, numerical limits for the driver entered measurements are set within the trailer backup assist system and may be displayed to the driver. The driver may be warned about entered measurements that exceed the numerical limits. Additionally, the measurement information requests that the driver is prompted to enter may be presented to the driver in the order that the measurements should be entered into the trailer backup assist system.

It should be noted that while measurement information is discussed above as being entered by the driver, various methods of entering measurement information may also be employed without departing from the scope of the disclosed subject matter. For example, a system to automatically detect measurements using existing vehicle and trailer data including, but not limited to, vehicle speed, wheel rotation, steering wheel angle, vehicle to trailer relative angle, and a rate of change of the vehicle to hitch angle.

Examples of the measurement information may include a horizontal distance from the rear of the vehicle to the center of a hitch ball, a horizontal distance from the rear of the vehicle to a center of the target, a vertical distance from the target to the ground, and a horizontal offset of the target from a centerline of the hitch ball. In the event the target is attached at other than the centerline of the hitch ball, then the trailer backup assist system must know which side of the vehicle the target is attached to, the passenger side or the driver side. A menu on the HMI may be presented for the driver to indicate passenger side or driver side for the placement of the target. The trailer backup assist system also needs to know the horizontal distance from the rear of the vehicle to a center of the axle or axles of the trailer. The measurements may be entered in either English or metric units.

The driver is presented 622 with the option to revise any of the measurements before proceeding with the setup process. Otherwise, the setup module 600 is complete 624 and the calibration module 700 begins.

The calibration module 700 is designed to calibrate the curvature control algorithm with the proper trailer measurements and calibrate the trailer backup assist system for any hitch angle offset that may be present. After completing the setup module 600, the calibration module begins 700 and the driver is instructed 702 to pull the vehicle-trailer combination straight forward until a hitch angle sensor calibration is complete. The HMI may notify 704 the driver, by way of a pop up or screen display that the vehicle-trailer combination needs to be pulled forward until calibration is complete. When calibration is complete, the HMI may notify 704 the driver. Any hitch angle offset value is stored 706 in memory, accessed as necessary by the curvature control algorithm, and the calibration module 700 ends 704.

It should be noted that while hitch angle calibration is described above as may be requesting the driver pull forward information, various other methods of hitch angle calibration may also be employed without departing from the scope of the embodiment.

Upon completion of the setup module 600 and the calibration module 700, the activation module 800 may begin. The activation module 800 is described with reference to FIG. 11. The activation module 800 is designed to activate automatic steering of the vehicle during trailer backup assist operations. The driver is instructed 802 to place the vehicle in reverse. Upon activation of the trailer backup assist system, the steering system will not accept any steering angle commands from any source other than the trailer backup assist system 804. The trailer setup 600 and calibration 700 modules must be completed and a current hitch angle must be within a predetermined operating range for the trailer backup assist system 806. The vehicle speed must also be less than a predetermined activation speed 808. In the event any one, or all, of these conditions 804, 806, 808 are not met, the driver is prompted to apply a corrective measure 810. The driver must confirm 814 that the corrective action has been taken in order for the control module to begin. If a corrective action is taken, but the activation module deems it unacceptable, the driver will be instructed 810 to try another corrective action.

For steering systems where the steering wheel is directly coupled to the steered wheels of the vehicle, the driver cannot engage with the steering wheel during trailer backup assist. If any steering wheel motion is obstructed, by the driver or otherwise, the trailer backup assist system will present instructions 810 to the driver to remove their hands from the steering wheel. Activation 800 will be suspended or discontinued until the obstruction is removed. If the vehicle speed exceeds a threshold speed or if the vehicle hitch angle is not acceptable, the driver will be prompted 810 to take corrective action. Until corrective action is taken, accepted and acknowledged, the activation 800 and control 200, 500 modules will be interrupted.

When the driver moves the gear shift from "park" to "reverse" 802 and presses or turns a trailer backup steering input apparatus 125 a rear view camera image may appear in a display of the HMI. If at any time during the reversing process the hitch angle becomes too large for the system to control the curvature of the trailer, the TBA will provide a warning to the driver to pull forward to reduce the hitch angle. If at any time during the reversing process the system is unable to track the hitch angle target, the driver is presented with instructions to correct the problem. If at any time the vehicle speed exceeds that predetermined activation speed, the driver is visually and audibly warned to stop or slow down.

When all of the conditions of the activation module are met and maintained, the control module may begin. The control module executes the directives described above with reference to FIGS. 5 and 7. However, the activation module 800 includes a monitoring function 816 so that, if at any time during execution of the control module 200, 500 the control is interrupted, the driver is instructed to make necessary corrections. In the event any one of the necessary corrections is not made, the control of the vehicle by way of the trailer backup assist system will end. The driver may also intentionally end the control by exiting the system through a menu selection on the HMI or placing the vehicle in a gear setting that is other than park or reverse.

Referring now to instructions processable by a data processing device, it will be understood from the disclosures made herein that methods, processes and/or operations adapted for carrying out trailer backup assist functionality as disclosed herein are tangibly embodied by non-transitory computer readable medium having instructions thereon that are configured for carrying out such functionality. The instructions are tangibly embodied for carrying out the method 200, 500, 600, 700 and 800 disclosed and discussed above and can be further configured for limiting the potential for a jackknife condition such as, for example, by monitoring jackknife angle through use of the equations discussed in reference to FIGS. 5 and 7 and/or by implementing jackknife countermeasures functionality discussed above in reference to FIG. 8. The instructions may be accessible by one or more data processing devices from a memory apparatus (e.g. RAM, ROM, virtual memory, hard drive memory, etc.), from an apparatus readable by a drive unit of a data processing system (e.g., a diskette, a compact disk, a tape cartridge, etc.) or both. Accordingly, embodiments of computer readable medium in accordance with the disclosed subject matter include a compact disk, a hard drive, RAM or other type of storage apparatus that has imaged thereon a computer program (i.e., instructions) configured for carrying out trailer backup assist functionality in accordance with the disclosed subject matter.

In a preferred embodiment of the disclosed subject matter, a trailer backup assist control module (e.g., the trailer backup assist control module 120 discussed above in reference to FIG. 1) comprises such a data processing device, such a non-transitory computer readable medium, and such instructions on the computer readable medium for carrying out trailer backup assist functionality (e.g., in accordance with the method 200 discussed above in reference to FIG. 2) and/or the method 500 discussed above in reference to FIG. 8 and/or the methods 600, 700 and 800 discussed above in reference to FIGS. 10 and 11. To this end, the trailer backup assist control module can comprise various signal interfaces for receiving and outputting signals. For example, a jackknife enabling condition detector can include a device providing hitch angle information and hitch angle calculating logic of the trailer backup assist control module. A trailer backup assist control module in the context of the disclosed subject matter can be any control module of an electronic control system that provides for trailer backup assist control functionality in accordance with the disclosed subject matter. Furthermore, it is disclosed herein that such a control functionality can be implemented within a standalone control module (physically and logically) or can be implemented logically within two or more separate but interconnected control modules (e.g., of an electronic control system of a vehicle) In one example, trailer backup assist control module in accordance with the disclosed subject matter is implemented within a standalone controller unit that provides only trailer backup assist functionality. In another example, trailer backup assist functionality in accordance with the disclosed subject matter is implemented within a standalone controller unit of an electronic control system of a vehicle that provides trailer backup assist functionality as well as one or more other types of system control functionality of a vehicle (e.g., anti-lock brake system functionality, steering power assist functionality, etc.). In still another example, trailer backup assist functionality in accordance with the disclosed subject matter is implemented logically in a distributed manner whereby a plurality of control units, control modules, computers, or the like (e.g., an electronic control system) jointly carry out operations for providing such trailer backup assist functionality.

Trailer Target Placement and Monitoring

The vehicle trailer backup assist system may utilize a target placed on the trailer to serve as the hitch angle detection component 155. In doing so, the trailer backup assist system may employ information acquired via image acquisition and processing of the target for use in the hitch angle detection apparatus 130, according to one embodiment. According to other embodiments, the target may be used to identify if a connected trailer has changed, trailer connection or disconnection, and other trailer related information. The target is an identifiable visual target that can be captured in an image by the video imaging camera and detected and processed via image processing. According to one embodiment, the target may include an adhesive target, also referred to as a sticker, that may be adhered via adhesive on one side onto the trailer, preferably within a target placement zone, such that the camera and image processing may detect the target and its location on the trailer to determine trailer related information, such as the hitch angle between the trailer and the towing vehicle. The trailer backup assist system may provide to the user one or more image(s) of the trailer target zone for proper placement of the target to assist with placement of the target on the trailer. Additionally, the vehicle trailer backup assist system may monitor the target to determine if the target has been correctly placed within a desired target placement zone and provide feedback alert(s) to the user. Further, the trailer backup assist system may monitor the trailer connection by monitoring the target to determine if the target has moved to determine whether the same trailer remains connected to the tow vehicle, and may initiate action in response thereto. Further, the trailer backup assist system may monitor the hitch angle or the target to determine if the trailer may have been changed out (i.e., disconnected and replaced with another trailer), and may initiate action in response thereto.

Figure 13:
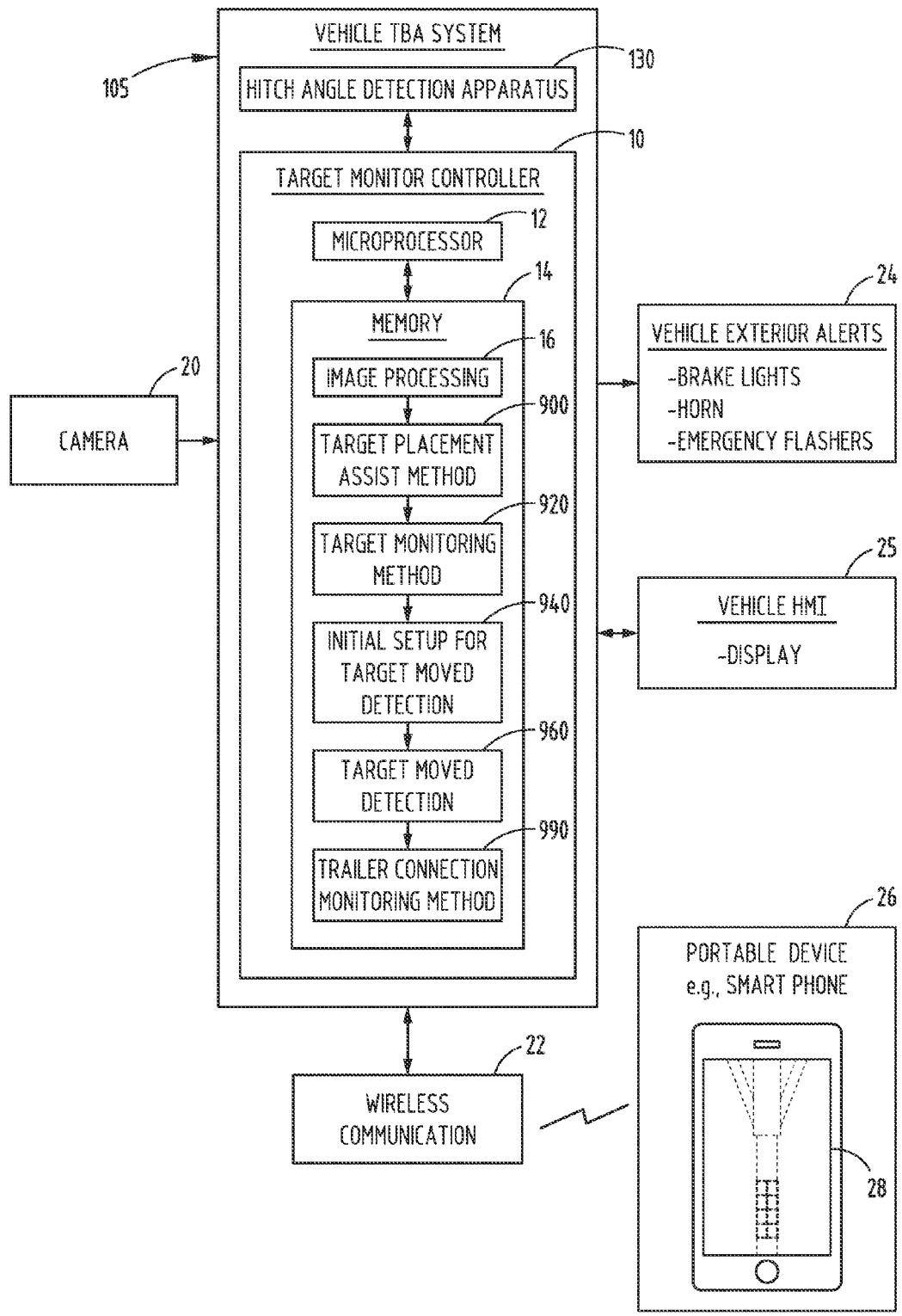
FIG. 13 is a block diagram illustrating the vehicle trailer backup assist system employing a target monitor controller, according to one embodiment.

Referring to FIG. 13, the vehicle trailer backup assist system 105 is shown including the hitch angle detection apparatus 130 and a target monitor controller 10 for monitoring the target, assisting with placement of the target, monitoring connection of the trailer, determining if the trailer has moved, and initiating certain actions. The target monitor controller 10 may include a microprocessor 12 and/or other analog and/or digital circuitry for processing one or more routines. Additionally, the target monitor controller 10 may include memory 14 for storing one or more routines including image processing routine(s) 16, a target placement assist routine 900, a target monitoring routine 920, an initial setup for target moved detection routine 940, a target moved detection routine 960, and a trailer connection monitoring routine 990. It should be appreciated that the target monitor controller 10 may be a standalone dedicated controller or may be a shared controller integrated with other control functions, such as integrated with the hitch angle detection apparatus 130, to process the images of the trailer and target and perform related functionality. In one embodiment, the hitch angle detection apparatus 130 processes the acquired images of the target from the target monitor controller 10 and other information such as trailer length for use in determining the hitch angle between the trailer and the towing vehicle.

A camera 20 is shown as an input for providing video images to the target monitor controller 10 of the vehicle trailer backup assist system 105. The camera 20 may be a rearview camera mounted on the tow vehicle in a position and orientation to acquire images of the trailer towed by the vehicle rearward of the vehicle. The camera 20 may include an imaging camera that generates one or more camera images of the trailer including the region where a target placement zone is expected to be located on the trailer. The camera 20 may include a video imaging camera that repeatedly captures successive images of the trailer for processing by the target monitor controller 10. The target monitor controller 10 processes the one or more images from the camera 20 with one or more image processing routine(s) 16 to identify the target and its location on the trailer. The target monitor controller 10 further processes the processed images in connection with one or more of routines 900, 920, 940, 960 and 990.

The trailer monitor controller 10 may communicate with one or more devices including vehicle exterior alerts 24 which may include vehicle brake lights and vehicle emergency flashers for providing a visual alert and a vehicle horn for providing an audible alert. Additionally, the trailer monitor controller may communicate with one or more vehicle human machine interfaces (HMIs) 25 including a vehicle display such as a center stack mounted navigation/entertainment display. Further, the trailer monitor controller 10 may communicate via wireless communication 22 with one or more handheld or portable devices 26, such as one or more smartphones. The portable device 26 may include a display 28 for displaying one or more images and other information to a user. The portable device 26 may display one or more images of the trailer and the target location within a desired target placement zone on display 28. In addition, the portable device 26 may provide feedback information about the vehicle target connection including visual and audible alerts.

Figure 14:
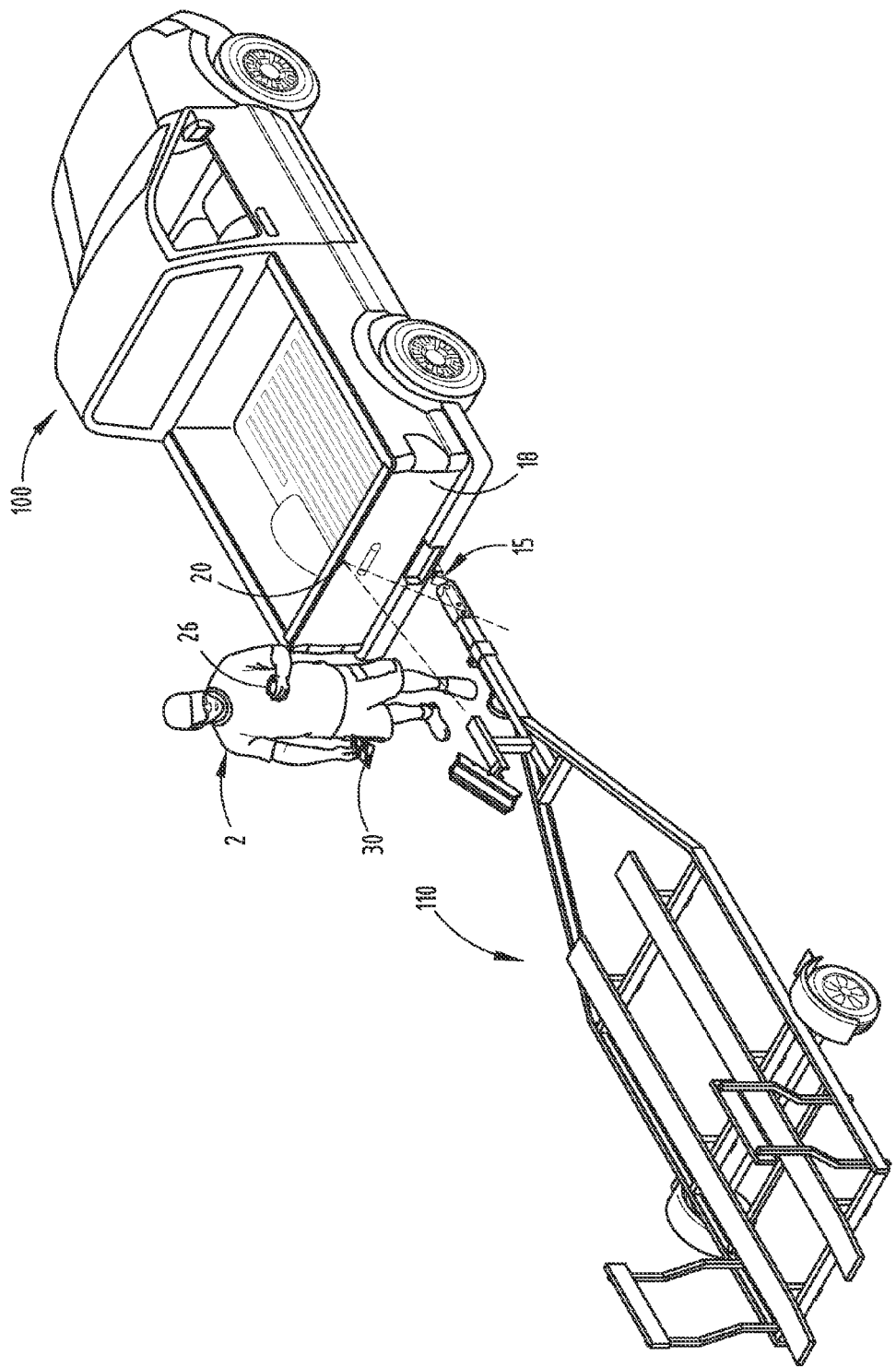
FIG. 14 is a schematic diagram illustrating user placement of the target on a trailer towed by a vehicle.
Figure 15:
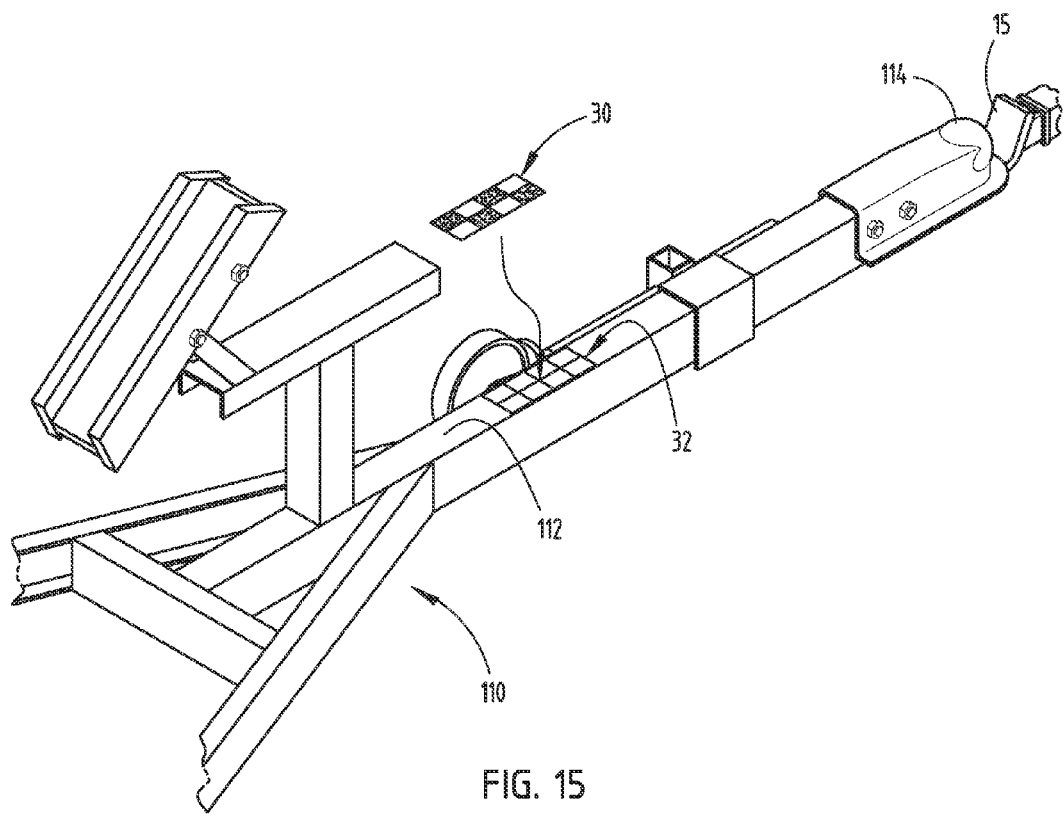
FIG. 15 is an enlarged view of the front portion of the trailer further illustrating the target placement zone in relation to the target sticker.

Referring to FIGS. 14-17, the placement of the target 30 onto trailer 110 using the target monitor controller 10 processing the target placement assist routine 900 is illustrated according to one exemplary embodiment. In FIGS. 14 and 15, a tow vehicle 100 is shown towing a trailer 110. The trailer 110 has a trailer hitch connector in the form of a coupler assembly 114 connected to a vehicle hitch connector in the form of a receiver hitch and ball 15. The coupler assembly 114 latches onto the hitch ball 15 to provide a pivoting ball joint. The trailer 110 is shown having a frame including a longitudinally extending bar or trailer tongue 112. A top horizontal surface of trailer tongue 112 is shown providing a desired target placement zone 32 for receiving the target 30. It should be appreciated that the trailer 110 may be configured in various shapes and sizes and may offer one or more other suitable target placement zones 32 for receiving the target 30. The target placement zone 32 defines the desired location for placement of the target 30.

The vehicle 100 is equipped with a video imaging camera 20 shown located in an upper region of the vehicle tailgate at the rear of the vehicle 100. The video imaging camera 20 is elevated relative to the target placement zone(s) and has an imaging field of view and is located and oriented to capture one or more images of the trailer 110 including a region containing one or more desired target placement zone(s). It should be appreciated that one or more cameras may be located at other locations on the vehicle 100 to acquire images of the trailer 110 and the target placement zone(s) 32.

In order to utilize a target on a trailer that is not currently equipped with a suitable pre-existing target, a user 2 may be instructed or directed to place the target 30 onto the trailer 110 within a desired target placement zone 32 so that the camera 20 may capture one or more images of the target 30 to determine trailer related information for the trailer backup assist system, such as hitch angle information for the hitch angle detection apparatus 130. In doing so, a user 2 may be prompted by an audible or visual message on an HMI such as the vehicle HMI 25 or portable device 26 to place the target 30 on the trailer 110. The vehicle HMI 25 may include visual and/or audible outputs generating instructions for proper target placement.

Figure 17:
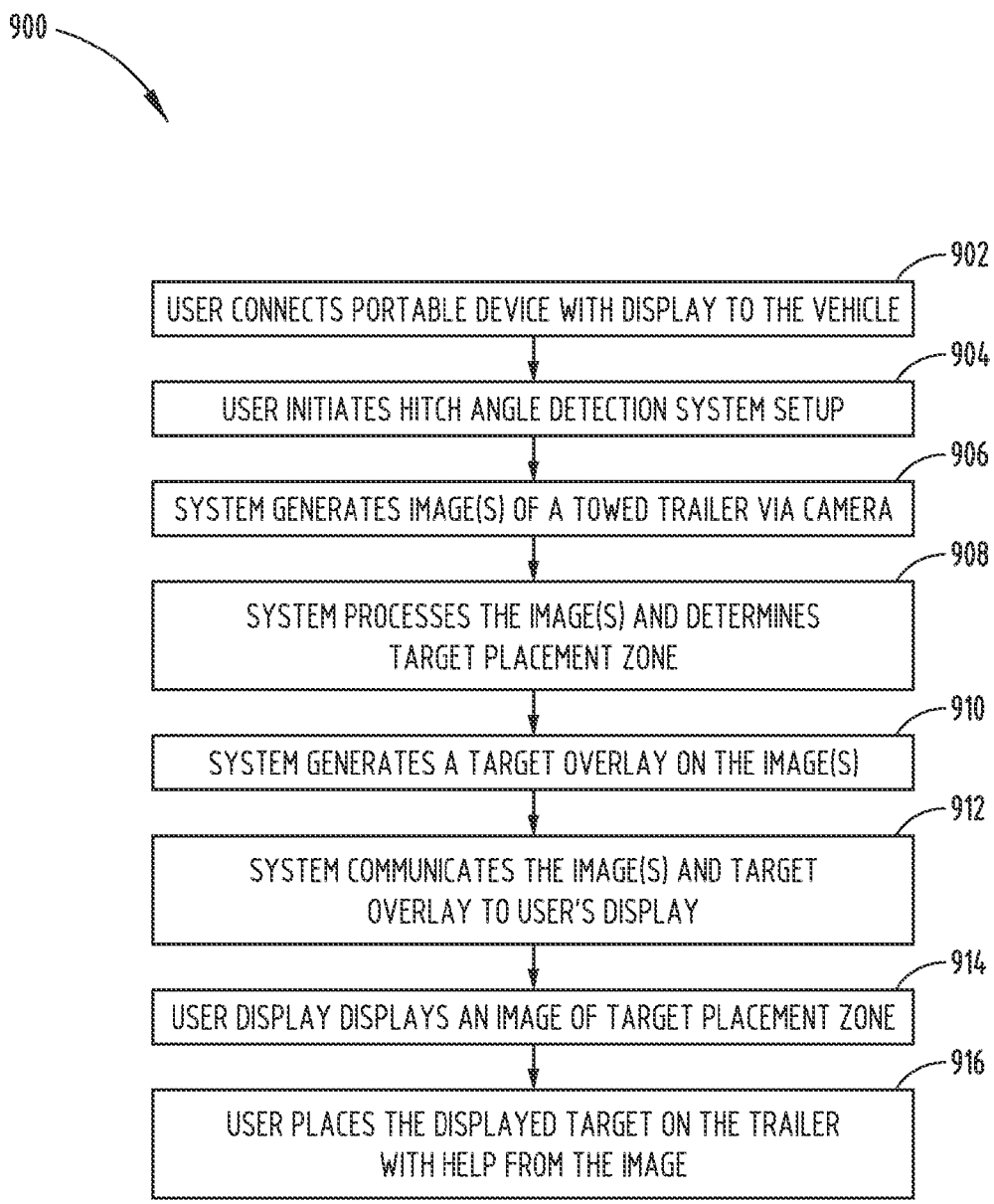
FIG. 17 is a flow diagram illustrating a method of assisting a user with the placement of the target on the trailer.

To allow for efficient and proper placement of the target 30 onto the trailer 110, the trailer backup assist system employs a target placement assist method or routine 900 shown in FIG. 17 that is processed by the target monitor controller 10. The target placement assist method 900 includes step 902 in which a user may connect a portable device having an image display to communicate with the vehicle. The user may connect the device electronically to the vehicle which can be achieved by way of a wireless protocol, according to one embodiment. The device may be a wireless device that may communicate via Wi-Fi, BLUETOOTH® or other wireless protocol. Alternatively, the device could be connected via a wired connection. Next, at step 904, the user initiates the hitch angle detection system setup which requires initiating the setup procedure for the hitch angle detection system. As part of this procedure, the user will be required to place a target onto the trailer of the vehicle within a target placement zone. At step 906, the system generates with the camera one or more images of the towed trailer which include a region where the desired target placement zone(s) is expected to be located. There may be more than one target placement zone and one zone may be preferred over another zone. At step 908, the system processes the generated images and determines the desired target placement zone on the trailer. The desired target placement zone may be determined based on camera location and orientation, desired distance of the target from the hitch connection and the physical structure of the trailer. At step 910, the system generates a target overlay on the one or more generated images. The target overlay is a visual indication of the desired location of the target within the target placement zone upon which the user is instructed to place the target. The target overlay may include border lines marking the target placement zone or other identifier. The target overlay may be shown by flashing colored (e.g., red) lines on a displayed image. Target overlays of a plurality target placement zones may be generated and shown. At step 912, the system communicates the one or more images and the target overlay to the vehicle's display and if connected in step 902, the user's display on the portable device by utilizing the wireless or wired connection. Next, at step 914, the user's display on the portable device displays an image of the target placement zone indicated by the target overlay.

At step 916, the user is then prompted by an HMI to place the target on the trailer within the target placement zone with assistance from the displayed image and target overlay on the vehicle's display and/or the portable display.

Figure 16:
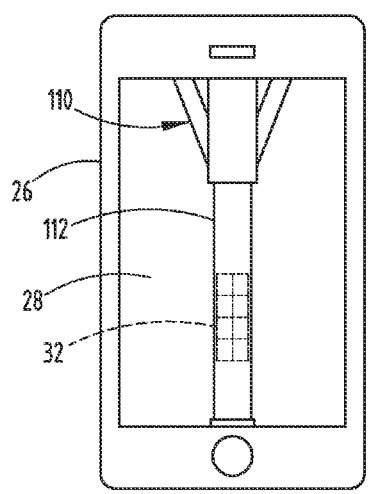
FIG. 16 is a front view of a portable device having a display illustrating the overlay of a target onto a target placement zone on the trailer.

One example of a displayed image on the display 28 of a portable device 26 showing an overlay of the target location for the target to be placed on the trailer is illustrated in FIG. 16. The image displayed on the display 28 includes an image of the trailer 110 as captured by the camera and further includes an overlay of the desired target placement zone 32. The user 2 may view the image on the display 28 of the portable device 28 to determine where to place the target relative to the trailer 110. In this example, the user may place the target 30 onto the target placement zone 32 as indicated by the target overlay. Placement of the target may be achieved by adhering a target sticker onto a surface of the trailer. As a result, the user may employ a portable device with a display, such as a phone, a tablet, or a computer to view the proper location for placement of the target on the trailer prior to and during application of the target onto the trailer.

Accordingly, the target placement assist method 900 advantageously assists the user with placement of the target 30 onto the trailer 110 in a manner that is simple to use, accurate and efficient. The user 2 may easily transport a portable device having a display to communicate with the vehicle and view the correct placement location for the target prior to and during the target placement procedure without having to return to the vehicle or otherwise be prompted for target placement.

The trailer backup assist system 105 further includes a target monitoring method or routine for monitoring placement of the target on the trailer and providing feedback to the user as to whether the target has been placed within a proper target placement zone. A user may place a target on the trailer in various ways. In some situations, the user may be prompted by the TBA system via a vehicle HMI to place a target on the trailer and may be given instructions as to the location. The user may employ the target placement assist method 900 to assist with placement of the target on the trailer. In other situations, the user may place the target on the trailer using their best judgment or following instructions printed on the target or packaging provided therewith. In any event, once the target is placed on the trailer, the target monitoring method 920 will monitor the location of the target relative to the trailer and provide feedback to the user as to correct or incorrect placement of the target on the trailer.

Figure 18:
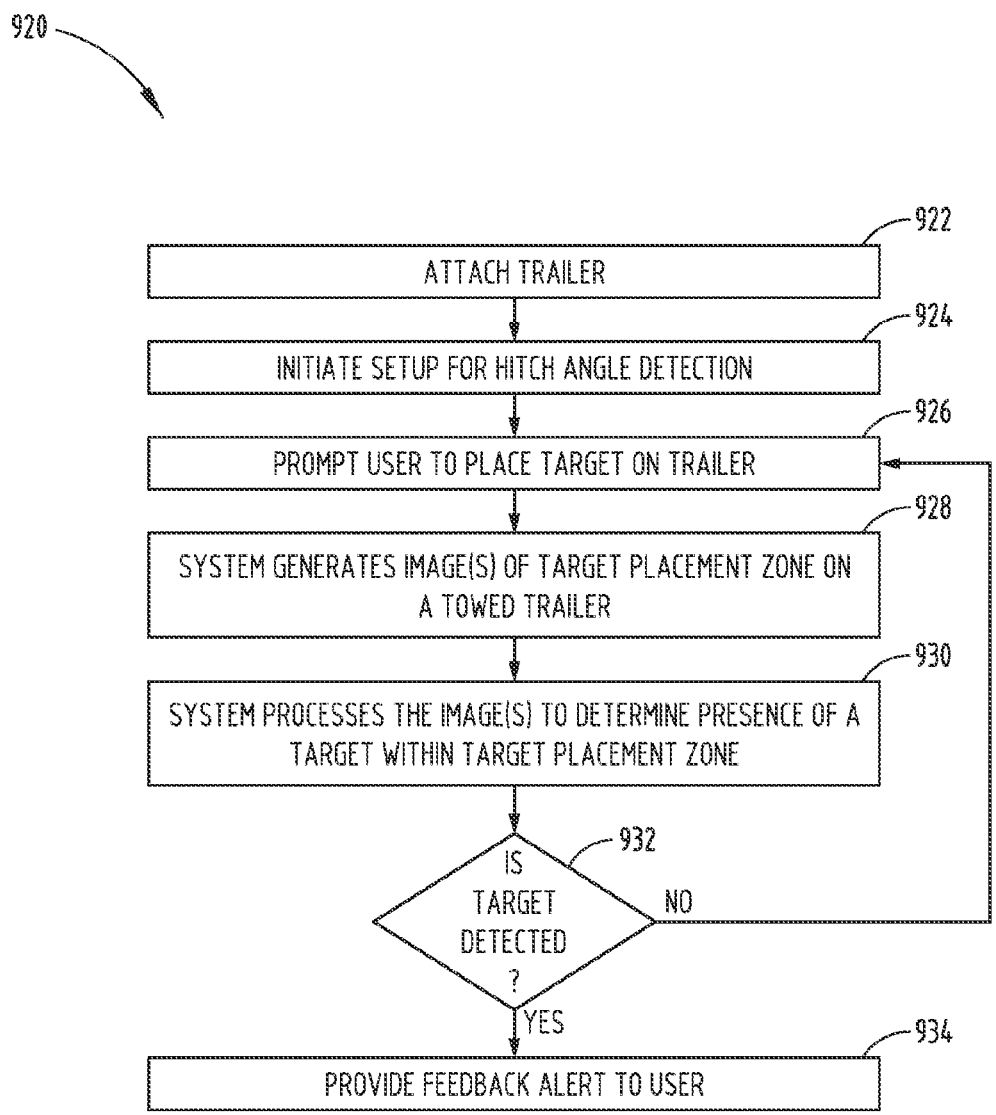
FIG. 18 is a flow diagram illustrating a method of monitoring placement of the target on the trailer and generating feedback alert.

The target monitoring method 920 is illustrated in FIG. 18, according to one embodiment. At step 922, method 920 requires attaching the trailer to the vehicle onto the ball and hitch if it is not already attached. Next, at step 924, setup for the hitch angle detection is initiated. At step 926, the user is prompted via an interface to place the target on the trailer. The user may place a target on the trailer based on predefined criteria or the user's best judgment or knowledge, according to one embodiment. The user may be instructed on where to place the target on the trailer by use of a user's manual, an instruction sheet, or other visual or audible communication of instructions, according to other embodiments. Generally, the target should be placed in a region that is unobstructed from view by the camera and that allows for the acquisition of an image and determination of desired trailer related information, such as the hitch angle. Depending on the trailer configuration and camera orientation and height, the target may be required to be placed within a certain region of the trailer, within a distance range from the trailer hitch connection having a minimum distance from the hitch connection, such as 7 inches (17.78 centimeters), within a range from the tow vehicle bumper, and within a range of height from the ground. The target placement may require a location within a certain distance from a centerline of the longitudinal axis of the trailer, and may require a vertical or horizontal angle or some angle in between the vertical and horizontal positions. According to another embodiment, the user may utilize the target placement assist method 900 to place the target on the trailer.

At step 928, the system generates one or more images of the target placement zone on the towed trailer. The system then processes the one or more images to determine the presence of a target within a desired target placement zone at step 930. The desired target placement zone may be determined by criteria, such as distance from the trailer hitch connection formed by the coupler assembly 114, distance from a centerline of the longitudinal axis of the trailer, height of the camera relative to the trailer, and distance of the camera from the trailer. At decision step 932, method 900 determines if the target has been detected by the processed image(s) and, if not, returns to step 926 to prompt the user via an HMI to place the target on the trailer.

If the target has been detected by the processed images, the vehicle trailer backup assist system provides a feedback alert to the user at step 934. The feedback alert may include one or more of vehicle exterior alerts including visual alerts, such as flashing the vehicle brake lights and/or flashing the vehicle emergency flashers, and/or audible alerts, such as sounding the vehicle horn. Additionally, the feedback alerts may include providing a message via the portable device 26, providing an audible tone via the portable device 26 or a visual lighted indication via the portable device 26. Further, feedback alerts may include sending a text message or audible instructions to a user via a portable device, such as a phone or computer. It should be appreciated that other vehicle exterior and alternative feedback alerts may be communicated to the user to indicate that proper placement of the target has been detected on the trailer. Alternatively, the feedback alerts could be used to indicate improper placement of the target on the trailer. Once the trailer is properly equipped with the target in the proper location, the trailer backup assist system may process information by monitoring the target to determine the hitch angle and other trailer towing related functionality.

The target 30 may include a sticker having adhesive on the bottom surface and a predetermined image pattern of a certain size and shape provided on the top surface for capture by the video camera and recognition by the image processing. The target 30 may have a rectangular shape, according to one embodiment, and may have a camera image recognizable pattern such as the checker pattern shown. The image processing may include known image pattern recognition routines for identifying a target pattern and its location on a trailer. However, it should be appreciated that other target shapes, sizes and patterns may be employed. It should further be appreciated that the target may otherwise be connected to the trailer using connectors, such as fasteners, which may connect to the trailer or to an attachment to the trailer. It should further be appreciated that the target can be attached via magnet, glued on, painted on, or any number of other suitable means.

Figure 19:
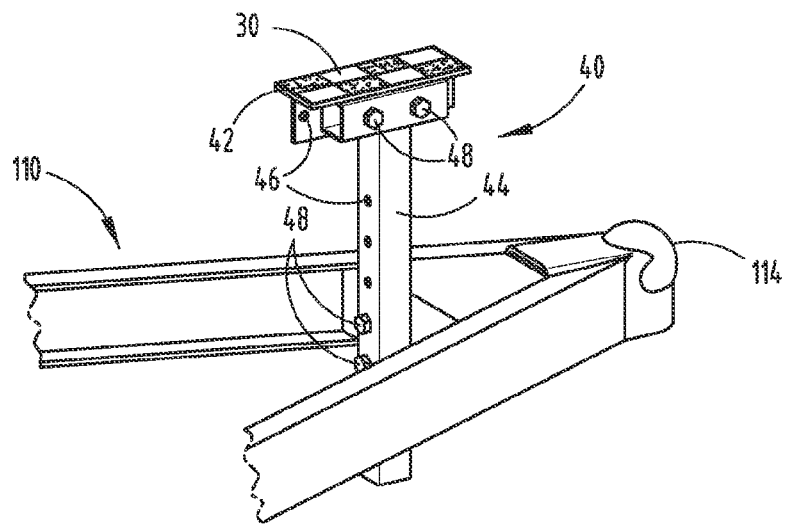
FIG. 19 is a schematic view of a front portion of the trailer having a target mounting system assembled thereto, according to one embodiment.
Figure 20:
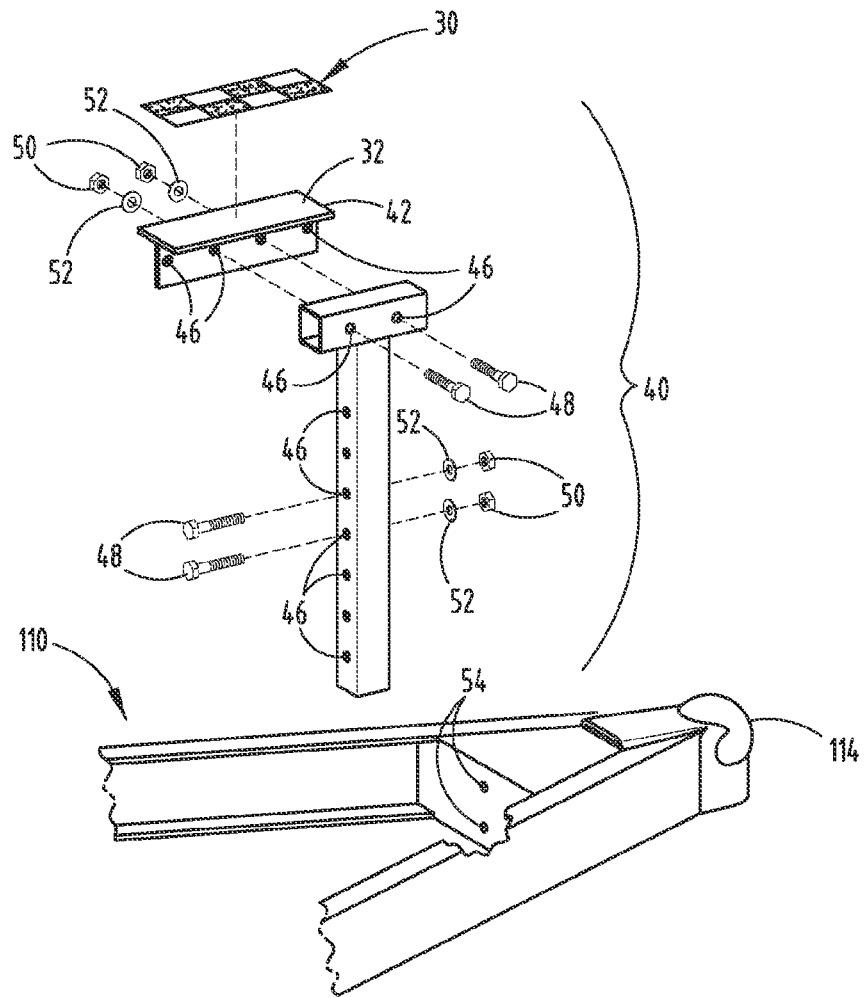
FIG. 20 is an exploded view of the target mounting system and trailer shown in FIG. 19.

It should be appreciated that not all trailers are necessarily configured to provide a well-suited location for placement of a target sticker on the trailer. Accordingly, a target location may be added to a given trailer by use of a target mounting system 40 as shown in FIGS. 19 and 20, according to one embodiment. The target mounting system 40 is shown installed onto trailer 110 to present a target 30 that is viewable by the camera within a desired target placement zone. The target mounting system 40 includes a vertical mounting post or bracket 44 having a plurality of bolt receiver holes 46 extending vertically to allow for a desired vertical height adjustment. The bracket 44 may be assembled onto the trailer via holes 54 using bolts 48, washers 52 and nuts 50. The height of the bracket 44 may be adjusted depending on which holes 46 are aligned with the trailer holes 54. Mounted to the top of the bracket 44 is a target plate 42 having a top target placement zone 32 onto which the target 30 is located. The plate 42 likewise has a plurality of holes 46 that align horizontally with the holes in the bracket 44 and may be assembled thereto via bolts 48, washers 52 and nuts 50. Accordingly, the plate 42 may be adjusted both vertically and horizontally to a desired position so as place the target 30 adjustably within a desired location so that the target is easily acquired by the camera and processed by the image processing. It should be appreciated that assistance in mounting the target mounting system 40 along with the target 30 and verification of proper location of the target mounting system 40 and target 30 may be achieved by utilizing the target placement assist method 900 and target monitoring method 920 discussed above.

The target moved detection method includes an initial setup routine 940 and subsequent processing routine 960 for target moved detection used for prompting the entry of trailer information. The target moved detection method determines if the location of a hitch angle target on a trailer, such as a trailer tongue, has moved and may also determine if the distance has changed. Images of the target in a previously stored image and a newly acquired image are compared to determine if the location and/or distance to the target has changed. The comparison may include comparing camera image pixel sizes of the images. If either the location or the distance changes, the user is then prompted by an HMI to reenter new trailer information for subsequent processing of the trailer backup assist system.

Figure 21:
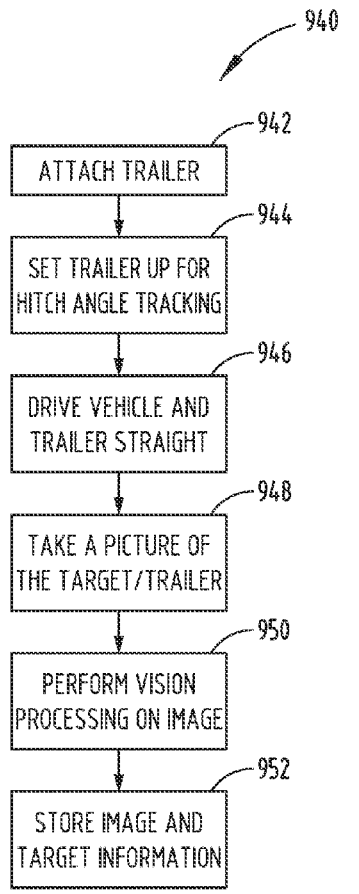
FIG. 21 is a flow diagram illustrating an initial set up routine for monitoring the trailer connection for target changes and resetting trailer selection.

The initial setup routine 940 is illustrated in FIG. 21. Initially, the trailer must be attached to the vehicle at step 942. At step 944, the attached trailer is setup for hitch angle tracking. For a vision-based system, this may include applying a target sticker to the trailer, such as in the vicinity of the tongue of the trailer, so that the vehicle-based camera can detect motion of the target as the trailer maneuvers and swings around curves. In addition, a number of parameters associated with the location of the target that are used to properly calculate the hitch angle based on the vision processing may be entered. These parameters may include the distance of the target to the ground and the distance from the target to the bumper of the vehicle. At step 946, the vehicle and the trailer are directed to be driven straight, which may be achieved by driving the vehicle and towed trailer in the forward direction. This is to ensure that there is about zero hitch angle between the vehicle and trailer with the trailer in-line with the vehicle and that the image generated in subsequent steps will be taken in the same orientation and will be valid for image comparisons. At step 948, a picture (image) of the target and trailer are acquired with the use of the camera while the vehicle and the trailer are in a straight line at a hitch angle of about zero degrees. At step 950, the image processing performs vision processing on the image. The vision processing may first detect a target and then compute the size and location of the target based on processing the pixels of the image. At step 952, the image acquired in step 948 is stored in memory and the information calculated in step 950 is stored in memory. The image and calculated information are then subsequently used to determine if the target has moved. If the target has moved, the system may assume that the trailer may have been changed or replaced with a different trailer, and hence prompts the user via an HMI to enter trailer information.

Figure 22:
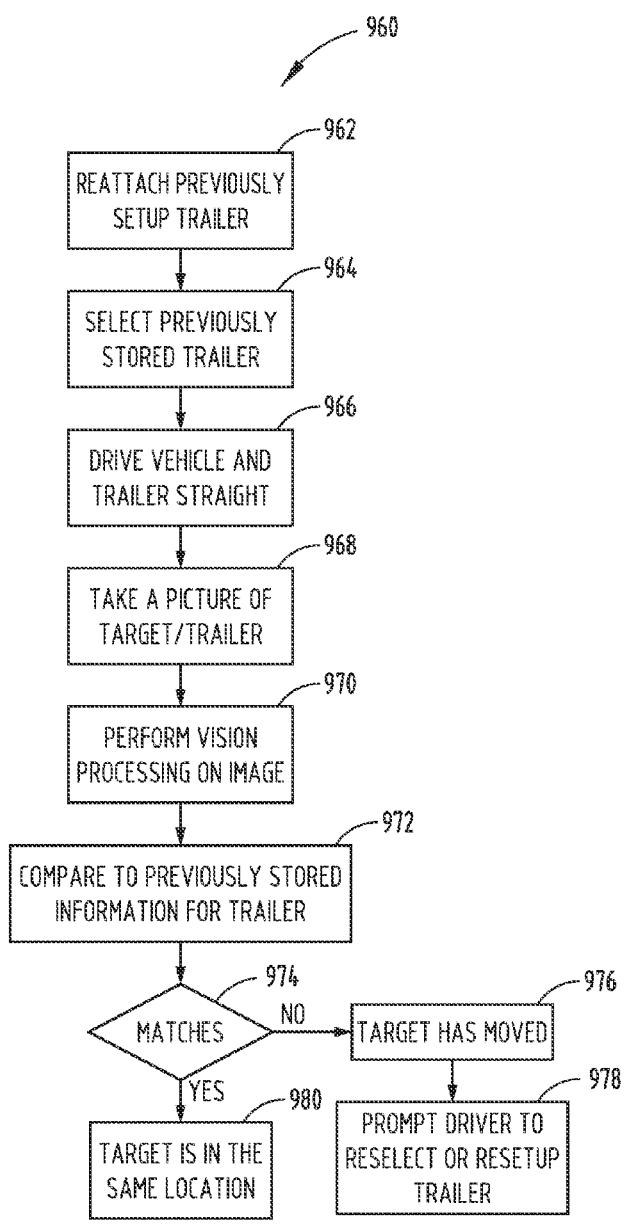
FIG. 22 is a flow diagram illustrating a target moved detection routine for monitoring presence of trailer changes and resetting trailer selection.

Referring to FIG. 22, the target moved detection routine 960 is shown beginning at step 962 in which the driver is instructed to reattach to the vehicle a trailer that was previously set up and used in the initial setup routine 940. At step 964, the user is prompted by the hitch angle detection system to select the trailer that was previously setup and stored, rather than selecting a new trailer. At step 966, the user is prompted to drive the trailer and vehicle combination forward in a straight line to achieve a hitch angle of about zero degrees. Next, at step 968, a new image of the target and the trailer are acquired by the camera. At step 970, vision processing is performed on the image to detect the target and compute the size and location of the target by processing the pixels of the image. At step 972, the target location and size as calculated above are compared to the location and size of the target taken in the prior image from the initial setup. At step 974, a determination is made to determine if the new target information is a match or within tolerance of the original target information. If the newly acquired target is still a similar size and in the similar location on the image as compared to the prior image from the initial setup, then the target is likely to be in the same location and will allow for a proper hitch angle detection if determination of such is made in step 980. If the target has a different location or has a different size, then the target is presumed to have moved and routine 960 proceeds to step 976. Detected movement of the target may occur when the trailer is a different trailer as compared to the trailer last selected by the user. The use of the prior selected trailer configuration may provide erroneous results for hitch angle target tracking. As such, method 960 proceeds to step 978 to prompt the user (e.g., driver) to reselect or re-setup the trailer configuration with new target and trailer information. Accordingly, the target moved detection routine 960 advantageously detects movement of the target which may indicate potential connection of a new trailer to the vehicle, such that the user is prompted via an HMI to select new trailer configuration information. Additionally, the target moved routine could also detect that a target has moved due to a different sized drawbar being installed than what was installed when the trailer was initially setup.

Figure 23A:
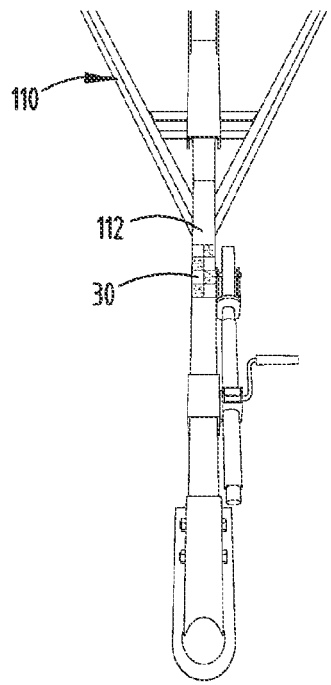
FIG. 23A is an image of the trailer showing the target in a first position.
Figure 23B:
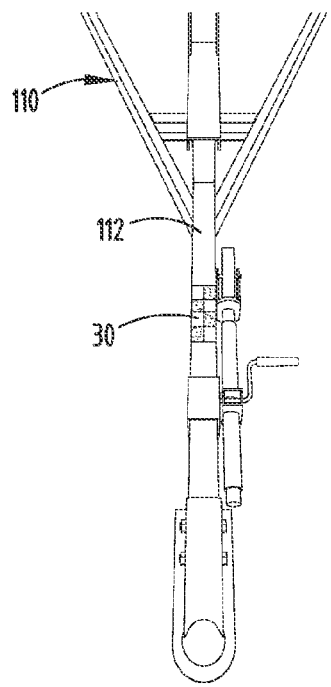
FIG. 23B is an image of the trailer showing movement of the target to a second position, according to one example.

Examples of images of the trailer and the target moved to a different position are illustrated in FIGS. 23A and 23B. As shown in FIG. 23A, an image of the trailer and the target 30 is shown aligned on the trailer in a first position as compared to the subsequent image in FIG. 23B showing the target 30 moved to a new second closer position. The change in location of the target may be an indication that the trailer has been changed out with a new trailer or that the target has otherwise been moved on the trailer. When this occurs, the target move detection routine 960 requires the user to re-enter trailer configuration information so that the wrong information is not used to provide incorrect hitch angle data. Furthermore, it is possible that the right (correct) trailer has been selected and the target is still in the same location on the trailer, but the system still indicates that the target has moved. This could occur if the drawbar length on the vehicle has changed.

Target monitor controller 10 further processes a trailer connection monitoring routine 990 to determine whether a trailer is connected to the vehicle and whether a new trailer may have been connected. When the trailer is disconnected from the vehicle, the target information and the hitch angle information may be unavailable for a period of time. Accordingly, the trailer connection monitoring method 990 monitors the availability of the hitch angle data and/or the detection of the target to determine if the hitch angle data or target data is lost for a substantial period of time. If this occurs, the driver is then prompted via an HMI to reselect the attached trailer or to re-enter trailer configuration data to ensure that the wrong trailer information is not employed.

Figure 24:
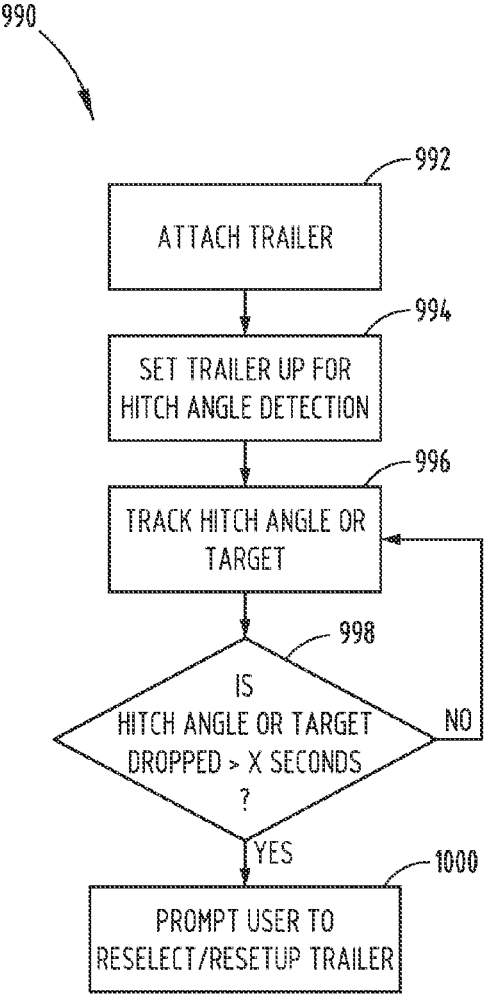
FIG. 24 is a flow diagram illustrating a trailer connection monitoring routine for monitoring trailer disconnection.

The trailer connection monitoring routine 990 is illustrated in FIG. 24. At step 992, a trailer is connected to the vehicle. At step 994, the trailer is setup for hitch angle detection and monitoring. If a vision based system is employed, this may include placing a target on the trailer for the vision-based system to detect as well as entering pertinent parameters. Alternatively, if the trailer has been previously setup for hitch angle monitoring, it may be possible to select the previously stored setup configuration for that trailer. At step 996, once the trailer has been setup for hitch angle detection, the hitch angle detection system will continuously monitor the hitch angle or target. At decision step 998, routine 990 determines if the hitch angle or the target has been dropped for a time period greater than X seconds.

Depending on the type of hitch angle system, the hitch angle signal may drop or become unavailable for different reason, but one potential reason is that the trailer has been disconnected from the vehicle. A disconnected trailer may also result in the target detection being unavailable. As such, a check is made to see how much time has expired since the hitch angle signal or target detected has been dropped. If the hitch angle or target detection has been dropped for a time period of less than X seconds, then routine 990 returns to track the hitch angle or target at step 996. If the hitch angle or target detection has been dropped for a time period greater than X seconds, then the user is prompted via an HMI to reselect or re-setup the trailer configuration in step 1000. The time period X is set to represent a reasonable amount of time needed to swap or change-out trailers. For example, for extremely small, lightweight trailers, it may be possible to swap trailers out in less than sixty (60) seconds, so this could be a reasonable time period. According to one embodiment, the time period X is set for thirty (30) seconds.

While the hitch angle is monitored to determine disconnection of a trailer from the vehicle, it should be appreciated that the trailer connection monitoring routine 990 may monitor detection of the target as an alternative, such that if the target is no longer detected for X seconds, then the vehicle driver may be prompted to reselect or reconfigure the trailer.

Supplemental Vehicle Lighting System

As previously described, the trailer backup assist system 105 may employ a vision based target detection system, wherein the hitch angle detection component 155 is an identifiable visual target located on a trailer attached to a towing vehicle. The towing vehicle may be equipped with a rear view camera, which functions as the hitch angle detection apparatus 130, and is configured to image the target and process acquired image data to generate trailer related information used in a variety of applications associated with the trailer backup assist system 105. By following the previously described target placement assist method 900 and/or other suitable methods, a vision based target detection system can be readily configured for accurate target detection. Nevertheless, there may be some circumstances that hinder target detection accuracy. One such circumstance involves performing target detection under dark conditions when existing vehicle lights, such as taillights, provide insufficient target lighting. While aftermarket lighting assemblies are available, such assemblies may appear unsightly and may lack the ability to be integrated with the trailer backup assist system 105. Thus, it is desired to provide a supplemental vehicle lighting system that not only cooperates with the trailer backup assist system 105, but also confers a styling advantage to vehicles in which it is featured.

As will be described in greater detail below, a supplemental vehicle lighting system is disclosed herein that utilizes an existing keylock hole of a rear vehicle closure member or other rear vehicle fixture. For purposes of illustration, FIG. 25A exemplarily shows a tow vehicle 1005 having a rear vehicle closure member embodied as a tailgate 1010 that includes a keylock hole 1015 defined in a tailgate handle assembly 1020. As exemplarily shown in FIGS. 25B-25D, the keylock hole 1015 is customarily used in conjunction with a corresponding keylock cylinder 1025 that includes a keyhole 1030 that is accessible through the keylock hole 1015. It should be appreciated that the keylock cylinder 1025 may be supported inside the tailgate 1010 in a variety of ways. For purposes of illustration, the keylock cylinder 1025 is shown engaged to protrusions 1035, 1038, and 1040 of the tailgate handle assembly 1020 and is secured to the tailgate handle assembly 1020 with mechanical fastener 1045. When a corresponding key is inserted into the keyhole 1030 and turned in the proper direction, a locking tab 1050 of the keylock cylinder 1025 is moved to an unlocked position to enable the tailgate 1010 to be lowered so that a rear vehicle cargo area can be accessed. While the rear closure member has been generally described herein as a tailgate 1010, it should be appreciated that the rear closure member may also include a liftgate, a trunk lid, a swing door, a sliding door, and the like, depending on the type and/or make of the selected vehicle 1005. Likewise, it should also be appreciated that the configuration and/or location of the keylock hole 1015 and keylock cylinder 1025 may vary across vehicle types and/or makes. Therefore, the keylock hole 1015 may be defined in other parts and/or areas of the rear vehicle closure member or in some other rear vehicle fixture altogether.

While many current vehicles are equipped with a keylock hole and a keylock cylinder, seldom is a key used to unlock a rear vehicle closure member given the proliferation of vehicles having power lock systems or other means of entry. Thus, with respect to some vehicles, the inclusion of a keylock cylinder produces added cost and consumes space that could otherwise be used to implement other devices. Recognizing this, a supplemental vehicle lighting system is provided herein that advantageously replaces a keylock cylinder with a light assembly operably coupled to a rear keylock hole of a selected vehicle, through which the light assembly is able to illuminate a rear vehicle area. In so doing, little to no modification need be made to existing rear vehicle fixtures since the light assembly may be fashioned to be mounted to in the same way as the keylock cylinder. In this manner, vehicle manufacturers can offer vehicles equipped with a light assembly without having to perform substantial retooling. Similarly, an existing keylock cylinder may be easily swapped for a light assembly in vehicles desiring the benefits bestowed by the supplemental vehicle lighting system described herein.

Referring to FIGS. 26A-26D, a light assembly 1055 is shown according to one embodiment and includes a housing 1060 having an open top defined by an upper edge 1065. The light assembly 1055 also includes a barrel 1070 having a distal end 1075 and a proximal end 1080. A lighting device 1085 including one or more light emitting diodes (LEDs) 1087 is disposed inside the housing 1060 and is configured to emit light through the barrel 1070 beginning from the proximal end 1080. The barrel 1070 may be constructed from a reflective material to trap the emitted light inside the barrel 1070 as it propagates towards the distal end 1075 of the barrel 1070. The emitted light is then dispersed from the barrel 1070 via a lens 1090 that is coupled to the distal end 1075 of the barrel 1070.

In the illustrated embodiment, the lens 1090 includes a first section 1091, a second section 1092, and an intermediate section 1093 therebetween. The second section 1092 is configured to be inserted into the barrel 1070 through the distal end 1075 such that the intermediate section 1093 abuts against the distal end 1075 and may be adhered thereto using an adhesive. In this arrangement, the first section 1091 is most distal to the lighting device 1085. Additionally, the first section 1091 may be curved and optically configured to disperse the emitted light in a variety of directions including a forward, upward, downward, and/or sideways direction.

Figure 26A:
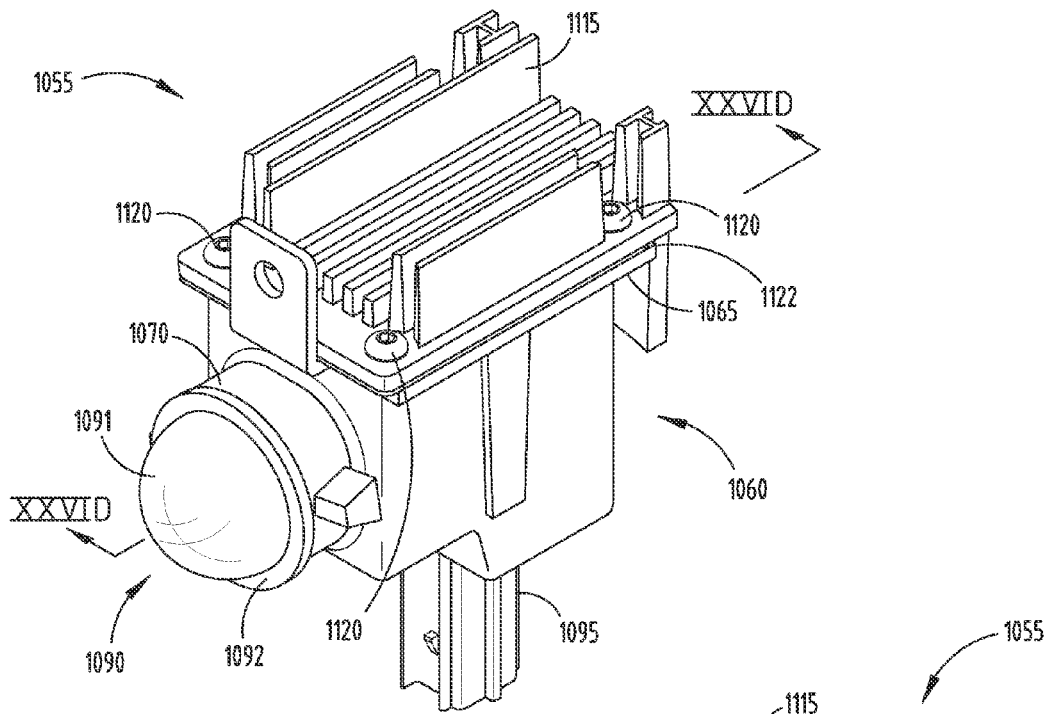
FIG. 26A is a front perspective view of a light assembly, according to one embodiment.
Figure 26B:
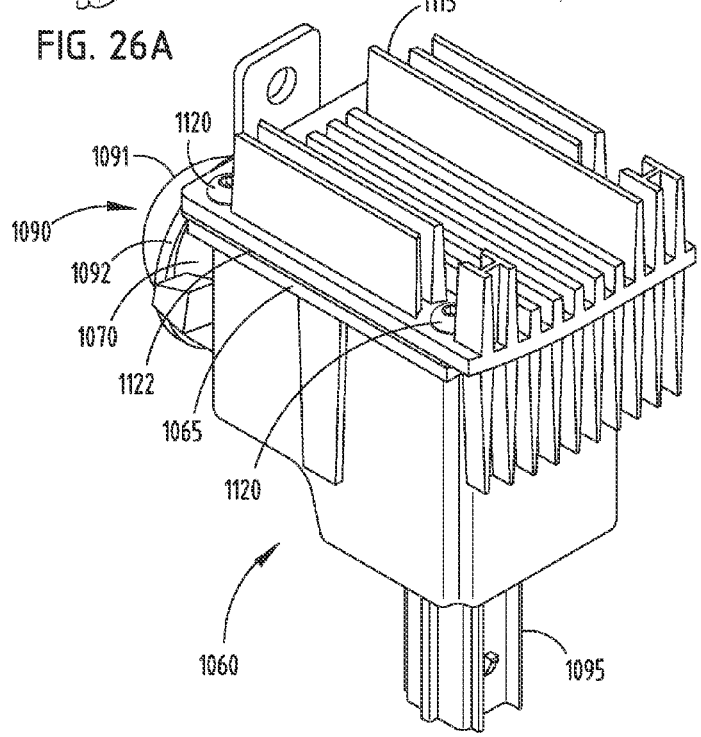
FIG. 26B is a rear perspective view of the light assembly.
Figure 26C:
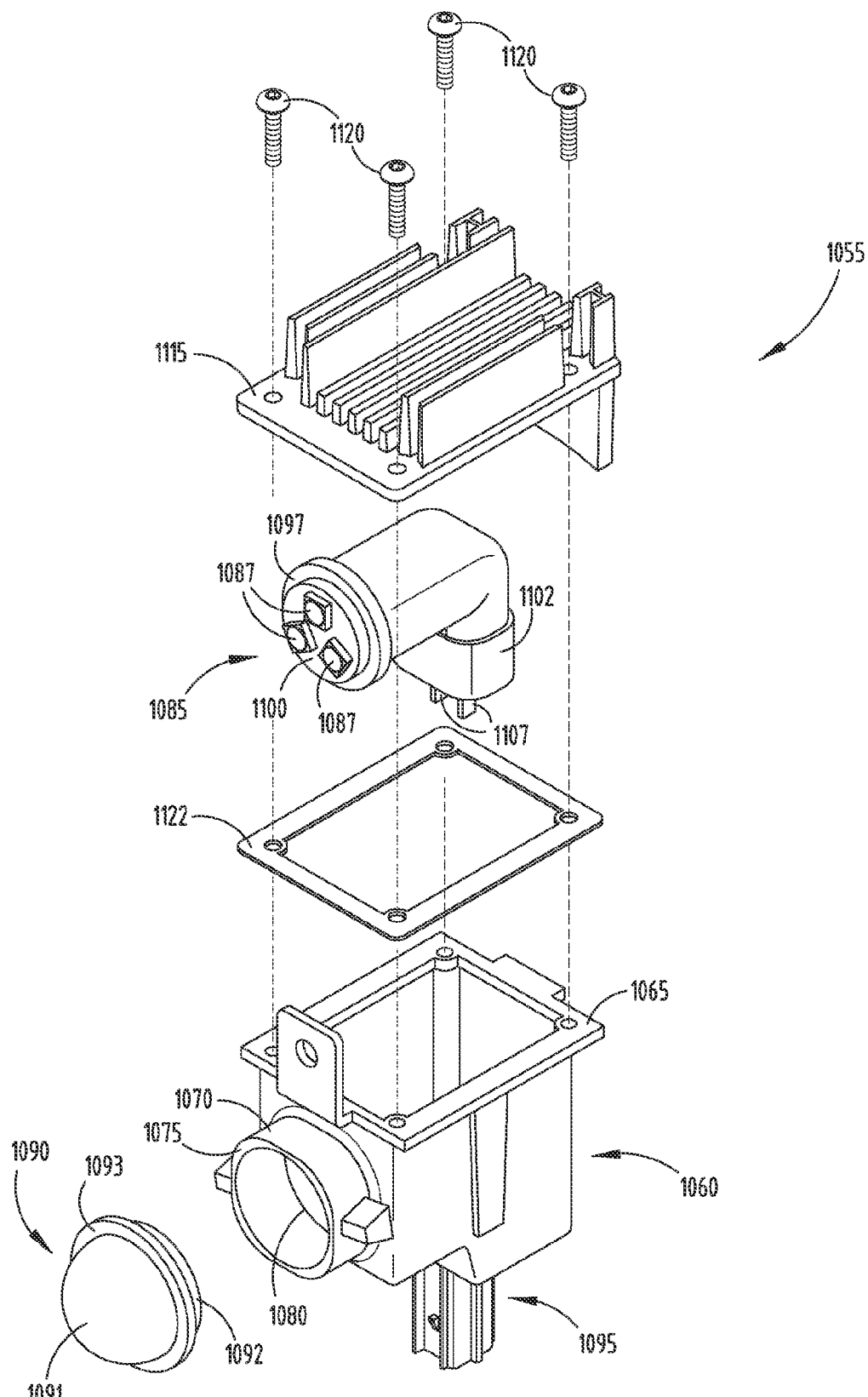
FIG. 26C is an exploded view of the light assembly shown in FIGS. 26A and 26B.
Figure 26D:
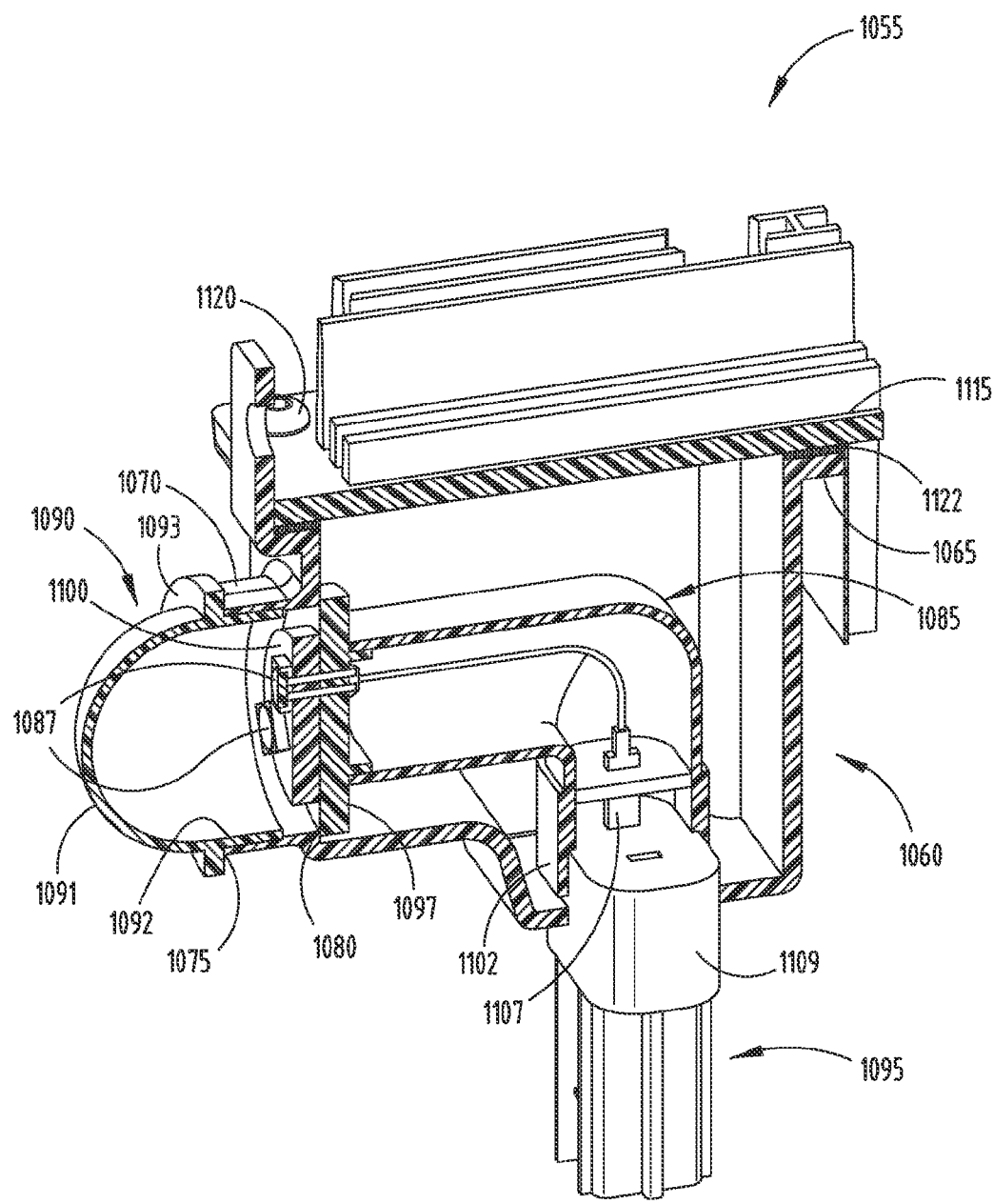
FIG. 26D is a cross sectional view of the light assembly taken along line XXVI D-XXVI D of FIG. 26A.

As best shown in FIGS. 26C and 26D, the lighting device 1085 has an L-shaped configuration and is electrically coupled to an electrical connector 1095 provided at the bottom of the housing 1060. The lighting device 1085 includes a first end 1097 that abuts against the proximal end 1080 of the barrel 1070 and supports a heat sink board 1100 on which the LEDs 1087 are mounted. The lighting device 1085 also includes a plug 1102 disposed at a second end having pins 1107 that plug into a corresponding socket 1109 of the electrical connector 1095. To supply power to the lighting device 1085, the electrical connector 1095 may be configured to make an electrical connection with an onboard vehicle power source or other power source.

To assist the heat sink board 1100 with heat dissipation, the light assembly 1055 may include a heat management member 1115 positioned proximate to the lighting device 1085. The heat management member 1115 may be a straight heat sink (as shown), or other heat sink type, such as, but not limited to, a pinned heat sink or a flared heat sink, and may be mounted to the upper edge 1065 of the housing 1060 via threaded fasteners 1120. Optionally, a thin plate 1122 may be provided for distributing the load of the threaded fasteners 1120. As shown in FIG. 26C, the thin plate 1122 is contiguous with the upper edge 1065 of the housing 1060 and is disposed between the upper edge 1065 of the housing 1060 and the heat management member 1115.

Figure 27A:
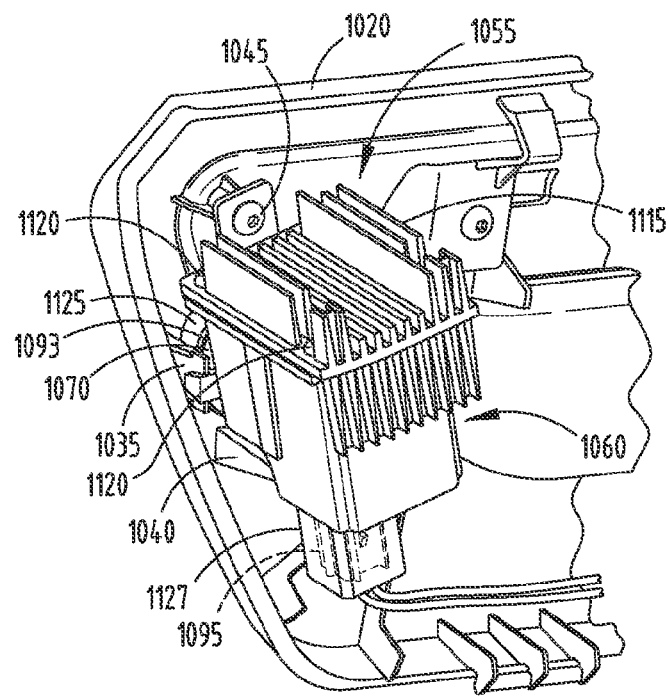
FIG. 27A is a light assembly mounted to the tailgate handle assembly shown in FIG. 25B, according to one embodiment.
Figure 27B:
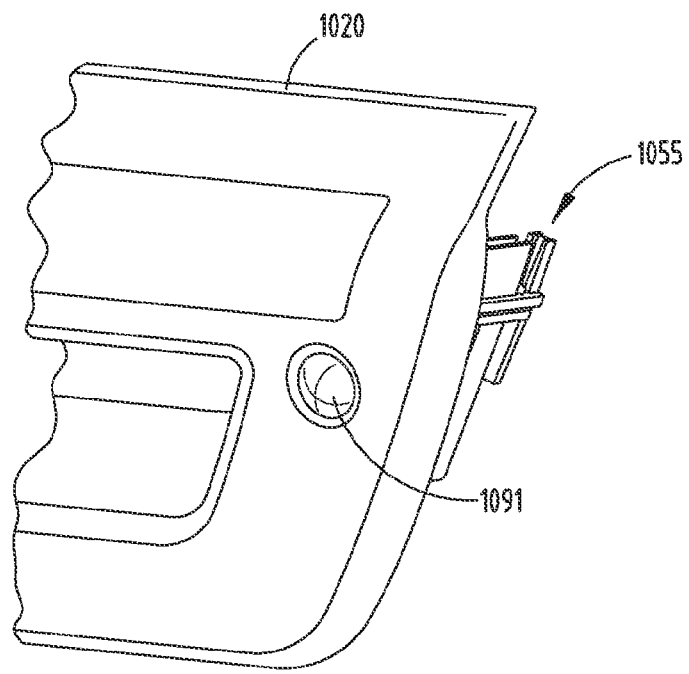
FIG. 27B is an enlarged partial front perspective view of the tailgate handle assembly equipped with the light assembly shown in FIG. 27A.

Referring to FIGS. 27A and 27B, the light assembly 1055 is exemplarily shown mounted to the tailgate handle assembly 1020 previously shown in FIGS. 25A-25D. The light assembly 1055 is configured to be engaged to protrusions 1035, 1038, and 1040 and is secured to the tailgate handle assembly 1020 with mechanical fastener 1045 to mirror the mounting scheme of the keylock cylinder 1025 previously shown in FIG. 25D. In this manner, the keylock cylinder 1025 and light assembly 1055 are easily interchanged. However, it should be appreciated that other mounting schemes may be employed for mounting the light assembly 1055 to the tailgate handle assembly 1020 or other rear vehicle fixture. With respect to the presently illustrated embodiment, mounting of the light assembly 1055 to the tailgate handle assembly 1020 results in the intermediate section 1093 of the lens 1090 abutting against an interior surface 1125 of the tailgate handle assembly 1020. In this arrangement, the barrel 1070 is concentrically aligned with the keylock hole 1015 such that the first section 1091 of the lens 1090 at least partially coincides with the keylock hole 1015 while the tailgate handle assembly 1020 shields the rest of the light assembly 1055. Once the light assembly 1055 is secured, an electrical connection may be made between the electrical connector 1095 of the light assembly 1055 and a plug 1127 stemming from an onboard vehicle power supply or other power source such that power may be supplied to the lighting device 1085.

In operation, the lighting device 1085 may be activated using a variety of means. For example, the lighting device 1085 may be manually activated via a user input mechanism, such as a button located on a human machine interface (e.g. HMI 102), or elsewhere in the selected vehicle. Additionally, or alternatively, the lighting device 1085 may be automatically activated via an onboard vehicle system such as the trailer backup assist system 105 and/or other vehicle system. For instance, when performing a backup maneuver, the trailer backup assist system 105 may activate the lighting device 1085 under dark conditions. In another instance, the lighting device 1085 may be automatically activated during set up of the trailer backup assist system 105, as described previously in step 604 of FIG. 10.

Figure 25A:
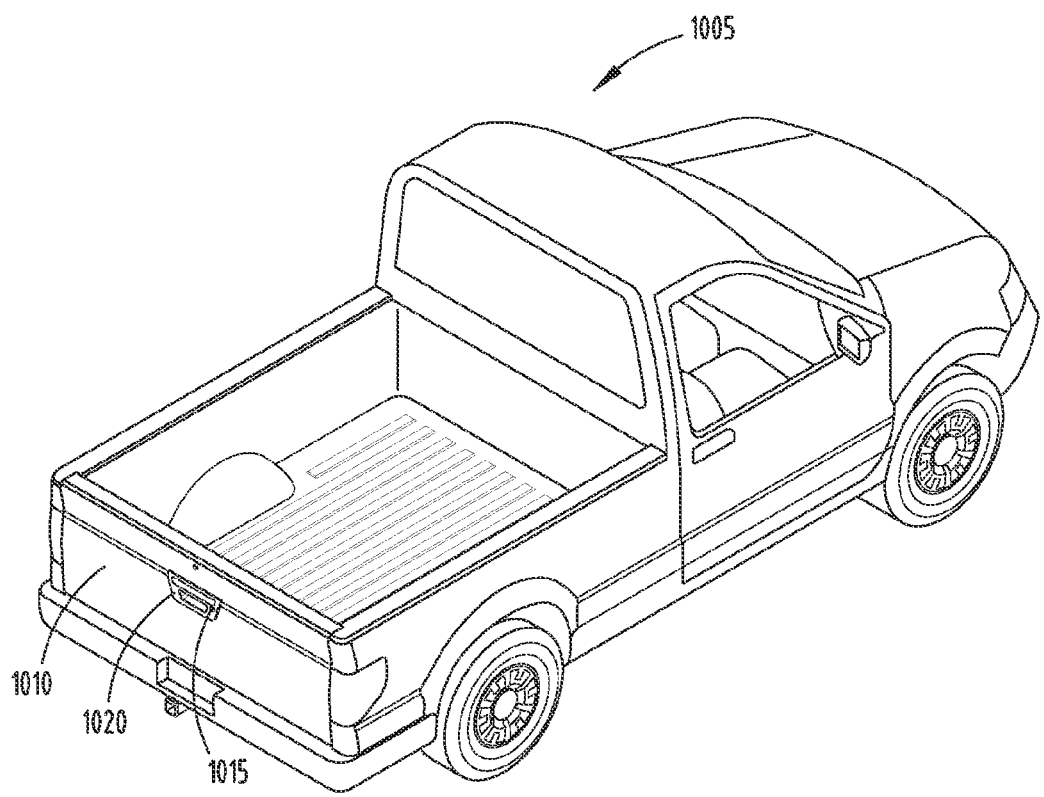
FIG. 25A is an image of a tow vehicle showing a keylock hole defined in a tailgate handle assembly of the tow vehicle.
Figure 25B:
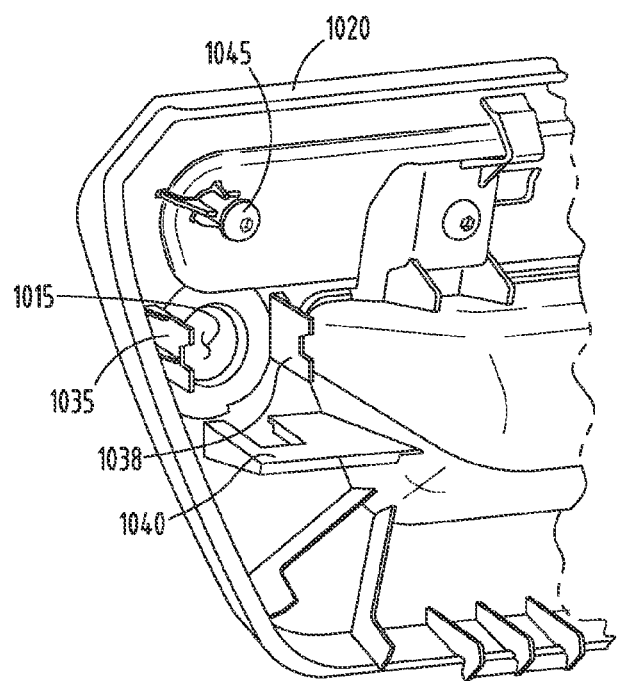
FIG. 25B is an enlarged partial rear perspective view of a tailgate handle assembly defining a keylock hole.
Figure 25C:
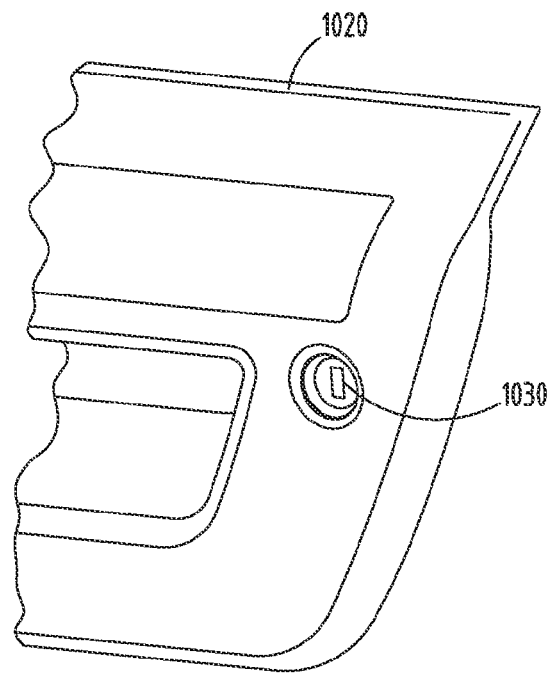
FIG. 25C is an enlarged partial front perspective view of the tailgate handle assembly showing the customary use of a keylock cylinder with the keylock hole.
Figure 25D:
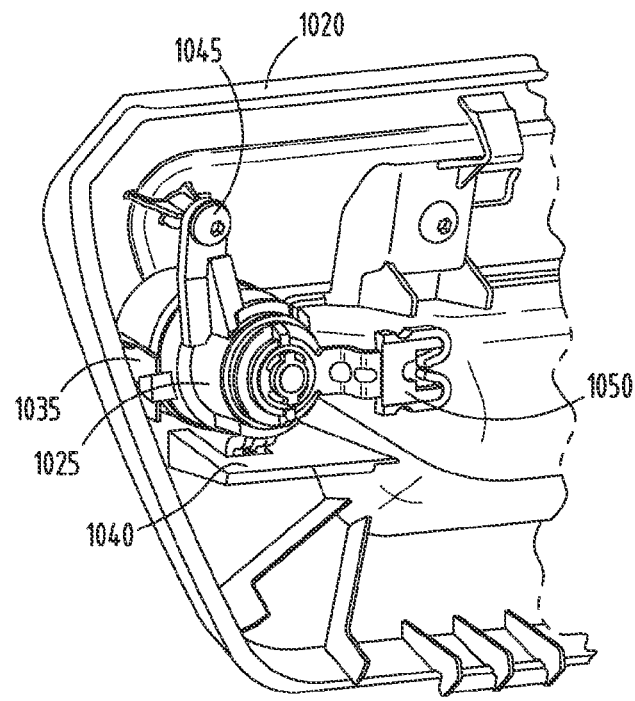
FIG. 25D shows the keylock cylinder mounted to the tailgate handle, according to one embodiment.
Figure 28:
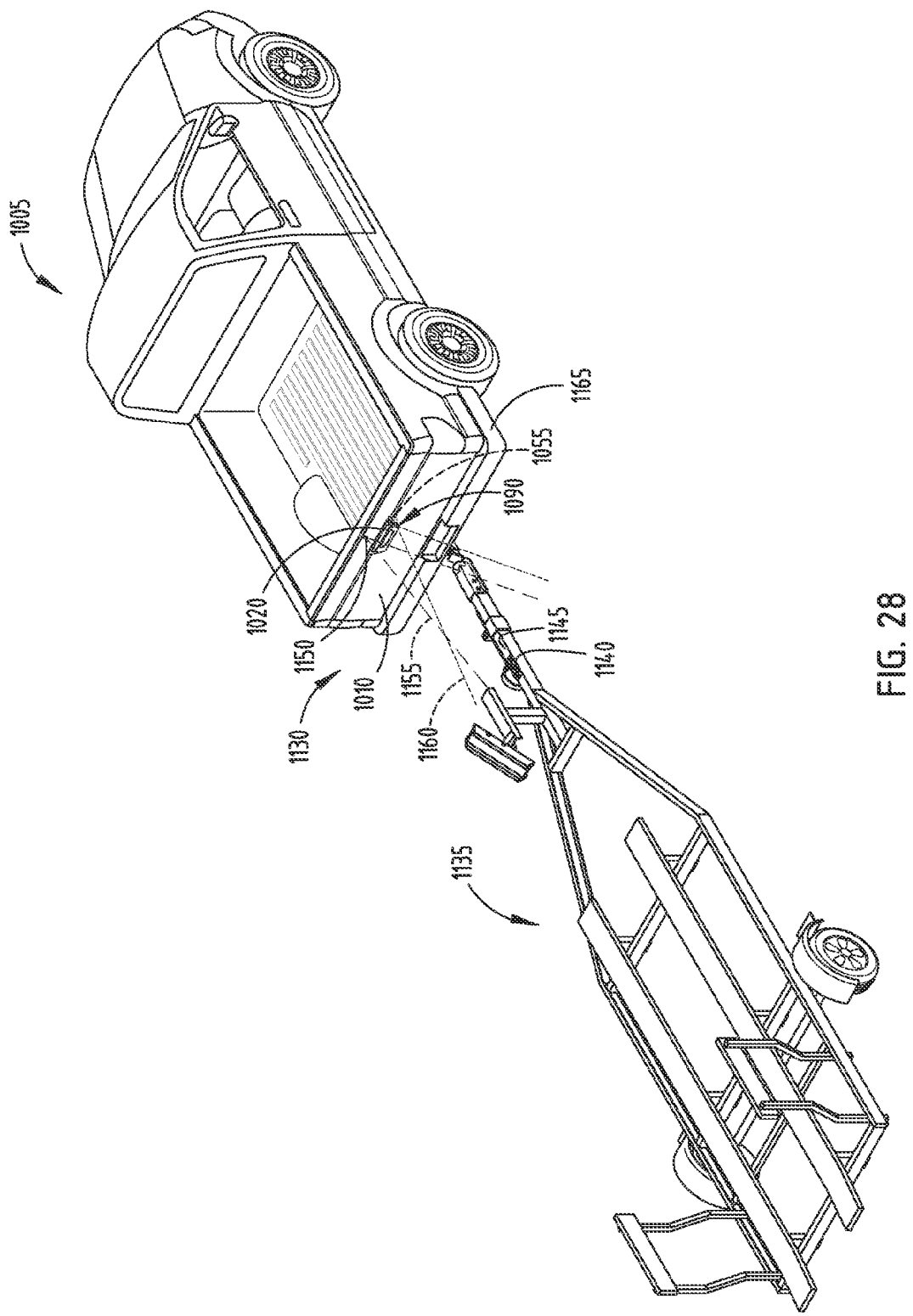
FIG. 28 is a schematic diagram illustrating a supplemental vehicle lighting system being implemented in the tow vehicle shown in FIG. 25A, wherein the tow vehicle is attached to a trailer and features a trailer backup assist system employing vision based target detection.

Referring to FIG. 28, a supplemental vehicle lighting system 1130 is implemented in the vehicle 1005 previously shown in FIG. 25A. For purposes of illustration, the vehicle 1005 features the trailer backup assist system 105 and employs vision based target detection. As shown, the vehicle 1005 is attached to a trailer 1135, which may be variously configured and may offer one or more suitable target placement zones for receiving a target 1140. In the illustrated embodiment, the target 1140 is placed on a trailer tongue 1145 of the trailer 1135 and is imaged by a rear view camera 1150 mounted in an upper region of the tailgate 1010. By virtue of its positioning in the tailgate 1010, the rear view camera 1150 is shown imaging a scene 1155 that is to the rear of the vehicle 1005 and points slightly downwards therefrom so that the target 1140 is present in the scene 1155. To assist the camera 1150 in accurately imaging the target 1140 in dark conditions, the light assembly 1055 described previously herein is mounted inside the tailgate 1010 and is operable to illuminate a rear vehicle area 1160 that includes the target 1140 and at least partially overlaps with scene 1155. With respect to the illustrated embodiment, it can be seen that the rear vehicle area 1160 can include the area behind a rear bumper 1165 of the vehicle 1005. Since the keylock hole 1015 is defined in the tailgate handle assembly 1020, the light assembly 1055 may be mounted to the tailgate handle assembly 1020 in the manner described in reference to FIG. 27A or other suitable manner.

Although the supplemental vehicle lighting system 1130 has been described herein as being featured in a tow vehicle 1005 generally embodied as a pickup truck, it should be appreciated that the supplemental vehicle lighting system 1130 may be featured in other tow and non-tow vehicles alike, which may include, but are not limited to, buses, sports utility vehicles, vans, station wagons, sedans, and coupes. Furthermore, while the supplemental vehicle lighting system 1130 is intended for use with the trailer backup assist system 105, it should be appreciated that the vehicle lighting system 1130 may additionally, or alternatively, be adapted for use with other vehicle related applications. For example, the additional lighting provided by the light assembly 1055 will enable a vehicle equipped with a rear view camera system to render clearer images on a display screen when it's dark outside. This may prove especially useful when performing a backup maneuver in low visibility situations. At the most basic level, the supplemental vehicle lighting system 1130 may simply be used as a utility light. For example, the light assembly 1055 may be activated to aid an operator with attaching/detaching a trailer to/from a tow vehicle in low light conditions.

Secondary Hitch Angle Sensor System

For the trailer backup assist system 105, as previously described, it is advantageous to use information that is representative of an angle between the vehicle and a trailer attached to the vehicle, also known as the hitch angle γ or trailer angle. In addition to the trailer backup assist system 105, it is contemplated that other vehicle systems may utilize hitch angle information as an input to the system, whereby the hitch angle information may be manipulated by a controller or microprocessor associated with the vehicle 100. In some embodiments, a measured hitch angle γ(m) may not provide an accurate measurement of the actual hitch angle γ(a) to a requesting system, which may introduce a potential for inadequate or improper vehicle system control, especially in situations where the hitch angle information may be important to the vehicle system being controlled, such as the trailer backup assist system 105. Furthermore, as previous mentioned, the hitch angle signal may drop-out or become unavailable for different reasons, such as the hitch angle detection apparatus 130 momentarily being unable to sense the relative position of trailer 110, or more specifically, the camera 20 being unable to track the hitch angle target 30 or other hitch sensors, such as a potentiometer, magnetic, optical, or mechanical based sensors, being unable to provide a constant hitch angle measurement, which may similarly cause errors or other disruption in operating the trailer backup assist system 105. Accordingly, an accurate and consistent estimate of the actual hitch angle γ(a) is desired, including for a means to confirm the accuracy of a measured hitch angle γ(m).

Figure 29:
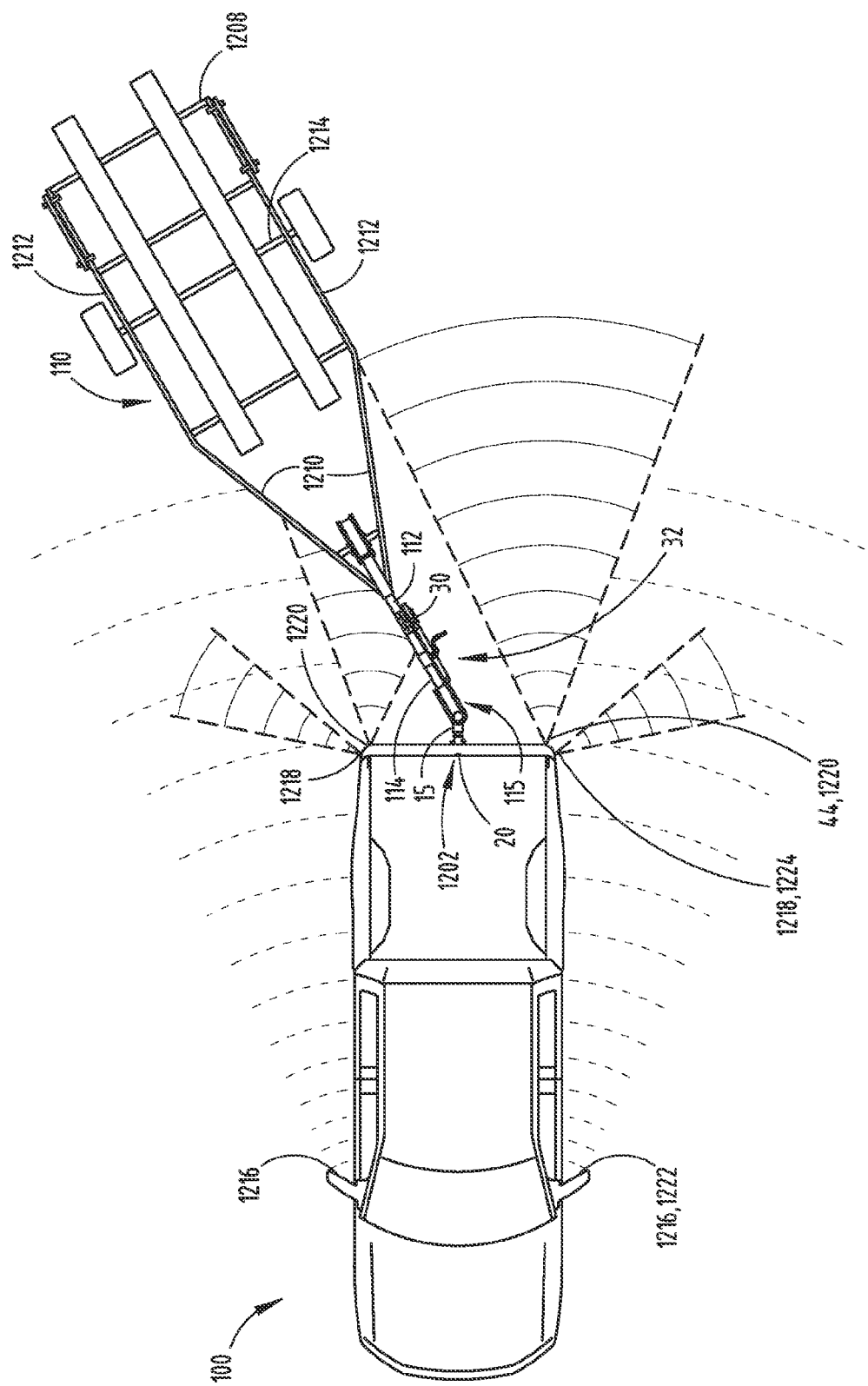
FIG. 29 is a top plan view of a trailer attached to a vehicle having a sensor system, according to one embodiment.
Figure 30:
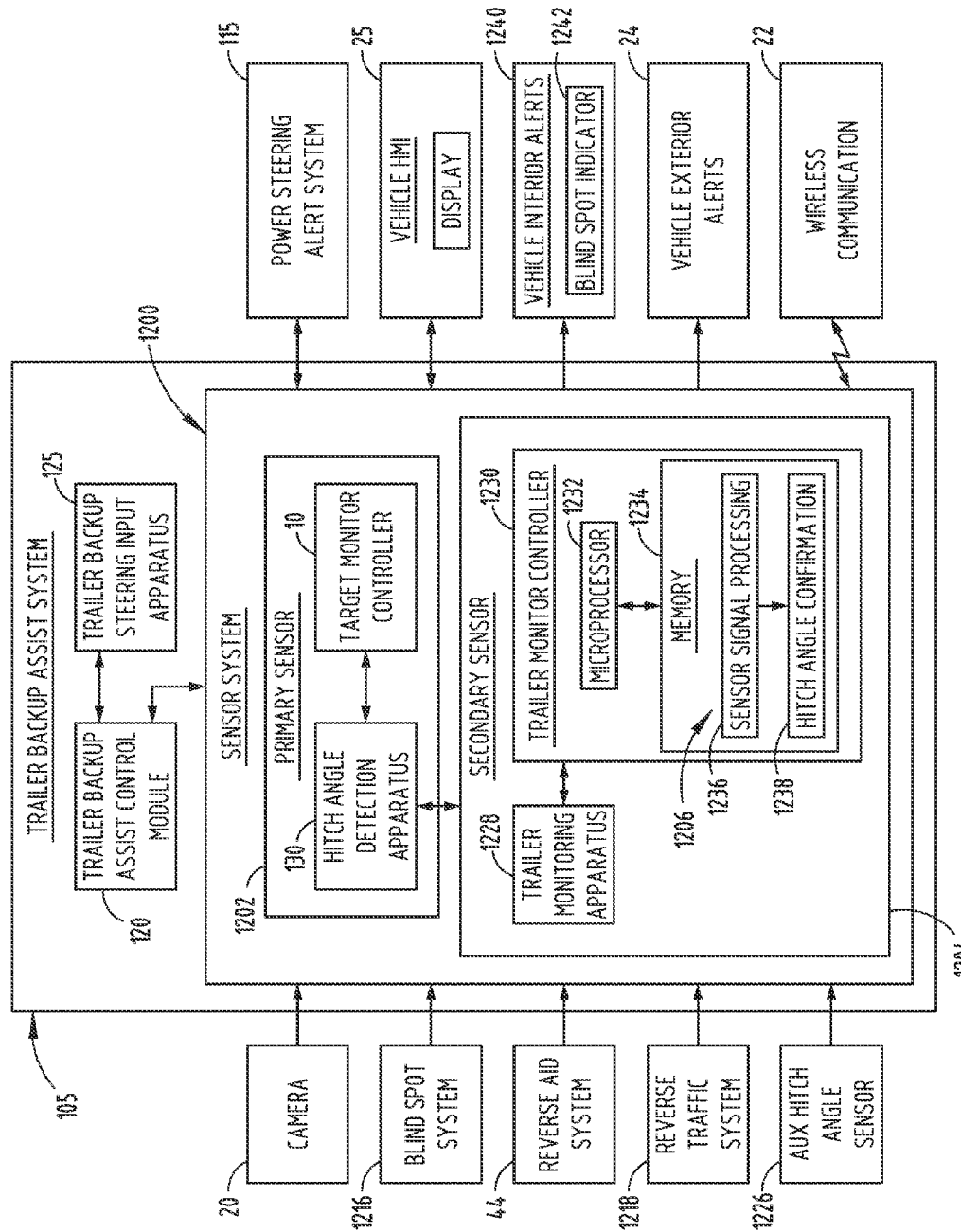
FIG. 30 is a block diagram illustrating the trailer backup assist system employing a sensor system that has a primary sensor and a secondary sensor, according to one embodiment.
Figure 31:
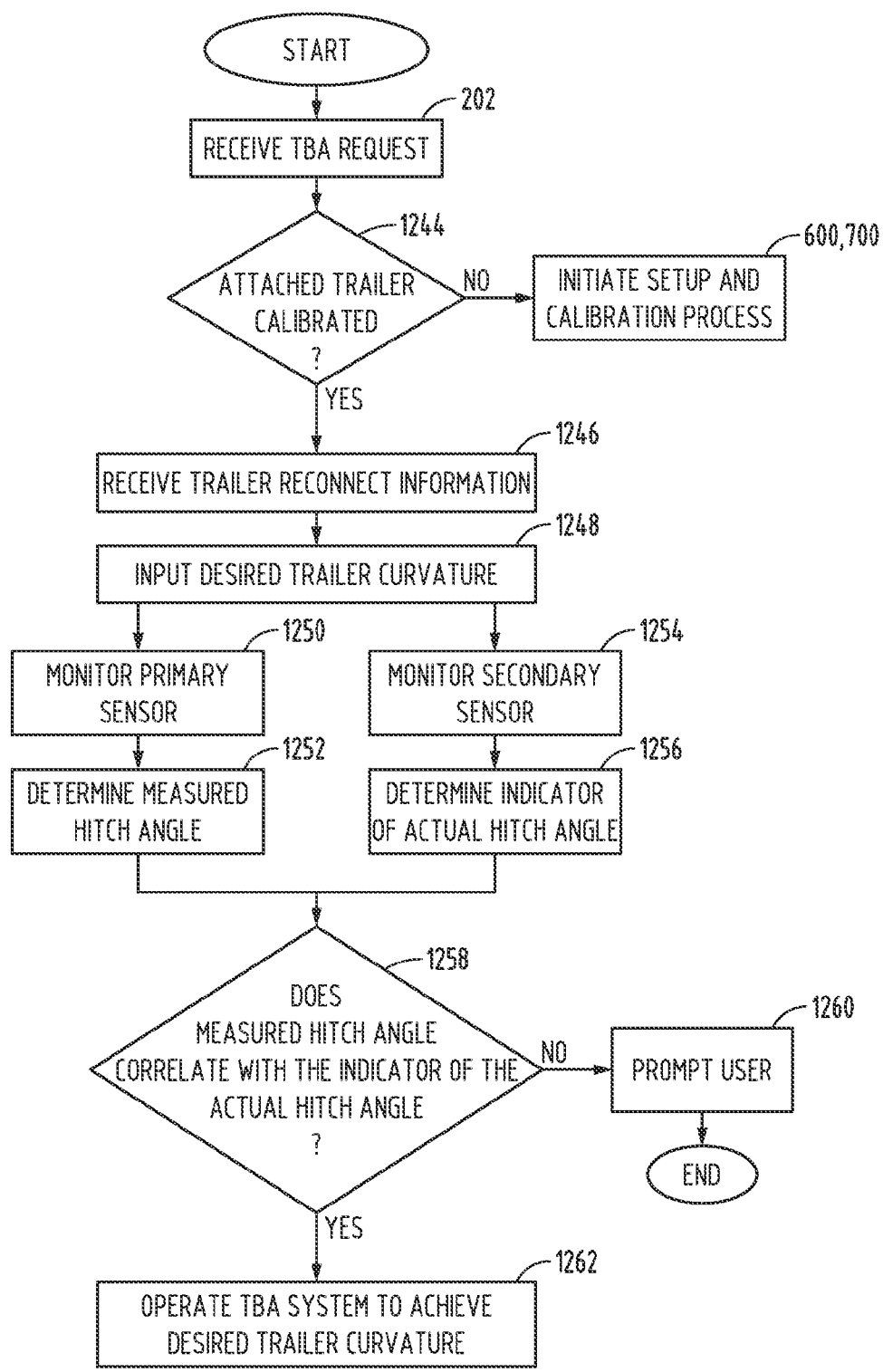
FIG. 31 is a flow diagram illustrating a method for estimating an actual hitch angle of a trailer attached to a vehicle with a sensor system.

Referring to FIGS. 29-31, a sensor system 1200 for estimating a hitch angle of a trailer 110 attached to a vehicle 100 is shown according to one embodiment, which includes a primary sensor 1202 having a camera 20 monitoring a target 30 on the trailer 110 to determine a measured hitch angle γ(m) and a secondary sensor 1204 that monitors the trailer 110 to determine an indicator 1206 of the actual hitch angle γ(a). In this embodiment, the trailer backup assist system 105 operates the vehicle 100 when the measured hitch angle γ(m) correlates with the indicator 1206 of the actual hitch angle γ(a). This and other embodiments of the sensor system 1200 are described in more detail below.

In the embodiment illustrated in FIG. 29, the vehicle 100 is a pickup truck that employs vision based target detection as the primary sensor 1202 to determine the measured hitch angle γ(m). Accordingly, the primary sensor 1202 on the vehicle 100 includes a hitch angle detection apparatus 130 that has a camera 20 as an input for providing video images to a target monitor controller 10 of the primary sensor 1202. The camera 20 (e.g. video imaging camera) is located proximate an upper region of the vehicle tailgate at the rear of the vehicle 100, such that the camera 20 is elevated relative to the target placement zone(s) and has an imaging field of view located and oriented to capture one or more images of the trailer 110, including a region containing one or more desired target placement zone(s) 32. It should be appreciated that the camera 20 may include one or more video imaging cameras and may be located at other locations on the vehicle 100 to acquire images of the trailer 110 and the desired target placement zone(s) 32.

As also shown in FIG. 29, the tow vehicle 100 is pivotally attached to one embodiment of a trailer 110. The trailer 110 has a trailer hitch connector in the form of a coupler assembly 114 connected to a vehicle hitch connector in the form of a receiver hitch and ball 15. The coupler assembly 114 latches onto the hitch ball 15 to provide a pivoting ball joint connection 117. The trailer 110 is shown having a frame 1208 that includes a longitudinally extending bar or trailer tongue 112 that is coupled with opposing front frame members 1210 that angle laterally away from the trailer tongue 112 and extend rearward to couple with side frame members 1212 that extend longitudinally in parallel alignment and are supported by a rotatable wheel axle 1214 of the trailer 110. The forward facing surfaces of the trailer frame 1208, including the trailer tongue 112 and the front and side frame members, 1210, 1212 provide surfaces for the secondary sensor 1204 to monitor the position of the trailer 110. Again, it should be appreciated that the trailer 110 may be configured in various shapes and sizes, may include more than one axle, and may have additional or alternative surfaces for the secondary sensor 1204 (FIG. 30) to monitor.

With further reference to FIG. 29, the vehicle 100 has additional onboard proximity sensors, including but not limited to, a reverse aid system 1220, a blind spot system 1216, and a cross traffic alert system 1218. In one embodiment, the reverse aid system 1220 includes a pair of energy transducers coupled with the rear of the vehicle 100 below the vehicle tailgate on opposing sides of the pivoting ball joint connection 117 between the vehicle 100 and the trailer 110. The energy transducers of the reverse aid system 1220, in the illustrated embodiment, comprise ultrasonic sensors that are directed rearward in the general vicinity of the trailer 110 for monitoring the position of the trailer 110 by measuring a difference in return signals from the ultrasonic sensors on opposing sides of the pivoting ball joint connection 117. The difference in the return signals is used to determine the indicator 1206 (FIG. 30) of the actual hitch angle γ(a). The indicator 1206 may be a second measured hitch angle γ(m2), which can be used to define an acceptable tolerance range of hitch angles. The indicator 1206 may also be another conceivable type of indicator, as described in further detail herein. The reverse aid system 1220 may include additional sensors, including other types of sensors, such as radar sensors, located at several locations at the rear of the vehicle 100, such as laterally spaced along the bumper.

The blind spot system 1216, according to one embodiment shown in FIG. 29, includes an energy transducer 1222 coupled with each of the side rear view mirrors that generate a sensor field adjacent to the sides of the vehicle 100 and rearward therefrom in the general vicinity of the trailer 110. The energy transducers 1222 of the blind spot system 1216 may be ultrasonic sensors that monitor the general position of the trailer 110 to determine an indicator 1206 of the actual hitch angle γ(a). Accordingly, it is conceivable that the blind spot system 1216 may be used to determine when the trailer 110 is roughly centered behind the vehicle 100 or in line with the vehicle 100 when the return signals from both energy transducers 1222 are both low and/or relatively equal. Also, the blind spot system 1216 may provide an indicator 1206 (FIG. 30) of the actual hitch angle γ(a) based on the magnitude of return signal from the respective energy transducer 1222 receiving the greater return signal. For instance, a set of ranges of ascending magnitudes may be set to correspond with a general hitch angle (e.g. 10-20 Hz for 5 degrees, 20-30 Hz for 10 degrees, etc.) or ranges of hitch angles (e.g. 0-40 degrees, 40-70 degrees, 70-100 degrees), such that the return signal may be an indicator 1206 (FIG. 30) of the actual hitch angle γ(a) for use with the sensor system 1200 or for use as a primary sensor 1202 in an alternative embodiment.

The cross traffic alert system 1218, as shown in FIG. 29, also incorporates energy transducers 1224 on the rear of the vehicle 100 to generate sensor fields for monitoring the general position of the trailer. Specifically, the cross traffic alert system 1218 in the illustrated embodiment includes energy transducers 1224 comprising a pair of ultrasonic sensors directed rearward and laterally outward from the rear of the vehicle 100, such that the ultrasonic sensors may determine when the trailer 110 has reached a large hitch angle or is approaching a critical angle indicative of a jackknife condition or jackknife angle γ(j). In addition, the secondary sensor 1204 may comprise an auxiliary hitch angle sensor 1226 (FIG. 30) attached to the trailer 110 and/or the vehicle 100, such as mechanical sensor mechanisms or other conceivable hitch angle sensors. It is also contemplated that any of the onboard proximity sensors (FIG. 32), including, but not limited to, the reverse aid system 1220, blind spot system 1216, the cross traffic alert system 1218, and the auxiliary sensor 1226, may have an ultrasonic sensor, a radar sensor, or a combination of the two. These secondary sensors 1204 for determining the position of the trailer 30 may also include other cameras located on the vehicle, cameras located on the trailer, or other sensing devices generally understood by one having ordinary skill in the art. It is also conceivable that more than one onboard sensor system may be incorporated into the secondary sensor 1204, offering multiple individual sensors that contribute to the indicator 1206 of the actual hitch angle γ(a).

Referring to FIG. 30, the sensor system 1200 of the trailer backup assist system 105 (FIG. 1) has the primary sensor 1202 for determining a first measured hitch angle γ(m) and the secondary sensor 1204 for determining an indicator 1206 of the actual hitch angle γ(a), such as a second measured hitch angle γ(m2). In one embodiment, the secondary sensor 1204 may be used in place of the primary sensor 1202 when the signal of the first measured hitch angle γ(m) becomes unavailable or unreliable, thereby using the second measured hitch angle γ(m2) in place of the first measured hitch angle γ(m). Additionally or alternatively, the secondary sensor 1204 may be used in conjunction with the primary sensor 1202 to confirm that the first measured hitch angle γ(m) correlates with the indicator 1206 of the actual hitch angle γ(a). In one embodiment, as described above, the primary sensor 1202 may include the hitch angle detection apparatus 130 and the target monitor controller 10 for monitoring the target 30 on trailer 110 to determine the first measured hitch angle γ(m). The secondary sensor 1204 includes a trailer monitoring apparatus 1228 and a trailer monitoring controller 1230 for monitoring the trailer 110 to determine the indicator 1206 of the actual hitch angle γ(a). The trailer monitoring controller 1230 may include a microprocessor 1232 and/or other analog and/or digital circuitry for processing one or more routines. Also, the trailer monitoring controller 1230 may include memory 1234 for storing one or more routines including sensor signal processing routines 1236 and hitch angle confirmation routines 1238. It should be appreciated that the trailer monitoring controller 1230 may be a standalone dedicated controller or may be a shared controller integrated with other control functions, such as integrated with the trailer monitoring apparatus 1228 and/or the primary sensor 1202, to process the return signals of the onboard proximity sensors or other secondary sensors and perform related functionality.

The trailer monitoring controller 1230 illustrated in FIG. 30 receives and processes return signals from at least one of the camera 20, the blind spot system 1216, the reverse aid system 1220, the cross traffic alert system 1218, and the auxiliary hitch angle sensor 1226, which may include additional processing from the trailer monitoring apparatus 1228. The secondary sensor 1204 processes the return signals to determine the indicator 1206 of the actual hitch angle γ(a), such as using the reverse aid system 1220 to determine a second measured hitch angle γ(m2) as the indicator 1206 and/or using the blind spot system 1216 to determine a range of hitch angles as the indicator 1206. The hitch angle confirmation routine 1238 further processes the indicator 1206 in connection with the first measured hitch angle γ(m) to determine if the first measured hitch angle γ(m) correlates with the indicator 1206. For instance, the indicator 1206 may include the second measured hitch angle γ(m2) that defines a tolerance range of acceptable hitch angles (e.g. +/−3 degrees of the second measured hitch angle, or a wider or narrower tolerance range), such that the first measured hitch angle γ(m) correlates with the indicator 1206 when the first measured hitch angle γ(m) is within the tolerance range. It is contemplated that in one exemplary embodiment, the hitch angle confirmation routine 1238 may also process the first measured hitch angle γ(m) to define an average measurement thereof over an interval of time (e.g. 2 seconds, or a longer or shorter interval) to reduce instability and variance of the first measured hitch angle γ(m).

As also illustrated in FIG. 30, the sensor system 1200 may communicate with one or more devices including, the vehicle HMI 25, the vehicle exterior alerts 24, and the vehicle interior alerts 1240, which may include a blind spot indicator light 1242 that provides a visual alert. It is contemplated that the blind spot indicator light 1242 may be on an interior or exterior of the vehicle 100, such as on or proximate a side rear view mirror, to alert the driver that the primary sensor 1202 does not correlate with the indicator 1206 of the actual hitch angle γ(a), the trailer 110 is approaching or is in a jackknife condition, or other conceivable warnings that may not be able to be displayed on the center stack screen when reversing the vehicle 100. Additional warnings that may be provided with the blind spot indicator light 1242 include overspeed warning that alerts the driver that they are approaching a speed greater than the speed configured for operating the trailer backup assist system 105, a steering override warning that alerts the driver that steering has exceeded the acceptable steering torque configured for operating the trailer backup assist system 105, or an internal fault warning that alerts the driver that the trailer backup assist system 105 has become inoperative and has to canceled out for other conceivable errors. As previously described, the sensor system 1200 may communicate via wireless communication 22 to various types of mobile devices or via onboard communication to one or more vehicle human machine interfaces (HMIs) 25, including a vehicle display, such as a center stack mounted navigation/entertainment display.

The method for estimating the actual hitch angle γ(a) using the sensor system 1200 of the trailer backup assist system 105 is illustrated in FIG. 31 according to one embodiment. Initially, at step 202 the system may receive an initiation request to activate the trailer backup assist system 105 for tracking the hitch angle. Before proceeding to monitor the hitch angle, at step 1244 the system confirms that the attached trailer 110 has been calibrated and setup for operation with the trailer backup assist system 105, and if not, the calibration and setup process 600, 700 are initiated, as previously described. Although the calibration and setup processes 600, 700 may involve gathering the kinematic information for the attached trailer 110, at step 1246, the sensor system receives this information for use with the primary and/or secondary sensors 1202, 1204, if necessary. For instance, if a vision based target detection system is included as the primary sensor 1202, the kinematic information will provide parameters from the target setup information in addition to the input or otherwise determined dimensions of the trailer 110. The trailer kinematic information may also be used by the sensor system 1200 to modify the tolerance range of acceptable first measured hitch angles and to modify the magnitudes of sensor return signals or corresponding ranges of hitch angles.

Still referring to FIG. 31, once the trailer backup assist system 105 is generally setup and calibrated with the trailer 110 attached to the vehicle 100, at step 1248, an input is made with the input device, such as selecting the desired hitch angle between the vehicle 100 and trailer 110 by manipulating the steering input apparatus 125, as previously described. At step 1250, the sensor system 1200 begins to monitor the trailer 110 with the primary sensor 1202 to determine the first measured hitch angle γ(m) at step 1252. In conjunction with the operation of the primary sensor, at step 1254, the secondary sensor similarly monitors the trailer 110 to determine the indicator 1206 of the actual hitch angle γ(a) at step 1256. At step 1258, the first measured hitch angle γ(m) is compared with the indicator 1206 to determine if the measured hitch angle γ(m) of the primary sensor 1202 correlates therewith, and if so, thereby reflecting a generally accurate measurement of the actual hitch angle γ(a). If the measured hitch angle γ(m) is determined to not correlate with the indicator 1206, the user may be prompted at step 1260, such as being alerted with any of the interior or exterior alerts 1240, 24, being alerted and/or requested with the vehicle HMI to direct whether the trailer backup assist system 105 should proceed to operate the vehicle 100, and similarly being alerted and/or prompted with a mobile device via wireless communication 22, as described above. If the measured hitch angle γ(m) of the primary sensor 1202 correlates with the indicator 1206 of the actual hitch angle γ(a), then, at step 1262, the trailer backup assist system 105 may operate to achieve the desired input made with the input device, such as steering the vehicle 100 with the power-steering assist system 115 to achieve the desired hitch angle input with the steering input apparatus 125.

While the illustrated embodiment of the sensor system 1200 includes a primary sensor 1202 and a secondary sensor 1204, it should be appreciated that the sensor system 1200 may include addition sensors (tertiary sensor, quaternary sensor, etc.) with additional corresponding indicators for confirming the accuracy of the indicator 1206 from the secondary sensor 1204 and the measured angle γ(m) from the primary sensor 1202. It is also be understood that the sensor system 1200 may additionally, or alternatively, be adapted for use with other vehicle related applications, such as trailer sway limiters or other conceivable applications relying upon the accuracy of the measured hitch angle γ(m).

Hitch Angle Estimation and Verification

According to an additional embodiment for estimating the actual hitch angle, a system uses an estimated distance between a wireless receiver on the vehicle and a wireless transmitter on the trailer. The wireless receiver on the vehicle is located at a predetermined distance from a trailer mount and the wireless transmitter on the trailer is located at an end of the trailer opposite the trailer mount. With respect to this embodiment, the system includes a controller for monitoring power returns of a signal transmitted from the transmitter to the receiver and for estimating the distance between the transmitter and the receiver as a function of a path loss propagation of the transmitted signal. The actual hitch angle is then estimated using the estimated distance, the predetermined distance, and a trailer length.

Figure 32:
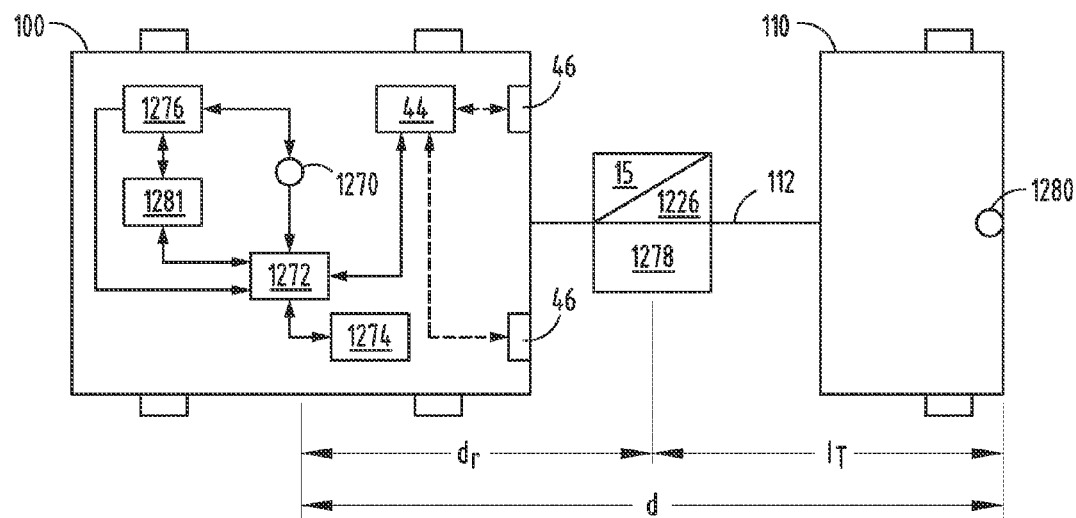
FIG. 32 is an automotive vehicle having a hitch angle estimating system of the disclosed subject matter.
Figure 33:
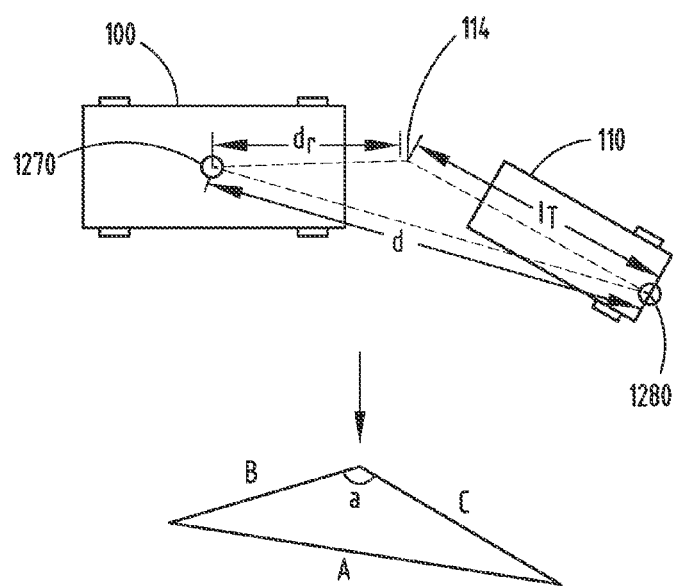
FIG. 33 is a block diagram of a vehicle having a trailer coupled thereto and a relationship to the law of cosines.
Figure 34:
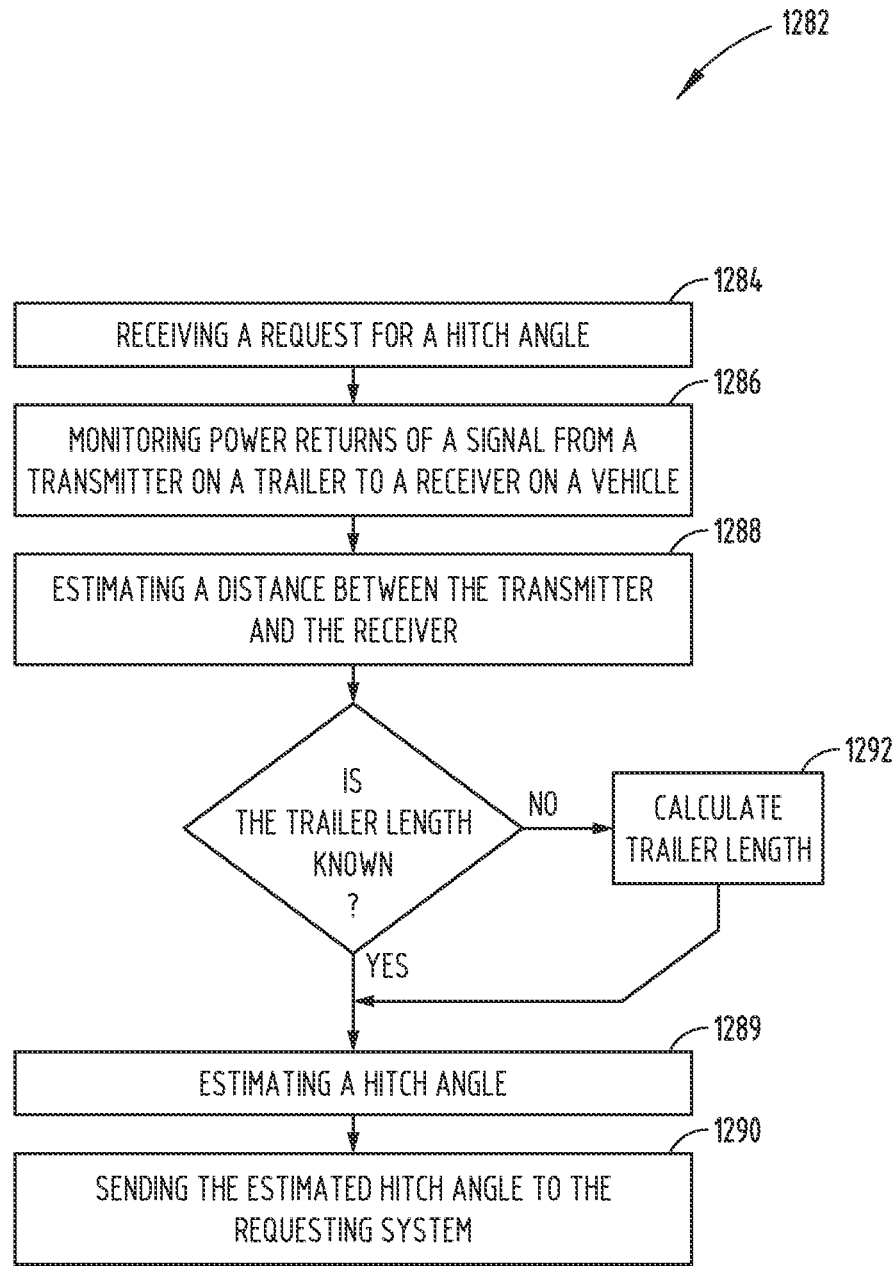
FIG. 34 is a flow chart of a method of estimating a hitch angle.

Referring now to FIGS. 32-34, one embodiment the system for estimating the actual hitch angle is shown to include a wireless receiver 1270 on a vehicle 100 with a trailer backup assist system 105. The wireless receiver 1270 is mounted at a known vehicle location, such as a central vehicle body position. In the illustrated embodiment, the vehicle 100 also has a controller 1272 for receiving information from the wireless receiver 1270, which may be a single centralized vehicle controller or a combination of controllers. The controller 1272 may be programmed to perform various functions and control various outputs and may have a memory 1274 associated therewith. The memory 1274 may store various parameters, thresholds, patterns, tables, or maps; for example, parameters may include known, fixed vehicle measurements such as wheel base, vehicle length, trailer length and distances from known parts of the vehicle. The controller 1272 receives information from a number of sensors on or around the vehicle 100 associated with one or more sensing systems 1276, which may include, but are not limited to, speed sensors, yaw rate sensor, lateral acceleration sensor, roll rate sensor, vertical acceleration sensor, a longitudinal acceleration sensor, a pitch rate sensor, and a steering angle position sensor. These sensors may also be part of an inertial measurement unit that would most likely be located at the center of the vehicle body.

As shown in FIGS. 32-33, a trailer 110 may be towed behind the vehicle 100. The trailer 110 may include a tongue 112 and trailer wheels, as well as a trailer brake and electrical components such as lights. A wiring harness 1278 may be used to couple the trailer 110 to the electrical system of the vehicle 100 and ultimately to the controller 1272. The trailer 110 is coupled to the vehicle 100, as by a hitch ball 15 or other mount on the vehicle 100, through a coupler assembly 114 located at the end of the trailer tongue 112. A distance $d_r$ defines a reference distance which is the distance between the wireless receiver 1270 on the vehicle 100 and the hitch ball 15 or other mount on the vehicle 100. This is a fixed distance and may be stored in memory 1274. The coupler assembly 114 may have a hitch angle sensor 1226 associated therewith. Alternatively, the hitch angle sensor 1226 may be associated with the mount on the vehicle 100. The hitch angle sensor 1226 is used to determine the angle position of the trailer 110 relative to the vehicle 100. Various types of hitch angle sensors, such as resistive, inductive, ultrasonic, or capacitive type sensors may be used, in addition to other hitch angle sensor system disclosed herein.

A wireless transmitter 1280 is positioned on the trailer 110 at a known location, preferably at the end of the trailer. This wireless transmitter 1280 is in communication with the wireless receiver 1270 that is located on the vehicle 100. The wireless receiver 1270 has been placed at a known location of the vehicle 100 such that a reference distance, $d_r$, from the receiver 1270 to the hitch ball 15 at the rear of the vehicle 100 is known and stored in memory 1274. Examples of wireless transmitting and receiving devices that may be used are Radio Frequency Identification (RFID), Bluetooth, and the like. As discussed above, the wireless receiver 1270 is positioned at a location on the vehicle 100 the predetermined distance, $d_r$, from the vehicle's trailer mount or hitch ball 15. The wireless transmitter 1280 and the wireless receiver 1270 are compatible units that transmit and receive signals between the vehicle 100 and the trailer 110. The controller 1272 monitors the power returns of the transmitted signals. By monitoring the power returns of signals sent by the transmitter to the receiver, the controller 1272 may estimate a distance, d, between the vehicle 100 and the trailer 110.

The disclosed subject matter also uses a trailer length, $l_T$. This value may be a known value entered by the driver, stored in controller memory, or otherwise sensed, calculated or estimated. For example, an accurate estimate of trailer length, $l_T$, is possible using measurements of the signal transmitted from the wireless transmitter 1280 on the trailer 110 to the wireless receiver 1270 on the vehicle 100 when the hitch angle is zero. It is also possible to estimate the trailer length when the measurements are taken while the vehicle yaw rate is zero for a predetermined period of time.

The hitch angle is thereby estimated using the trailer length, $l_T$, and path loss propagation of a signal transmitted from the transmitter on the trailer 110 to the receiver 1270 on the vehicle 100. The hitch angle estimate may then be used as an input for control algorithms associated with a variety of vehicle systems 1281 such as trailer sway, trailer backup assist, stability control and other systems. Alternatively, the hitch angle estimate may be used to verify, or validate, the measurement taken by a hitch angle sensor.

Referring to FIG. 33, a block diagram of a vehicle 100 and trailer 110 combination, where a hitch angle is non-zero, is shown with respect to the law of cosines:

$$A^2 = B^2 + C^2 - 2BC \cos(a)$$

The vehicle 100 has the trailer 110 attached thereto with the receiver 1270 located on the vehicle a predetermined reference distance, $d_r$, from the trailer hitch ball 15, which corresponds to B for the triangle reflecting the law of cosines in FIG. 33. The trailer length, $l_T$, is shown and the transmitter 1280 is located at the end of the trailer 110. The trailer length, $l_T$, corresponds to C in the law of cosines. The distance, d, between the transmitter 1280 and the receiver 1270 is shown, which corresponds to A in the law of cosines. The reference distance, $d_r$, is a known distance that may be stored in memory 1274. The trailer length, $l_T$, may also be a known distance that is stored in memory 1274 or it may be estimated or calculated as described later herein. The distance, d, is calculated as described hereinafter with reference to FIG. 34.

Referring to FIG. 34, a flow chart of the method 1282 for estimating a hitch angle in accordance with the disclosed subject matter is shown. The method 1282 can be carried out using the vehicle and trailer architecture discussed above in reference to the vehicle 100 and trailer 110 for FIG. 32. Accordingly the hitch angle estimate may be supplied to any vehicle system 1281 requesting the information.

An operation 1284 is performed for requesting hitch angle estimation. A request for hitch angle estimation may come from a vehicle control system 1281 that requires the information as an input to the control algorithm associated therewith or it may come from a control system 1281 that wants to validate or verify a hitch angle provided by a hitch angle sensor. Examples of vehicle control systems 1281 that may request hitch angle information may be a trailer backup assist system 105, a trailer sway control system, a trailer brake control system, and a vehicle dynamic control system such as roll stability control or yaw stability control. These are only a few examples of systems 1281 that may utilize hitch angle information as an input to a control algorithm.

An operation 1286 is performed to monitor power returns of signals transmitted from the trailer 110 to the vehicle 100. Path loss is proportional to the square of the distance between the transmitter and the receiver and power returns of signals transmitted may be used to estimate a distance between the transmitter and the receiver. The power returns are measured, at the receiver, at predetermined time intervals and stored in controller memory over a predetermined period of time. The power returns may be accessed by the controller for various operations and/or functions that use the values to estimate hitch angle.

An operation 1288 is performed to estimate the distance, d, between the transmitter and the receiver. Estimating the distance, d, between the wireless transmitter and the wireless receiver 1270 is accomplished by using the, measured power returns or measured path loss of the signal being transmitted. Path loss is proportional to the square of the distance between the transmitter and the receiver, and also to the square of the frequency of the transmitted signal. Signal propagation may be represented by Friis transmission formula:

$$P_r(d) = \frac{P_t G_t G_r \lambda^2}{(4\pi)^2 d^2 L}$$

where, $P_t$ is the transmission power in Watts, $G_t$ and $G_r$ are gains associated with the receiver and the transmitter respectively, $\lambda$ is the wavelength, L are system losses, and d is the distance between the transmitter and the receiver.

Accordingly, transmission power decreases at a rate proportional to $d^2$. Therefore, knowing the path loss, PL, associated with the transmitted signal will provide an estimate of the distance, d, between the transmitter and the receiver. Path loss (PL) is represented by the following equations:

$$PL_{dB} = 10\log\frac{P_t}{P_r} = -10\log\left(\frac{G_t G_r \lambda^2}{4\pi^2 d^2 L}\right)$$

$$PL_{dB} = -10\log\left(\frac{G_t G_r \lambda^2}{(4\pi)^2 L}\right) + 10\log(d^2)$$

$$PL_{dB} = -10\log\left(\frac{G_t G_r \lambda^2}{(4\pi)^2 L}\right) + 20\log(d)$$

$P_r$ decreases at a rate that is proportional to $d^2$. The power of the signal received at the receiver may be represented as:

$$P_r(d) = P_r(d_0)\left(\frac{d_0}{d}\right)^2 \text{ for } d > d_0 > d_f$$

The distance, d, may be derived from this formula and represents the overall distance between the transmitter on the trailer and the receiver on the vehicle. The distance, $d_0$, is a known received power reference point and the distance, $d_f$, is a far-field distance.

The reference distance, $d_r$, is known. If the trailer length, $l_T$ is known, then an operation 1289, using the distance, d, the trailer length, $l_T$, the known reference distance, $d_r$, between the receiver and the trailer hitch, and the law of cosines, is performed to calculate the hitch angle. From the law of cosines, provided above, the hitch angle is given by:

$$a = \cos^{-1}\left[\frac{A^2 - B^2 - C^2}{-2BC}\right]$$

An operation 1290 is performed in which the vehicle system that is requesting the information receives the hitch angle estimation. The disclosed subject matter provides an estimate of hitch angle even when a hitch angle sensor is unavailable. If a system relies on a hitch angle sensor, the disclosed subject matter may provide verification, as a redundant sensor, that the hitch angle sensor is operating properly.

As discussed above, the trailer length, $l_T$, may be a known value stored in memory or it may be a value that is calculated according to the disclosed subject matter. The trailer length may be calculated 1292 by comparing distances, d, between the transmitter and the receiver that have been estimated and stored in memory over a period of time. A predetermined number of distance estimates may be stored in controller memory. A comparison of the stored distances may result in a largest distance may be identified. The largest distance estimate may be associated with a zero hitch angle. This identified largest distance, less the known reference distance, $d_r$ will be representative of, and may be stored as, the trailer length, $l_T$.

As an alternative, the trailer length, $l_T$, may be estimated using a yaw rate provided by a yaw rate sensor on the vehicle to determine when the trailer is a zero hitch angle. A yaw rate sensor is typically available as part of the sensor system 1200 on the vehicle. A zero yaw rate is an indicator that a vehicle is travelling along a straight path, i.e., the vehicle is not turning. The fact that the yaw rate is zero alone is not adequate to identify a zero hitch angle because the vehicle may have just stopped turning even though a non-zero hitch angle exists. However, monitoring yaw rate over time will provide confirmation that the vehicle has driven straight forward for a sufficient predetermined period of time while maintaining a zero or near zero yaw rate. A zero yaw rate, sensed over time, provides an indication that the trailer has straightened out and it can be inferred that the hitch angle is zero at that point. Upon verification of zero hitch angle, the operation to calculate trailer length 1292 is performed. The estimated distance between the transmitter and the receiver when the hitch angle is zero less the predetermined distance, $d_r$, defines the trailer length, $l_T$.

The predetermined period of time that the yaw rate should remain at zero before the assumption that the hitch angle is zero will be associated with an actual distance the vehicle trailer combination needs to travel to ensure that the hitch angle is zero. This may be determined through testing and stored in the controller memory.

The disclosed subject matter is advantageous in that it provides an estimate of hitch angle whether or not a hitch angle sensor is present on a vehicle. The disclosed subject matter is even advantageous for a vehicle that has a hitch angle sensor in that it provides a method for verifying, or validating, the accuracy of a hitch angle sensed by a hitch angle sensor. This is especially important for vehicle systems that rely critically on the value of the hitch angle being sensed, for example, trailer backup assist systems, trailer sway control systems and trailer brake control systems.

Hitch Angle Calibration

As previously mentioned with reference to FIG. 10 and a driver's interaction with the human machine interface (HMI) device 102, after the trailer setup module 600 is complete at step 620, the calibration module 700, according to one embodiment, calibrates the curvature control algorithm with the proper trailer measurements and calibrates the trailer backup assist system for any hitch angle offset that may be present. In the one embodiment, the calibration module 700 may instruct the driver to pull the vehicle-trailer combination straightforward until a hitch angle sensor calibration is complete, which may be notified to the driver via the HMI device 102. Depending on any error resulting from the trailer measurements or the potential inability of the vehicle to be pulled straight forward, additional and alternative embodiments of calibrating the trailer backup assist system are described herein.

Figure 35:
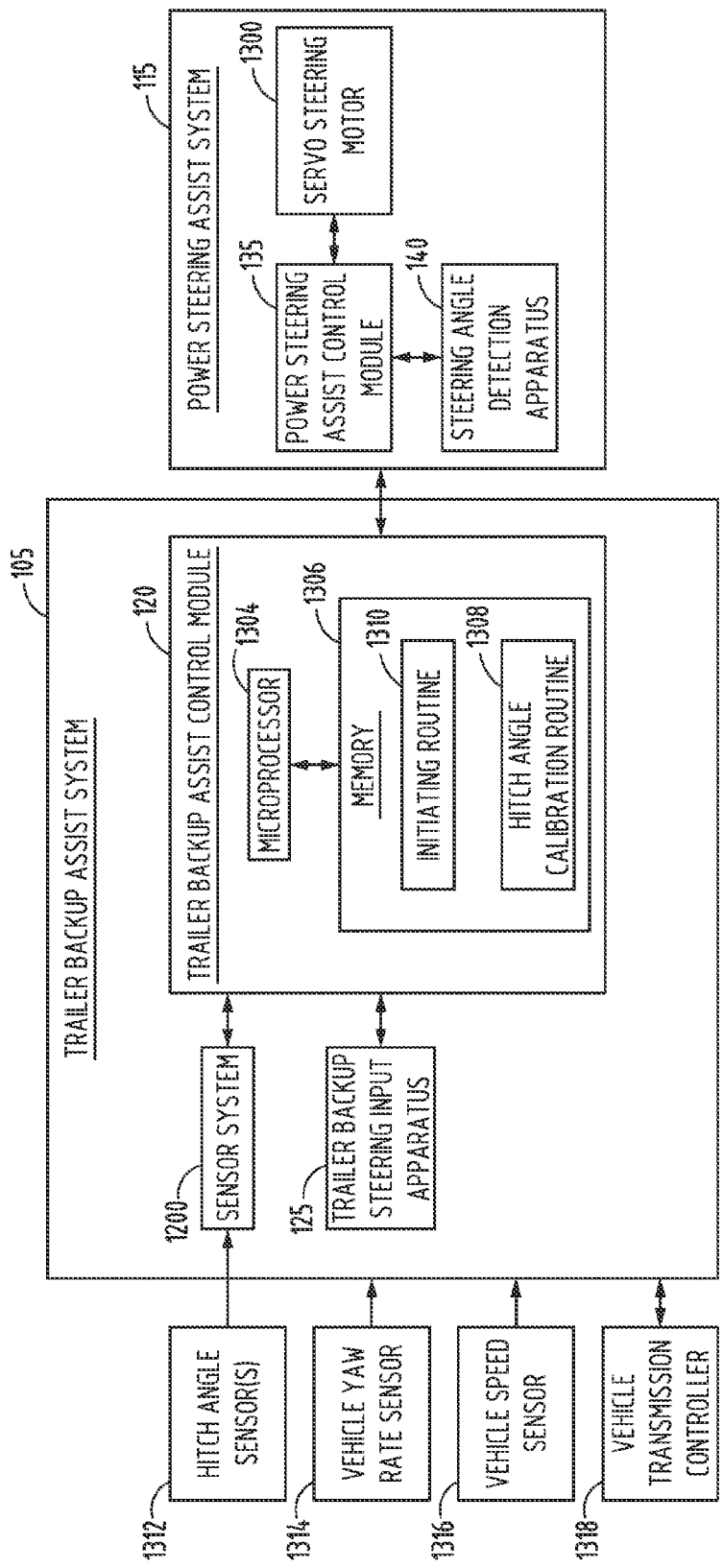
FIG. 35 is a block diagram illustrating one embodiment of the trailer backup assist system having the trailer backup assist control module with a hitch angle calibration routine.
Figure 36:
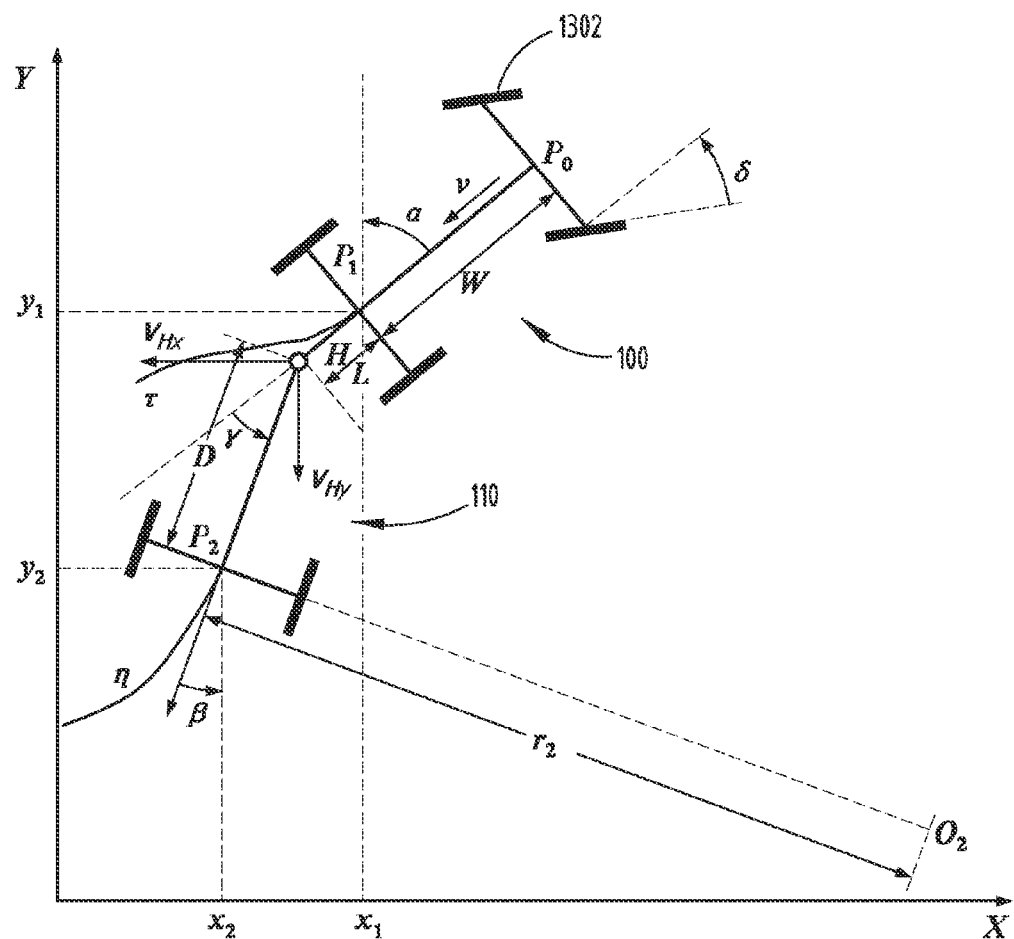
FIG. 36 is a diagram that illustrates the geometry of a vehicle and a trailer overlaid with a two-dimensional x-y coordinate system that identifies variables used to calculate kinematic information of the vehicle and trailer system.

With reference to FIG. 35, the vehicle trailer backup assist system 105 is illustrated having the trailer backup assist control module 120 in communication with the sensor system 1200 and the trailer backup steering input apparatus 125 as part of the trailer backup assist system 105. The trailer backup assist system 105 in the illustrated embodiment, receives sensor information from the one or more hitch angle sensors 1312, a vehicle yaw rate sensor 1314, and a vehicle speed sensor 1316, and may communicate with other conceivable sensors on the vehicle 100 or trailer 110. For instance, the illustrated embodiment of the trailer backup assist system 105 also communicates with the vehicle transmission controller 1318, such as receiving the presently engaged transmission gear. Furthermore, the trailer backup assist control module 120 is also in direct communication with the power steering assist system 115, which has the power steering assist control module 135 for communicating with the steering angle detection apparatus 140 and a servo steering motor 1300, or servomotor, for operating the steered wheels 1302 of the towing vehicle 100 (FIG. 36). The illustrated embodiment of the trailer backup assist control module 120 includes a microprocessor 1304 for processing one or more routines stored in the corresponding memory 1306 of the trailer backup assist control module 120. The memory in one embodiment includes a hitch angle calibration routine 1308 and an initiating routine 1310. It should be appreciated that the trailer backup assist control module 120 may be a standalone dedicated controller or may be a shared controller integrated with other control functions, such as integrated with the sensor system 1200, the trailer backup steering input apparatus 125, or other systems of the towing vehicle.

As shown in FIG. 36, a schematic illustration of the vehicle 100 and trailer 110 combination are overlaid with an x-y coordinate system showing kinematic variables and angles, including the steering angle δ, trailer length D, and hitch angle γ, which may be affected by the dynamics of the vehicle 100 and trailer 110 combination and representable in kinematic equations, as similarly discussed with reference to FIG. 5.

Figure 37:
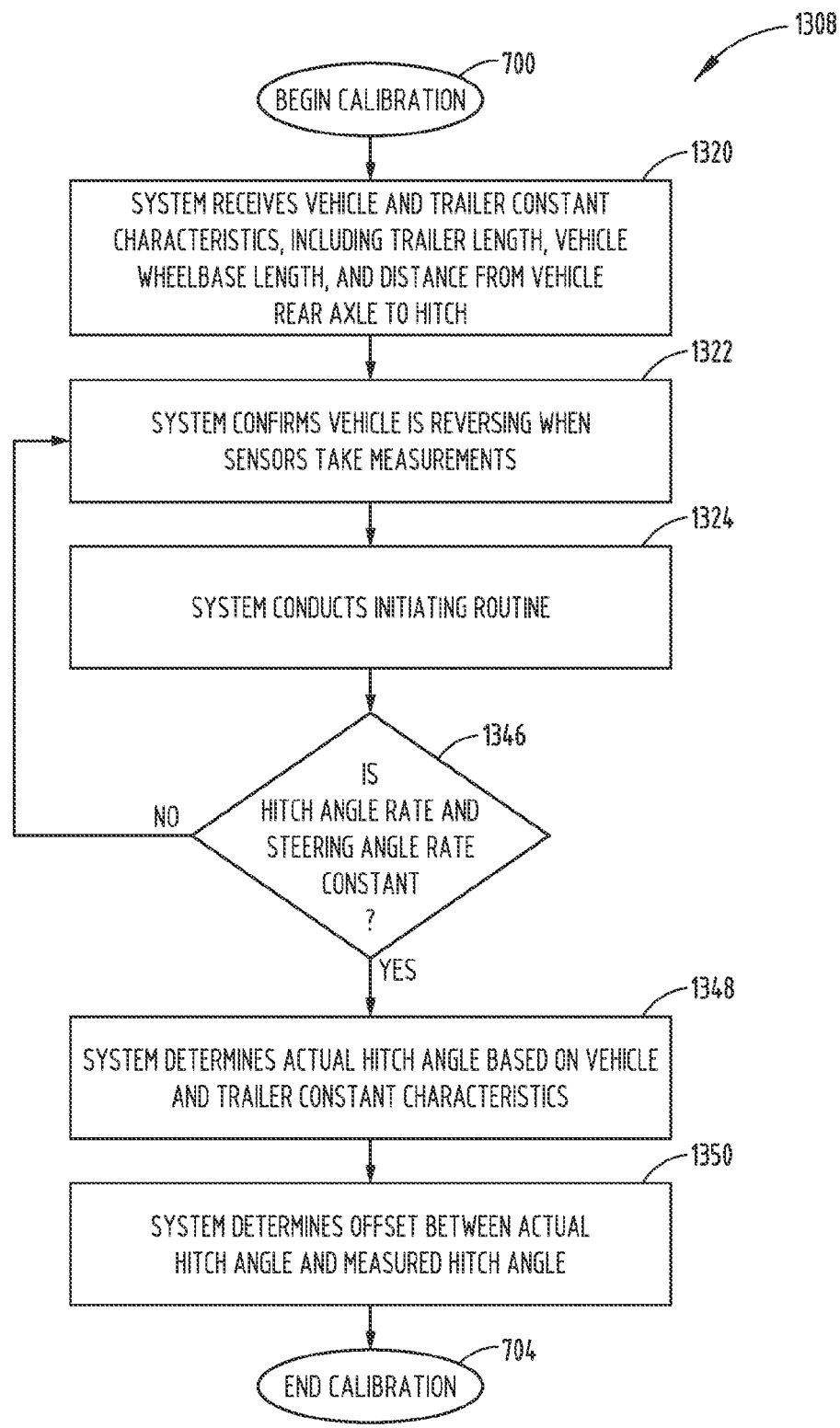
FIG. 37 is a flow diagram illustrating one embodiment of the hitch angle calibration routine.
Figure 38:
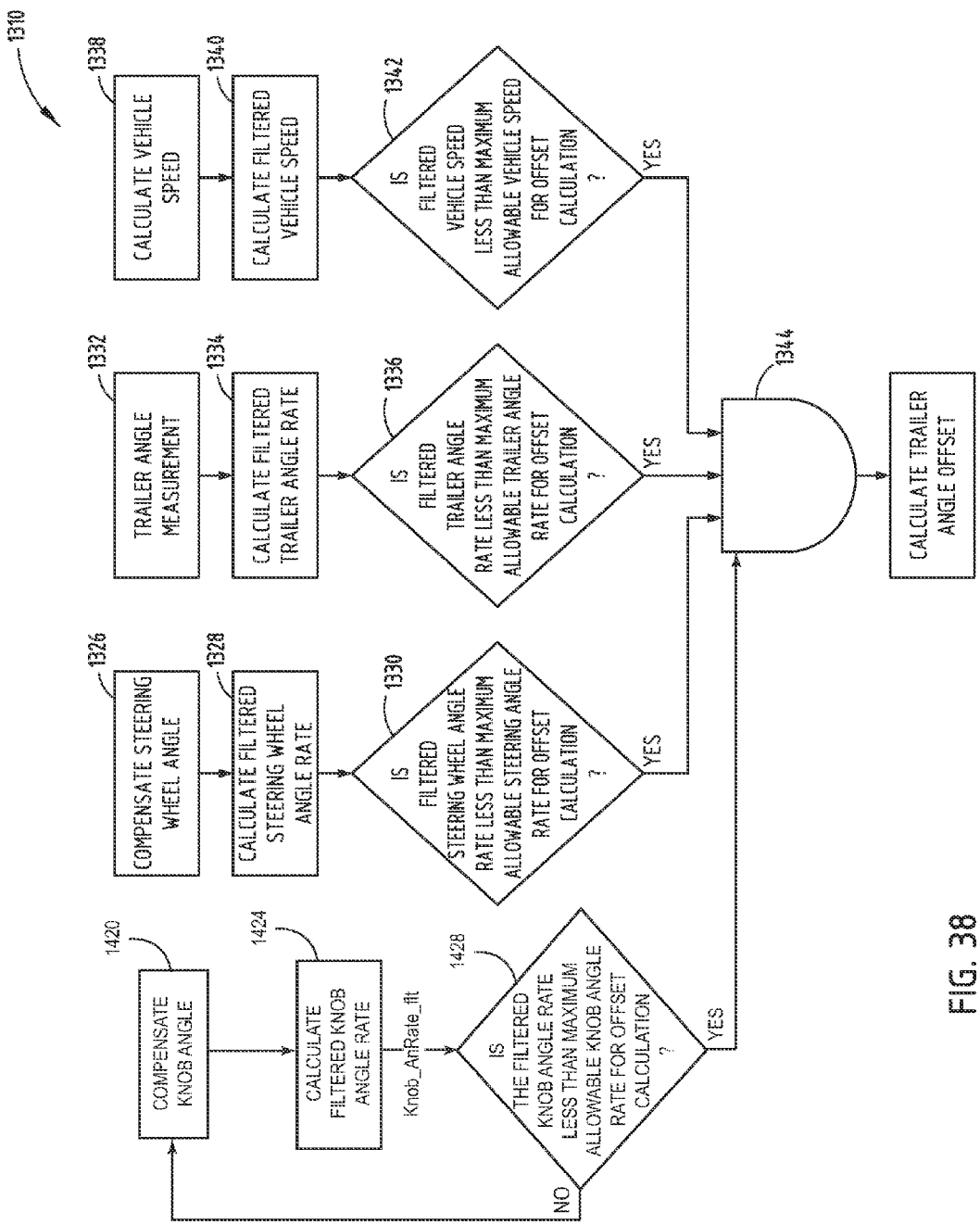
FIG. 38 is a flow diagram illustrating an initiating routine that is performed prior to calculating the trailer angle offset, according to one embodiment.

Referring to FIGS. 37-38, a method is shown for estimating the actual hitch angle γ(a) between the vehicle 100 and the trailer 110, according to one embodiment. The method provides for sensing a measured hitch angle γ(m) with at least one hitch angle sensor 1312 (FIG. 35) on the vehicle 100 and sensing a steering angle δ of the steered wheels 1302 (FIG. 36) of the vehicle 100. Further, the method provides for reversing the vehicle 100, and thereby determining an offset γ(o) between the measured hitch angle γ(m) and the actual hitch angle γ(a) when the measured hitch angle γ(m) and the steering angle δ are substantially constant while the vehicle 100 is reversing. As defined herein, the offset γ(o) is the difference between the measured hitch angle γ(m) and the actual hitch angle γ(a).

As reflected in the diagram shown in FIG. 36, when the hitch angle γ and steering angle δ are substantially constant, the yaw rate of the vehicle 100 is also substantially constant and equal to the yaw rate of the trailer 110. This interaction is used to formulate kinematic equations that can be solved for determining the offset γ(o) between the measured hitch angle γ(m) and the actual hitch angle γ(a). Specifically, the yaw rate of the vehicle 100, as measured by the vehicle yaw rate sensor 1314 (FIG. 35) or another conceivable onboard vehicle sensor that may be configured to sense the yaw rate, provides the following equation:

$$\frac{d\alpha}{dt} = -\frac{v}{W}\tan\delta$$

Furthermore, the yaw rate of the trailer can be represented with the following equation:

$$\frac{d\beta}{dt} = \frac{v}{D}\sin\gamma + \frac{Lv}{DW}\cos\gamma\tan\delta$$

where,
δ is the steering angle of the front wheels
D is the distance from the hitch to the trailer axle
W is the vehicle wheelbase (distance between both axles)
L is the distance from the vehicle rear axle and hitch
γ is the hitch angle Accordingly, when the yaw rate of the vehicle 100 and the trailer 110 become equal, the actual hitch angle γ(a) will likely be constant, such that the desired hitch angle provided by the trail backup steering input apparatus 125, such as the previously described rotatable input control device shown in FIG. 2, is also constant and substantially achieved. For example, the desired hitch angle received from the trailer backup steering input apparatus 125 may be constant when the driver attempts to reverse the trailer 110 in a straight line with the vehicle 100 (i.e. a zero curvature command) or when the driver inputs a maximum knob angle command. The resulting constant hitch angle results in the following equation:

$$c = a\cos\gamma + b\sin\gamma$$

This equation can be rewritten as follows:

$$c = a\sqrt{1-\sin^2\gamma} + b\sin\gamma$$

The above equation can be solved with the quadratic equation that solves for the hitch angle γ. Thereafter, when breaking up the hitch angle γ into a measured hitch angle γ(m) and an offset angle γ(o), the equation can be rewritten as follows:

$$\gamma_o = \arcsin\frac{bc \pm a\sqrt{b^2 + a^2 - c^2}}{b^2 + a^2} - \gamma_m$$

where, $$c = -\frac{1}{W}\tan\delta$$

$$b = \frac{1}{D}$$

$$a = \frac{L}{DW}\tan\delta$$

Accordingly, the hitch angle offset γ(o) may be determined as a function of the length D of the trailer 110, the wheelbase length W of the vehicle 100, and the distance L from a rear axle of the vehicle 100 to the trailer 110 as shown in FIG. 36, while meeting the conditions provided above to use such an equation. Specifically, the conditions generally include that the vehicle 100 and trailer 110 are reversing and that the measured hitch angle γ(m) and the steering angle δ are substantially constant during the reversing motion for at least a threshold period of time or over a threshold distance of motion.

As illustrated in FIG. 37, the calibration module 700 processes one embodiment of the hitch angle calibration routine 1308 to provide the method according to the following steps. At step 1320, the system receives generally fixed characteristics of the vehicle 100 and the trailer 110, including the trailer length D, the vehicle wheelbase length W, and the distance L from the vehicle's rear axle to the hitch connection. These generally fixed characteristics are described as such because the vehicle 100 and trailer 110 dimensions can be preloaded or looked up in product specifications, and if these dimensions are not known or otherwise already determined by the system, they can be measured and input into the memory 1306 or other vehicle memory prior to operating the vehicle 100 with the trailer backup assist system 105. The hitch angle calibration routine 1308 shown in FIG. 37, also provides at step 1322, confirming that the vehicle 100 is reversing when the sensors of the sensor system 1200 are taking continuous measurements of the vehicle 100 and trailer 110 variables. Specifically, the system may confirm that the vehicle 100 is reversing with use of directional speed sensors, the gear position of the transmission controller 1318, GPS inputs, or other conceivable indicators of vehicle 100 direction.

At step 1324, the system conducts the initiating routine 1310 to further confirm that the vehicle 100 and trailer 110 combination are in a condition to determine the offset γ(o) between the measured hitch angle γ(m) and the actual hitch angle γ(a). As shown in FIG. 38, one embodiment of the initiating routine 1310 includes determining a compensated steering wheel angle 1326 which is an indication of the steerable road wheel angle, calculating a filtered steering wheel angle rate 1328, and then determining at step 1330 whether the filtered steering wheel angle rate is less than a maximum allowable steering angle rate for the offset calculation. Also, the initiating routine 1310 takes the measured trailer angle γ(m) at step 1332 and calculates a filtered trailer angle rate over time at step 1334. The initiating routine then at step 1336 determines whether the filtered trailer angle rate is less than a maximum allowable trailer angle rate for determining the offset calculation. Further, the initiating routine 1310 takes the sensed or otherwise calculated vehicle speed from step 1338 and further calculates a filtered vehicle speed at step 1340. The filtered vehicle speed is then processed at step 1342 to determine whether it is less than a maximum allowable vehicle speed for determining the offset calculation. If the conditions of the initiating routine 1310 are met at step 1344, the trailer backup assist system 105 allows the hitch angle calibration routine 1308 to continue towards determining the offset γ(o). The initiating routine 1310 further includes step 1420 of compensating for a knob angle, calculating a filtered knob angle rate in step 1424, and determining if the filtered knob angle rate is less than a maximum allowable knob angle rate for the offset calculation in step 1428. The maximum allowable knob angle rate may be a tunable value of between about 0 and about 10°, and in a specific example about 1°. The maximum allowable trailer angle rate may be a tunable value of between about 0° per second and about 2° per second, and in a specific example, about 0.5° per second. The maximum allowable steering angle rate may be a tunable value of between about 0° per second and about 10° per second, and in a specific example, about 0.5° per second. The maximum allowable vehicle speed may be a tunable value of between about 0° km/h and about 100 km/h, and in a specific example, about 3 km/h.

With further reference to FIG. 37, when the initiating routine 1310 is complete, the hitch angle calibration routine at step 1346 determines whether the hitch angle rate and the steering angle rate are both substantially zero, or alternatively stated, whether the hitch angle and the steering angles are substantially constant. If the hitch angle rate and the steering angle rate are both not substantially zero, the hitch angle calibration routine 1308 continues to conduct the initiating routine 1310 at step 1324 and continues to take measurements with the sensor system 1200 until the hitch angle rate and steering angle rate are substantially zero. Once they are both substantially zero, the hitch angle calibration routine 1308 then determines the actual hitch angle at step 1348 based on the vehicle 100 and trailer 110 generally fixed characteristics, as identified in the equations above. With the actual hitch angle γ(a), the hitch angle calibration routine 1308 may then determine the offset γ(o) between the actual hitch angle γ(a) and the measured hitch angle γ(m) at step 1350. Upon determination of the offset γ(o), the calibration module is complete and the trailer backup assist system 105 may proceed for operation.

Figure 39:
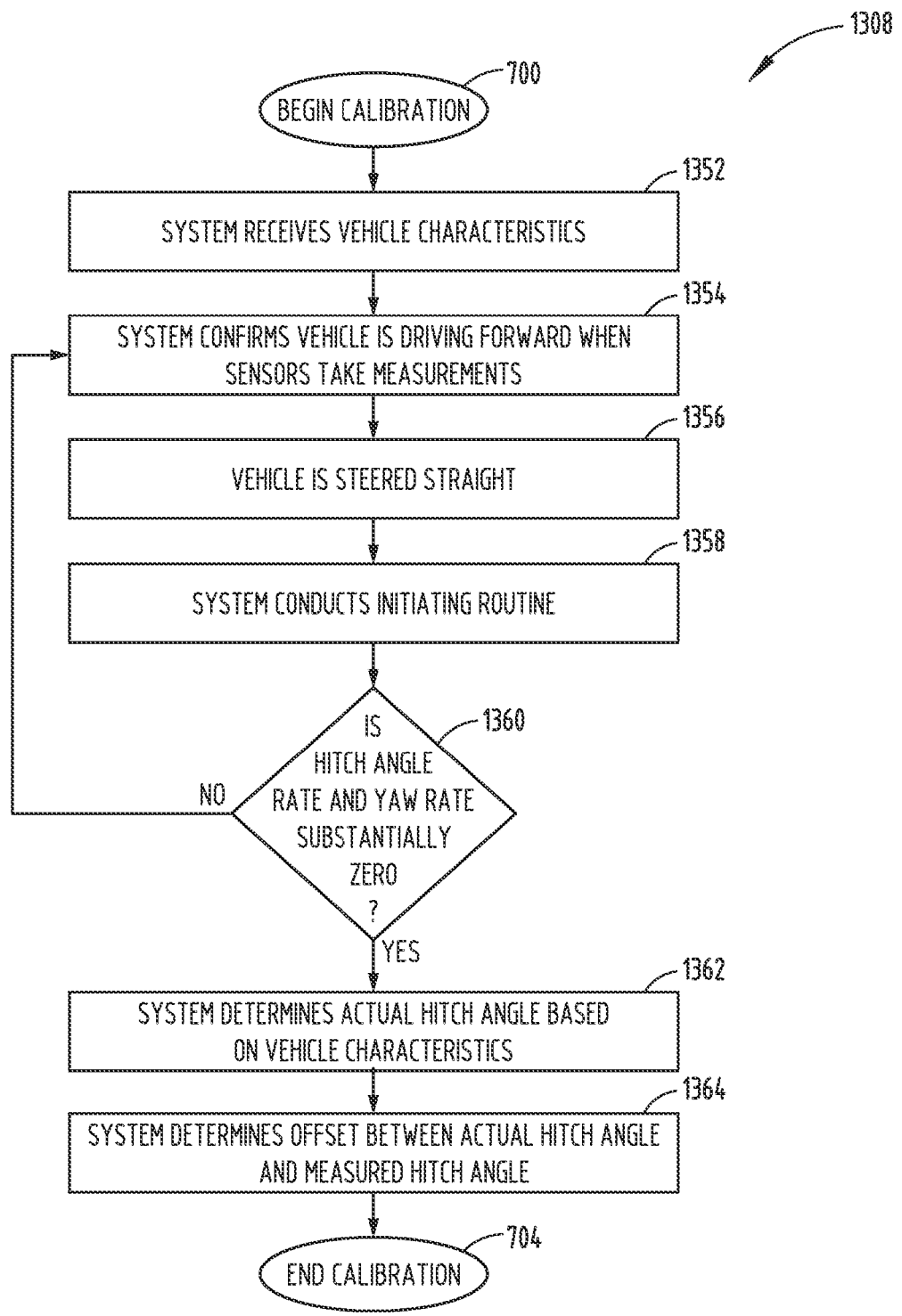
FIG. 39 is a flow diagram illustrating an additional embodiment of the hitch angle calibration routine.

In an additional embodiment of the hitch angle calibration routine 1308, as illustrated in FIG. 39, a method is provided for calibrating the trailer backup assist system 105 for the trailer 110 attached to the vehicle 100, which provides driving the vehicle 100 forward substantially straight above a threshold speed. The method also provides sensing a yaw rate of the vehicle 100 and sensing a measured hitch angle γ(m) of the trailer 110. Further, the method provides for determining an angle rate based on the measured hitch angle γ(m), and then determining an offset γ(o) between the measured hitch angle γ(m) and the actual hitch angle γ(a) when the yaw rate and the angle rate are substantially zero.

In the previously described embodiment of the hitch angle calibration routine 1308 with reference to FIG. 37, the vehicle 100 is reversing and therefore such an embodiment is configured for situations when the vehicle 100 may not be able to drive forward far enough to calibrate the trailer backup assist system 105. However, when space is available to drive the vehicle 100 forward, an alternative method may be used to determine the offset γ(o) between the actual hitch angle γ(a) and the measured hitch angle γ(m) that does not rely upon the accuracy of the measured or otherwise determined trailer geometry and dimensions. Specifically, when setting up the trailer 110 with the vehicle 100, in one embodiment, the user may be instructed to measure various dimensions of the trailer 110, including the trailer length D. The dimensions of the vehicle 100, however, may be measured with a high degree of accuracy upon assembly of the vehicle or otherwise supplied in an accurate manner to the trailer backup assist system 105, such as with a hookup table provided by the vehicle manufacture.

With reference to FIG. 39, at step 700 the trailer backup assist system 105 again begins to calibrate the system for the trailer 110 attached to the vehicle 100. At step 1352, the system receives the vehicle characteristic including the dimensions of the vehicle 100 and the operating characteristics, such as the present gear of the transmission. Then at step 1354, the system confirms that the vehicle is driving forward while the sensors of the sensor system 1200 take measurements and other readings. Notably, in this illustrated embodiment, the sensors utilized include a sensor for determining the vehicle yaw rate, such as an onboard yaw rate sensor 1314 or a separate sensor configured to determine the yaw rate of the vehicle. Also, the sensors being utilized by this embodiment of the hitch angle calibration routine include at least one hitch angle sensor 1312, as previously described with reference to the sensor system 1200.

Still referring to FIG. 39, at step 1356, the steered wheels 1302 of the vehicle 100 are steered straight while the vehicle 100 is traveling forward. It is contemplated that in one embodiment the user may be instructed to steer the vehicle straight by manually controlling the steering wheel. In an additional embodiment, the vehicle 100 may automatically steer the vehicle 100 straight using the powering steering assist system 115. More specifically, the trailer backup assist system 105 may operate the steered wheels 1302 of the vehicle 100 using the servo steering motor 1300 in conjunction with the steering angle detection apparatus 140.

Once the sensor readings are being received and the vehicle is being steered straight and driving forward, the illustrated embodiment of the hitch angle calibration routine 1308 then proceeds to process an initiating routine 1310 at step 1358. The initiating routine 1310 of the present embodiment may, similar to the initiating routine illustrated in FIG. 38, calculate filtered values for the steering wheel angle rate, the hitch angle rate, and the vehicle speed. Furthermore, these filtered values may be compared against threshold values to ensure the hitch angle calibration routine is performed when vehicle conditions are acceptable for such calculation. Specifically, the filtered steering angle rate may be less than a maximum allowable steering angle rate, the trailer angle rate may be less than the maximum allowable trailer angle rate, and the filtered vehicle speed may be less than the maximum allowable vehicle speed, such as 10 mph, 15 mph, or other conceivable threshold speed. When these or more or fewer conditions are met, the system may proceed to the following step of the hitch angle calibration routine.

As also illustrated in FIG. 39, at step 1360 the hitch angle calibration routine 1308 determines whether the hitch angle rate and the yaw rate are both substantially zero. Specifically, the determination of reaching a value of substantially zero may be one or a combination of the value being within a close proximity to zero or the value being zero or substantially zero over a predetermined period of time. It is contemplated that the increment of time may be proportional to the filtered vehicle speed, such that increasing speed of the vehicle results in decreasing the increment of time the measured hitch angle γ(m) and the steering angle must be substantially constant to determine the offset γ(o). It is also contemplated that the offset may be determined when the measured hitch angle and the steering angle are substantially constant while the vehicle and the trailer are reversing over a threshold distance, such as a distance greater than half a circumference of a steered wheel of the vehicle or other conceivable distances. When the system makes a determination that both values are substantially zero, the system, at step 1362 is then able to determine the actual hitch angle γ(a) based upon the vehicle characteristics. In one embodiment, when the above conditions are met the actual hitch angle γ(a) will be zero. However, some vehicle characteristics, such as an offset hitch location, may result in the actual hitch angle γ(a) deviating from zero with these conditions met. At step 1364 the system then determines the offset γ(o) between the actual hitch angle γ(a) and the measured hitch angle γ(m) for purposes of operating the trailer backup assist system 105. Again, at step 704 the trailer backup assist system 105 may notify the driver that the calibration is complete and may store the hitch angle offset value in memory to be associated with the attached trailer 110.

Figure 40:
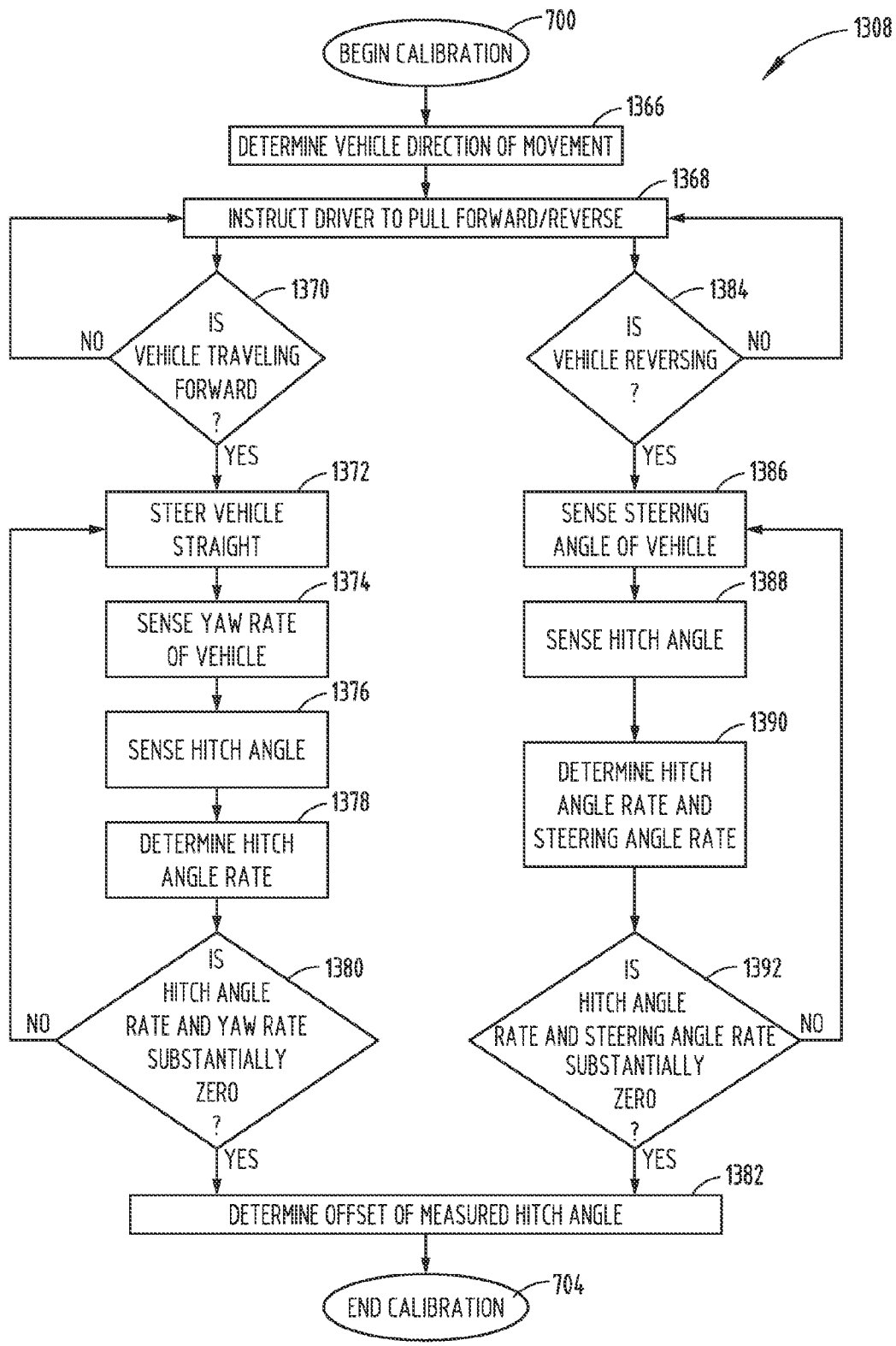
FIG. 40 is a flow diagram illustrating a method of calibrating a trailer backup assist system before determining an offset of the measured hitch angle.

Referring now to FIG. 40, an additional embodiment of the hitch angle calibration routine 1308 is illustrated that may consider the vehicle's direction of movement or potential direction of movement before choosing a method for determining the offset γ(o) of the measured hitch angle γ(m). The vehicle's direction of movement may be based upon the presently engaged gear of the transmission, such as drive or reverse for automatic transmissions. The vehicle's potential direction of movement, however, may be based upon the available space in front of or behind the vehicle and trailer combination. At step 1366, if the vehicle 100 is moving in either the forward or rearward directions, the system may determine if enough available space exists for the vehicle 100 to continue moving in such direction and complete the calibration of the trailer backup assist system 105. If enough available space is not present, the hitch angle calibration routine 1308 of the illustrated embodiment may instruct the driver to move the vehicle 100 in the opposite or an alternative direction, provided enough available space exists in such direction to complete the calibration. Also, if the vehicle 100 is not moving, the system may determine the preferred direction of movement for the vehicle 100 and trailer 110 to move to have enough space for the vehicle 100 to complete the calibration of the trailer backup assist system 105. At step 1368 the system may instruct the driver, such as through the HMI, to drive either forward or in reverse, as determined in the previous step 1366. Based on which direction the vehicle is instructed to move, this embodiment of the hitch angle calibration routine 1308 may employ one of two alternative methods to determine the actual hitch angle γ(a) for completing the calibration. Specifically, if the vehicle 100 is traveling forward, at step 1370, the system then proceeds to ensure that the vehicle is steered straight 1372, while sensing the yaw rate of the vehicle 1374 and sensing the hitch angle rate 1376. The sensed hitch angle γ(m) is used by the system to determine the hitch angle rate at step 1378 and then continue on to step 1380 to determine when the hitch angle rate and the yaw rate of the vehicle are substantially zero, similar to the method previously described with reference to the embodiment disclosed in FIG. 39. When the hitch angle rate and the yaw rate of the vehicle are substantially zero, at step 1380 the hitch angle calibration routine 1308 may determine the actual hitch angle γ(a) to be substantially zero, which may then be used in conjunction with the measured hitch angle γ(m) to determine the offset γ(o) at step 1382.

Alternatively, if the vehicle 100 is reversing or instructed to reverse, at step 1384, once the vehicle 100 is reversing, the system proceeds to sense the steering angle δ of the vehicle 100 at step 1386 and sense the hitch angle γ(m) at step 1388 to then determine the hitch angle rate and the steering angle rate at step 1390. The steering angle δ is the angle of the road wheels that steer the vehicle. The steering wheel angle δ may be the angle of the steering wheel for a vehicle in which the steering wheel is mechanically coupled to the road wheels. For a steer by wire arrangement, the steering angle δ may be measured by the angle of the steerable road wheels. At step 1392 the system determines when both the hitch angle rate and the steering angle rate are substantially zero. When both these values are substantially zero, the hitch angle calibration routine 1308 may determine the offset γ(o) of the measured hitch angle γ(m) based upon the length D of the trailer 110, the wheelbase length W of the vehicle 100, and the distance L from the rear axle of the vehicle 100 to the trailer 110, as generally set forth in the embodiment of the hitch angle calibration routine 1308 described with reference to FIGS. 37 and 38. In the embodiment disclosed in FIG. 40, once the hitch angle offset $\gamma(o)$ is determined at step 1382, the calibration routine commences at step 704 and may notify the driver, such as via the HMI or another similar notification.

The hitch angle calibration routine 1308 illustrated in FIG. 40 illustrates one embodiment for calibrating the hitch angle both in the forward direction of travel based on the hitch angle rate and yaw rate being substantially zero and in the reverse vehicle direction based on the hitch angle rate and steering angle rate being substantially zero. However, it should be appreciated that use of the hitch angle rate, the yaw rate, and the steering angle rate is one embodiment for determining a steady state condition during which the offset calibration may be performed. The hitch angle calibration routine 1308 determines offset of the measured hitch angle when the vehicle and trailer are in a steady state condition. The steady state condition may be when at least one steady state indicator on the trailer and at least one steady state indicator on the vehicle are constant in either the forward or reverse vehicle direction. When this steady state condition is met, the expected trailer angle is calculated and the difference between the expected trailer angle and the measured trailer angle is determined as the offset. The vehicle steady state indicator may include one or more of the following: the vehicle yaw rate is constant, the steering wheel or road wheel angle is constant, or the steering wheel or road wheel angle rate is substantially zero. The trailer steady state indicator may include one or more of the following: the trailer yaw rate is constant, or the trailer hitch angle is constant, or the trailer hitch angle rate is substantially zero. When the curvature command is zero while the vehicle is driven in reverse, the expected trailer angle is zero, and the offset is calculated from the difference from zero to the measured angle. However, it should be appreciated that the offset may be calculated when the curvature command is not at zero during a non-straight travel path.

Figure 41:
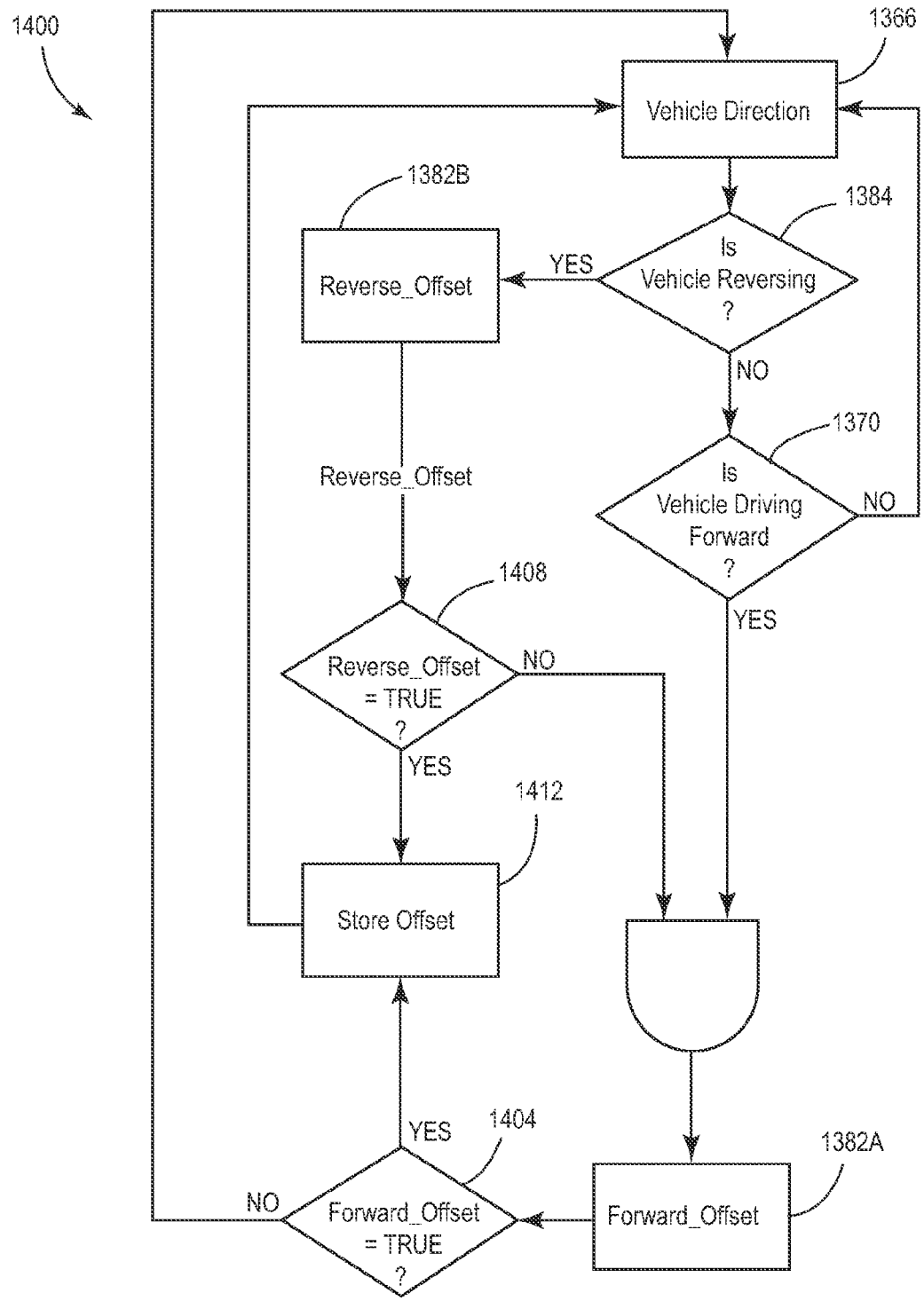
FIG. 41 is a flow diagram illustrating an offset prioritization method, according to one embodiment.

Referring now to FIG. 41, although the offset $\gamma(o)$ generally may be determined while the vehicle 100 is moving forward or in reverse, there may be differences in accuracy of the offset $\gamma(o)$ when depending on the direction of travel of the vehicle 100. Accordingly, the offset $\gamma(o)$ may be determined separately as a reverse offset $\gamma(or)$ or a forward offset $\gamma(of)$. In various embodiments, the reverse offset $\gamma(or)$ determined while the vehicle 100 is reversing may be more accurate than the forward offset $\gamma(of)$ determined while the vehicle 100 is moving forward. While the vehicle 100 is towing the trailer 110 in the forward direction, the natural stability of the system may lead to the calculation of the forward offset $\gamma(of)$ to be less accurate than the reverse offset $\gamma(or)$ which is calculated during the more sensitive motion of backing the vehicle 100 and the trailer 110. Accordingly, prioritization of the reverse offset $\gamma(or)$ over the forward offset $\gamma(of)$ may be desirable. In such an instance, a prioritization method 1400 may be used to prioritize the reverse offset $\gamma(or)$ over the forward offset $\gamma(of)$. The prioritization method 1400 may be run at the same time as the hitch angle calibration routine 1308 and includes several of the same steps of the hitch angle calibration routine 1308 and may be run on the same controller or a different controller than the hitch angle calibration routine 1308. The prioritization method 1400 may include steps 1366, 1384, 1382A, 1382B, 1370, 1404, 1408, and 1412.

Step 1366 detects that the vehicle 100 is moving. Determination of the movement of the vehicle 100 may be accomplished via signals from wheel count encoders, a controller area network, a parking assist controller, a vehicle electronic control unit, a gear sensor or various other controllers and modules around the vehicle 100. Next, step 1384 determines whether the vehicle 100 is reversing. If the vehicle 100 is reversing, the method 1400 proceeds to step 1382B and if the vehicle 100 is not moving in the reverse direction, the method 1400 proceeds to step 1370 of determining if the vehicle 100 is moving in a generally forward direction. The vehicle 100 may be determined to be moving in the forward direction using any of the signals or controllers explained above.

In the event the vehicle 100 is determined to be moving in a forward direction in step 1370, the method 1400 proceeds to step 1382A of determining the forward offset $\gamma(of)$. The forward offset $\gamma(of)$ is calculated in substantially the same manner as the offset $\gamma(o)$ is calculated while the vehicle 100 is traveling in the forward direction, as explained above. Once the forward offset $\gamma(of)$ is calculated, the method 1400 proceeds to step 1404 of determining if a forward offset flag has been set. If the forward offset flag has been set (e.g., logically expressed as true), the forward offset $\gamma(of)$ the method 1400 is advanced to step 1412. If the forward offset flag is not set to true, the method 1400 returns to step 1366 of detecting which direction the vehicle 100 is moving in. Step 1412 of the method 1400 stores the forward offset $\gamma(of)$ for use during the hitch angle calibration or for later use with forward and reverse movement of the vehicle 100 and trailer 110. The forward offset flag is set to true if the reverse offset $\gamma(or)$ is not yet stored or if the forward offset $\gamma(of)$ is stored. It will be understood that in various embodiments, the forward offset flag may not be set to true if the forward offset $\gamma(of)$ is already stored.

Returning to step 1384, if the vehicle 100 is determined to be traveling in the reverse direction, the method 1400 advances to step 1382B of determining the reverse offset $\gamma(or)$. Similarly to the forward offset $\gamma(of)$, the reverse offset $\gamma(or)$ is calculated as the offset $\gamma(o)$ when the vehicle 100 is traveling in the reverse direction, as described above. Once the reverse offset $\gamma(or)$ is determined, the method advances to step 1408 of determining if a reverse offset flag is set to true. If yes, the method 1400 advances to step 1412 of storing the reverse offset $\gamma(or)$. Step 1412 may store the forward or reverse offsets $\gamma(of)$, $\gamma(or)$ in random-access memory, or may transfer the offsets $\gamma(of)$, $\gamma(or)$ to non-volatile random-access memory upon the shutting down of the vehicle 100. In various embodiments, if a forward offset $\gamma(of)$ is calculated and stored prior to the reverse offset $\gamma(or)$, the reverse offset $\gamma(or)$ may substitute, exchange or otherwise replace the forward offset $\gamma(of)$. After the storing of the reverse offset $\gamma(or)$ the method 1400 may not calculate the forward offset $\gamma(of)$. In some embodiments, if the reverse offset $\gamma(or)$ is calculated again and is a different value than the stored value (e.g., due to a different trailer 110 being attached to the vehicle 100 or a new asymmetry of the trailer 110 and/or vehicle 100 being present) the stored reverse offset $\gamma(or)$ may be substituted, exchanged, or otherwise replaced for the new value of the reverse offset $\gamma(or)$. In various embodiments, multiple forward and reverse offsets $\gamma(of)$, $\gamma(or)$ may be stored, which correspond to different trailers 110 or different typical asymmetries. It will be understood that calculations of the forward and reverse offsets $\gamma(of)$, $\gamma(or)$ calculated after the storing of the forward and/or reverse offsets $\gamma(of)$, $\gamma(or)$ may not necessarily be discarded, but may be used to enhance the accuracy of the stored value by averaging the calculations together, regardless if it is a forward or reverse offset $\gamma(of)$, $\gamma(or)$, or by providing more than one data point for the method 1400 or routine 1308 to work from.

Use of the prioritization method 1400 may offer several advantages. For example, by prioritizing the reverse offset γ(or) over the forward offset γ(of), a more accurate offset may be used when backing the vehicle 100 and trailer 110. Additionally, by storing the more accurate of the offsets, future calibration maneuvers may not need to be performed until a new asymmetry is detected with the vehicle 100 and/or trailer.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for calibrating a backup assist system for a trailer attached to a vehicle, comprising:
   a hitch angle sensor continuously measuring a hitch angle for determining a hitch angle rate; and
   a controller configured to determine an offset of the measured hitch angle when the vehicle is driving forward and rearward above a threshold speed and the hitch angle rate is substantially zero and prioritize the driving rearward offset over the driving forward offset.

2. The system of claim 1, wherein the offset is determined between the measured hitch angle and an actual hitch angle when the actual hitch angle is substantially zero.

3. The system of claim 1, wherein the controller determines the hitch angle rate based on changes in the measured hitch angle over time, and wherein the hitch angle sensor includes a video imaging camera on the vehicle that continuously monitors a target on the trailer.

4. The system of claim 1, wherein the controller determines the offset while the vehicle is moving rearward when a steering angle rate is substantially zero.

5. The system of claim 1, wherein the controller determines the offset while the vehicle is moving forward when a yaw rate of the vehicle is substantially constant.

6. The system of claim 1, wherein the controller is configured to replace a forward offset when a reverse offset is determined.

7. A system for calibrating a backup assist system for a trailer attached to a vehicle, comprising:
   a hitch angle sensor continuously measuring a hitch angle for determining a hitch angle rate; and
   a controller configured to determine an offset of the measured hitch angle when the vehicle is driving forward and rearward above a threshold speed and the hitch angle rate is substantially zero and prioritize the driving rearward offset over the driving forward offset, wherein the controller is configured to replace the driving forward offset when the driving rearward offset is determined.

8. The system of claim 7, wherein the offset is determined between the measured hitch angle and an actual hitch angle when the actual hitch angle is substantially zero.

9. The system of claim 7, wherein the controller determines the angle rate based on changes in the measured hitch angle over time, and wherein the hitch sensor includes a video imaging camera on the vehicle that continuously monitors a target on the trailer.

10. The system of claim 7, wherein the controller determines the offset while the vehicle is moving rearward when a steering angle rate is substantially zero.

11. The system of claim 7, wherein the controller determines the offset while the vehicle is moving forward when a yaw rate of the vehicle is substantially constant.

* * * * *